United States Patent
Zhang et al.

(10) Patent No.: US 10,903,954 B2
(45) Date of Patent: Jan. 26, 2021

(54) REFERENCE SIGNAL MAPPING METHOD AND APPARATUS

(71) Applicant: HUAWEI TECHNOLOGIES CO., LTD., Shenzhen (CN)

(72) Inventors: Xu Zhang, Beijing (CN); Lixia Xue, Beijing (CN); Yan Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 16/265,971

(22) Filed: Feb. 1, 2019

(65) Prior Publication Data

US 2019/0173642 A1 Jun. 6, 2019

Related U.S. Application Data

(63) Continuation of application No. PCT/CN2017/096992, filed on Aug. 11, 2017.

(30) Foreign Application Priority Data

Aug. 12, 2016 (CN) .......................... 2016 1 0670143

(51) Int. Cl.
*H04L 5/00* (2006.01)
*H04L 27/26* (2006.01)

(52) U.S. Cl.
CPC .......... *H04L 5/0048* (2013.01); *H04L 5/0053* (2013.01); *H04L 5/0083* (2013.01); *H04L 27/2626* (2013.01); *H04L 5/0007* (2013.01)

(58) Field of Classification Search
CPC ... H04L 5/0048; H04L 5/0053; H04L 5/0083; H04L 27/2626; H04L 5/0007
See application file for complete search history.

(56) References Cited

U.S. PATENT DOCUMENTS

2010/0195615 A1* 8/2010 Lee .................... H04L 25/03343
370/330
2010/0322179 A1 12/2010 Yu et al.
(Continued)

FOREIGN PATENT DOCUMENTS

| CN | 101510868 A | 8/2009 |
| CN | 101594335 A | 12/2009 |

(Continued)

OTHER PUBLICATIONS

WOASiS,"Multi-Cell CSI-RS Pattern and Sequence",3GPP TSG-RAN WG1 Meeting #59 R1-094907,Jeju, Korea, Nov. 9-13, 2009,total 6 pages.

(Continued)

*Primary Examiner* — Kiet Tang
(74) *Attorney, Agent, or Firm* — Kilpatrick Townsend & Stockton LLP

(57) ABSTRACT

A method includes: mapping, by a base station, N reference signals to a specified time-frequency resource; and transmitting, by the base station, a reference signal on the specified time-frequency resource to user equipment, where for any PRB, the specified time-frequency resource includes a first OFDM symbol in a data region in time domain; where the PRB includes a type-1 control channel and the data region, the data region includes a type-2 control channel and a data channel, the type-1 control channel includes first m OFDM symbols of the PRB in time domain, and the data region includes OFDM symbols other than the type-1 control channel in the PRB in time domain; and the type-2 control channel includes first n OFDM symbols in the data region in time domain, and the data channel includes OFDM symbols other than the type-2 control channel in the data region in time domain.

18 Claims, 20 Drawing Sheets

(56) References Cited

U.S. PATENT DOCUMENTS

| | | |
|---|---|---|
| 2013/0107694 A1 | 5/2013 | Hu et al. |
| 2013/0229981 A1 | 9/2013 | Park |
| 2014/0185544 A1* | 7/2014 | Jang .................... H04L 5/0091 370/329 |
| 2014/0192730 A1 | 7/2014 | Seo et al. |
| 2015/0036606 A1 | 2/2015 | Ji et al. |
| 2015/0092722 A1 | 4/2015 | Zhang et al. |
| 2015/0162964 A1 | 6/2015 | Chung et al. |
| 2016/0261317 A1 | 9/2016 | Liu et al. |
| 2017/0026946 A1 | 1/2017 | Seo et al. |
| 2018/0124787 A1* | 5/2018 | Wang ................. H04L 27/2613 |

FOREIGN PATENT DOCUMENTS

| | | |
|---|---|---|
| CN | 101662443 A | 3/2010 |
| CN | 101990308 A | 3/2011 |
| CN | 103109479 A | 5/2013 |
| CN | 10322029 A | 7/2013 |
| CN | 103797736 A | 5/2014 |
| CN | 104539327 A | 4/2015 |
| EP | 2583530 A1 | 4/2013 |

OTHER PUBLICATIONS

Ming Cui, Research on the Design of Reference Signal in LTE-Advanced, Apr. 2012. total 70 pages. With English abstract.

* cited by examiner

First time-frequency resource group:    Antenna ports 1 and 2

Second time-frequency resource group:    Antenna ports 3 and 4

Seventh time-frequency resource group:

(1)

Eighth time-frequency resource group:

(2)

Ninth time-frequency resource group:

(3)

Tenth time-frequency resource group:

(4)

REFERENCE SIGNAL MAPPING METHOD AND APPARATUS

CROSS-REFERENCE TO RELATED APPLICATIONS

This application is a continuation of International Application No. PCT/CN2017/096992, filed on Aug. 11, 2017, which claims priority to Chinese Patent Application No. 201610670143.2, filed on Aug. 12, 2016. The disclosures of the aforementioned applications are hereby incorporated by reference in their entireties.

TECHNICAL FIELD

The present disclosure relates to the field of communications technologies, and in particular, to a reference signal mapping method and apparatus.

BACKGROUND

Driven by continuous development of communications technologies and increasingly high requirements of people on communication speeds, reliability, and the like, a Long Term Evolution (LTE) technology emerges. In an LTE network, signals are transmitted in units of radio frames. Each radio frame is made up of subframes. Each subframe includes two slots. Each slot includes a fixed quantity of orthogonal frequency division multiplexing (OFDM) symbols. During data transmission in an LTE communications system, a data transmission channel needs to be demodulated to obtain data transmitted on the channel. For example, in a downlink, a control signal and/or a data signal received from a control channel and/or a data channel need/needs to be demodulated based on a reference signal transmitted on the control channel and/or the data channel. The reference signal is a group of specific data sequences distributed in specified time-frequency resource locations and used to demodulate the data signal and/or the control signal.

In the prior art, the reference signal for demodulating the received data signal is distributed in a whole physical resource block (PRB), and user equipment can demodulate the data signal in the PRB only after receiving the signal in the whole PRB.

In a process of implementing the present disclosure, the inventors find that the prior art has at least the following problem: because the reference signal is distributed in the whole PRB, the reference signal occupies excessive time-frequency resources, and overheads are excessively high. In addition, the data signal cannot be quickly demodulated, and therefore a low-latency requirement of a fifth-generation (5G) mobile communication technology cannot be satisfied.

SUMMARY

To resolve the problem in the prior art, embodiments of the present disclosure provide a reference signal mapping method and apparatus. The technical solutions are as follows:

According to a first aspect, a reference signal mapping method is provided, and the method includes:

mapping, by a base station, N reference signals to a specified time-frequency resource, where N is a positive integer greater than or equal to 1; and transmitting, by the base station, at least one of the N reference signals on the specified time-frequency resource to user equipment, where for any physical resource block (PRB), the specified time-frequency resource includes a first orthogonal frequency division multiplexing (OFDM) symbol in a data region in time domain; where the PRB includes a type-1 control channel and the data region, the data region includes a type-2 control channel and a data channel, the type-1 control channel includes first m OFDM symbols of the PRB in time domain, and the data region includes OFDM symbols other than the type-1 control channel in the PRB in time domain; and the type-2 control channel includes first n OFDM symbols in the data region in time domain, the data channel includes OFDM symbols other than the type-2 control channel in the data region in time domain, and m and n are both positive integers greater than or equal to 1.

Because the reference signals are mapped to the specified time-frequency resource including a plurality of REs on first several OFDM symbols in the data region in time domain, the reference signals do not need to span the whole time-frequency resource. A reference signal used to demodulate a data signal and/or a control signal is transmitted only when the data signal and/or the control signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased.

In a first possible implementation of the first aspect of the present disclosure, the specified time-frequency resource includes at least one OFDM symbol on the data channel in time domain.

Because the reference signals are mapped to the specified time-frequency resource of the at least one orthogonal frequency division multiplexing OFDM symbol on the data channel, the quantity of concurrent multiplex on the data channel and the quantity of user equipments multiplexed on the control channel can be further increased. In addition, when the user equipment is in a high-speed moving scenario, accuracy of channel estimation performed by the user equipment on the data channel can be further improved.

In a second possible implementation of the first aspect of the present disclosure, the mapping, by a base station, N reference signals to a specified time-frequency resource includes: selecting any N sequences from an orthogonal sequence group, where the orthogonal sequence group includes M pairwise orthogonal sequences, N is a quantity of antenna ports, M and N are both positive integers greater than or equal to 1, and M is not less than N; generating the N reference signals based on the N sequences; and mapping the N reference signals corresponding to the N sequences, to the specified time-frequency resource, so that the N reference signals are pairwise orthogonal on the specified time-frequency resource.

Because the reference signals are mapped to the specified time-frequency resource by using the foregoing method, when a plurality of reference signals are mapped to the specified time-frequency resource, a quantity of reference signals transmitted in a PRB can be increased by implementing code division multiplexing by using orthogonal sequences without increasing resource consumption.

In a third possible implementation of the first aspect of the present disclosure, before the transmitting at least one of the N reference signals to user equipment, the method further includes: transmitting first indication information to the user equipment, where the first indication information includes port information of a first preset antenna port, and the first preset antenna port is configured to transmit the at least one reference signal; and correspondingly, the transmitting at least one of the N reference signals to user equipment includes: transmitting the at least one reference signal on the first preset antenna port to the user equipment.

Because the first indication information including the port information is transmitted to the user equipment, the user equipment can determine, based on the port information, an antenna port for receiving the at least one reference signal.

In a fourth possible implementation of the first aspect of the present disclosure, when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further includes a subframe location of a subframe in which the at least one reference signal is located, and correspondingly, a time-frequency resource corresponding to the first preset antenna port is located in a data region of a second PRB, where the second PRB is at least one PRB corresponding to the subframe in which the at least one reference signal is located; or when the first indication information is transmitted on the type-1 control channel in a subframe in which the PRB is located, the first indication information further includes a subframe location of a subframe in which the at least one reference signal is located, and correspondingly, a time-frequency resource corresponding to the first preset antenna port is located in a data region of a third PRB, where the third PRB includes at least one PRB in the subframe in which the PRB is located and at least one PRB corresponding to the subframe in which the at least one reference signal is located.

Because a time-frequency resource location of the reference signal is indicated to the user equipment by using different methods based on different locations of reference signals, the user equipment can determine a corresponding time-frequency resource location based on the first indication information, so as to receive the reference signal. This can improve reference signal transmission efficiency and avoid signal transmission failure.

In a fifth possible implementation of the first aspect of the present disclosure, when a length of a sequence corresponding to a reference signal of each antenna port is 4, M is 4, and N is 2, the specified time-frequency resource includes a first time-frequency resource group and a second time-frequency resource group, where each time-frequency resource group corresponds to two antenna ports; and the mapping the N reference signals corresponding to the N sequences, to the specified time-frequency resource includes: obtaining a mapped sequence of a first sequence group, where the first sequence group includes a first sequence and a second sequence, and the first sequence and the second sequence are two sequences selected from the orthogonal sequence group; and mapping two reference signals corresponding to the mapped sequence, to the first time-frequency resource group and the second time-frequency resource group respectively; where the first time-frequency resource group and the second time-frequency resource group respectively include two REs of the first OFDM symbol in the data region and two REs of a second OFDM symbol in the data region, where the two REs of the first OFDM symbol and the two REs of the second OFDM symbol occupy subcarriers of a same frequency; and the reference signal of the first time-frequency resource group and the reference signal of the second time-frequency resource group are used to demodulate a data signal.

Because the reference signals are mapped to the specified time-frequency resource including a plurality of REs on first several OFDM symbols in the data region in time domain, the reference signals do not need to span the whole time-frequency resource. A reference signal used to demodulate a data signal and/or a control signal is transmitted only when the data signal and/or the control signal are/is transmitted. Therefore, the control signal and/or the data signal can be quickly demodulated, the low-latency requirement of the 5G communications network is satisfied, code division multiplexing is implemented by using orthogonal sequences, and the quantity of concurrent multiplex on the data channel and the quantity of user equipments multiplexed on the control channel are increased.

In a sixth possible implementation of the first aspect of the present disclosure, the specified time-frequency resource further includes a third time-frequency resource group and a fourth time-frequency resource group, and each time-frequency resource group corresponds to two antenna ports; and correspondingly, the method further includes: mapping a reference signal corresponding to a third sequence in a second sequence group, to the first time-frequency resource group and the second time-frequency resource group respectively based on a first preset rule; and mapping a reference signal corresponding to a fourth sequence in the second sequence group, to the first time-frequency resource group and the second time-frequency resource group respectively based on the first preset rule, so that a third sequence group corresponding to the third time-frequency resource group includes the third sequence and the fourth sequence; where the second sequence group includes the third sequence and the fourth sequence other than the first sequence group in the orthogonal sequence group; the third time-frequency resource group includes the four REs of the first OFDM symbol that are in the first time-frequency resource group and the second time-frequency resource group and are located in the data region, and the fourth time-frequency resource group includes the four REs of the second OFDM symbol that are in the first time-frequency resource group and the second time-frequency resource group and are located in the data region; and a reference signal of the third time-frequency resource group is used to demodulate a data signal and/or a control signal.

In the foregoing mapping manner, by using orthogonal sequences, a reference signal transmitted on an antenna port corresponding to the third time-frequency resource group can be orthogonal to reference signals transmitted on antenna ports corresponding to the first time-frequency resource group and the second time-frequency resource group. In addition, when a time-frequency resource occupied by the type-2 control channel includes the third time-frequency resource group, the reference signal of the antenna port corresponding to the third time-frequency resource group may be used to demodulate a control signal on the type-2 control channel and a data signal on the data channel, and the control signal can be quickly demodulated; or when a time-frequency resource occupied by the type-2 control channel does not include the third time-frequency resource group, the reference signal of the antenna port corresponding to the third time-frequency resource group may be used to demodulate a data signal.

In a seventh possible implementation of the first aspect of the present disclosure, after the mapping a reference signal corresponding to a fourth sequence in the second sequence group, to the first time-frequency resource group and the second time-frequency resource group respectively based on the first preset rule, the method further includes: when n is greater than or equal to 2, obtaining, based on a mapping result of the second sequence group in the first time-frequency resource group and the second time-frequency resource group, a fourth sequence group corresponding to the fourth time-frequency resource group, where the first preset rule causes the fourth sequence group obtained based on the mapping result to be the same as the third sequence group, and a reference signal of the fourth time-frequency resource group is used as an auxiliary reference signal for the reference signal of the third time-frequency resource group.

Because the reference signal of the fourth time-frequency resource group is used as the auxiliary reference signal for the reference signal of the third time-frequency resource group, a success ratio of demodulating the control signal and the data signal can be increased.

In an eighth possible implementation of the first aspect of the present disclosure, after the obtaining a mapped sequence of a first sequence group, the method further includes: mapping two reference signals corresponding to the mapped sequence, to the first time-frequency resource group and the second time-frequency resource group respectively based on the first preset rule, so that even power allocation in time domain and frequency domain is implemented for reference signals on the first OFDM symbol in the data region and the second OFDM symbol in the data region.

Because the two reference signals corresponding to the mapped sequence are mapped to the first time-frequency resource group and the second time-frequency resource group respectively based on the first preset rule, even power allocation in time domain and even power allocation in frequency domain can be implemented for the reference signals of the first time-frequency resource group and the second time-frequency resource group on the first OFDM symbol and the second OFDM symbol in the data region. This reduces signal distortion caused by power fluctuation of a transmitter of the base station, improves stability of information transmission, and ensures accuracy and a success ratio of information transmission.

In a ninth possible implementation of the first aspect of the present disclosure, when a length of a sequence corresponding to a reference signal of each antenna port is 8, M is 8, and N is 8, the mapping the N reference signals corresponding to the N sequences, to the specified time-frequency resource includes: mapping eight reference signals corresponding to the eight sequences, to the specified time-frequency resource respectively, where a reference signal corresponding to the specified time-frequency resource is used to demodulate a data signal; where the specified time-frequency resource includes four REs of the first OFDM symbol in the data region and four REs of a second OFDM symbol in the data region, where the four REs of the first OFDM symbol and the four REs of the second OFDM symbol occupy subcarriers of a same frequency.

By performing the mapping, eight antenna ports can be mapped to a time-frequency resource including eight REs, and therefore eight reference signals can be transmitted simultaneously, so that the reference signals do not need to span the whole time-frequency resource. A reference signal used to demodulate a data signal is transmitted only when the data signal is transmitted. Therefore, code division multiplexing is implemented by using orthogonal sequences, and the quantity of concurrent multiplex on the data channel and the quantity of user equipments multiplexed on the control channel are increased.

In a tenth possible implementation of the first aspect of the present disclosure, the mapping the N reference signals corresponding to the N sequences, to the specified time-frequency resource includes: mapping eight reference signals corresponding to the eight sequences, to the specified time-frequency resource respectively based on a second preset rule, so that the specified time-frequency resource has four pairwise orthogonal sequences on the four REs of the first OFDM symbol in the data region, where reference signals corresponding to the four REs of the first OFDM symbol are used to demodulate a control signal and/or a data signal.

In the foregoing mapping manner, the specified time-frequency resource can have four pairwise orthogonal sequences on the four REs of the first OFDM symbol in the data region. In addition, when the time-frequency resource occupied by the type-2 control channel includes the four REs, four corresponding antenna ports may be shared by the data channel and the control channel. To be specific, the four antenna ports may transmit a reference signal used to demodulate a control signal, and may transmit a reference signal used to demodulate a data signal.

In an eleventh possible implementation of the first aspect of the present disclosure, when a length of a sequence corresponding to a reference signal of each antenna port is 8, M is 8, and N is 4, the specified time-frequency resource includes a fifth time-frequency resource group and a sixth time-frequency resource group, where each time-frequency resource group corresponds to four antenna ports; and the mapping the N reference signals corresponding to the N sequences, to the specified time-frequency resource includes: obtaining a mapped sequence of a third sequence group, where the third sequence group includes the four sequences selected from the orthogonal sequence group; and mapping four reference signals corresponding to the mapped sequence, to the fifth time-frequency resource group and the sixth time-frequency resource group respectively; where the fifth time-frequency resource group and the sixth time-frequency resource group respectively include two REs of the first OFDM symbol, two REs of a second OFDM symbol, two REs of an $i^{th}$ OFDM symbol, and two REs of a $j^{th}$ OFDM symbol in the data region, where the two REs of the first OFDM symbol, the two REs of the second OFDM symbol, the two REs of the $i^{th}$ OFDM symbol, and the two REs of the $j^{th}$ OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal.

By performing the mapping, eight antenna ports can be mapped to a time-frequency resource including 16 REs, and therefore eight reference signals can be transmitted simultaneously. It should be noted that, when the type-1 control channel occupies a first OFDM symbol of the PRB, the type-2 control channel occupies a second OFDM symbol of the PRB, and the data channel occupies another OFDM symbol of the PRB, reference signals corresponding to the eight antenna ports may be used to demodulate a data signal; or when the type-1 control channel occupies a first OFDM symbol of the PRB, the type-2 control channel occupies a second OFDM symbol and a third OFDM symbol of the PRB, and the data channel occupies another OFDM symbol of the PRB, reference signals corresponding to the eight antenna ports may be used to demodulate a data signal, or may be used to demodulate a control signal on the type-2 control channel.

In a twelfth possible implementation of the first aspect of the present disclosure, the specified time-frequency resource further includes a seventh time-frequency resource group, the seventh time-frequency resource group includes the four REs of the first OFDM symbol that are in the fifth time-frequency resource group and the sixth time-frequency resource group and are located in the data region, and the seventh time-frequency resource group corresponds to four antenna ports; and correspondingly, the method further includes: mapping four reference signals corresponding to four sequences other than the four sequences included in the third sequence group in the orthogonal sequence group, to the fifth time-frequency resource group and the sixth time-frequency resource group respectively based on a third preset rule to obtain a mapping result, so that four sequences of the seventh time-frequency resource group in the mapping result are pairwise orthogonal, where a reference signal of the seventh time-frequency resource group is used to demodulate a data signal and/or a control signal.

In the foregoing mapping manner, by using orthogonal sequences, the reference signal of the seventh time-frequency resource group can be orthogonal to reference signals of the fifth time-frequency resource group and the sixth time-frequency resource group. In addition, when a time-frequency resource occupied by the type-2 control channel includes the seventh time-frequency resource group, the reference signal of the seventh time-frequency resource group may be used to demodulate a control signal on the type-2 control channel and a data signal on the data channel, and the control signal can be quickly demodulated.

In a thirteenth possible implementation of the first aspect of the present disclosure, the specified time-frequency resource further includes an eighth time-frequency resource group, the eighth time-frequency resource group includes the four REs of the second OFDM symbol that are in the fifth time-frequency resource group and the sixth time-frequency resource group and are located in the data region, and the eighth time-frequency resource group corresponds to four antenna ports; and correspondingly, after the mapping four reference signals corresponding to four sequences other than the four sequences included in the third sequence group in the orthogonal sequence group, to the fifth time-frequency resource group and the sixth time-frequency resource group respectively based on a third preset rule to obtain a mapping result, the method further includes: when n is greater than or equal to 2 and less than i, obtaining, based on the mapping result, four sequences corresponding to the eighth time-frequency resource group, where the third preset rule causes the four sequences corresponding to the eighth time-frequency resource group and obtained based on the mapping result to be pairwise orthogonal, and a reference signal of the eighth time-frequency resource group is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal, and further, the reference signal of the eighth time-frequency resource group is used as the auxiliary reference signal for the reference signal of the seventh time-frequency resource group.

In a fourteenth possible implementation of the first aspect of the present disclosure, the specified time-frequency resource further includes a ninth time-frequency resource group, the ninth time-frequency resource group includes the four REs of the $i^{th}$ OFDM symbol that are in the fifth time-frequency resource group and the sixth time-frequency resource group and are located in the data region, and the ninth time-frequency resource group corresponds to four antenna ports; and correspondingly, after the mapping four reference signals corresponding to four sequences other than the four sequences included in the third sequence group in the orthogonal sequence group, to the fifth time-frequency resource group and the sixth time-frequency resource group respectively based on a third preset rule to obtain a mapping result, the method further includes: obtaining, based on the mapping result, four sequences corresponding to an eighth time-frequency resource group and four sequences corresponding to the ninth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal, and a reference signal of the eighth time-frequency resource group and/or a reference signal of the ninth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal, and further, the reference signal of the eighth time-frequency resource group and/or the reference signal of the ninth time-frequency resource group are/is used as the auxiliary reference signal for the reference signal of the seventh time-frequency resource group.

When the type-2 control channel includes the eighth time-frequency resource group but does not include the ninth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group is used as the auxiliary reference signal for the reference signal of the seventh time-frequency resource group, and may be used to demodulate the data signal on the data channel. When the type-2 control channel includes both the eighth time-frequency resource group and the ninth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel.

In a fifteenth possible implementation of the first aspect of the present disclosure, the specified time-frequency resource further includes a tenth time-frequency resource group, the tenth time-frequency resource group includes the four REs of the $j^{th}$ OFDM symbol that are in the fifth time-frequency resource group and the sixth time-frequency resource group and are located in the data region, and the tenth time-frequency resource group corresponds to four antenna ports; and correspondingly, after the mapping four reference signals corresponding to four sequences other than the four sequences included in the third sequence group in the orthogonal sequence group, to the fifth time-frequency resource group and the sixth time-frequency resource group respectively based on a third preset rule to obtain a mapping result, the method further includes: obtaining, based on the mapping result, four sequences corresponding to an eighth time-frequency resource group, four sequences corresponding to a ninth time-frequency resource group, and four sequences corresponding to the tenth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal and/or causes the four sequences corresponding to the tenth time-frequency resource group and obtained based on the mapping result to be pairwise orthogonal, and a reference signal of the eighth time-frequency resource group and/or a reference signal of the ninth time-frequency resource group and/or a reference signal of the tenth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal and/or the four sequences corresponding to the tenth time-frequency resource group can also be pairwise orthogonal, and further, the reference signal of the eighth time-frequency resource group and/or the reference signal of the ninth time-frequency resource group and/or the reference signal of the tenth time-frequency resource group are/is used as the auxiliary reference signal for the reference signal of the seventh time-frequency resource group.

When the type-2 control channel includes the eighth time-frequency resource group but does not include the ninth time-frequency resource group and the tenth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group and/or the reference signal of the tenth time-frequency resource group are/is used as the auxiliary reference signal for the reference signal of the seventh time-frequency resource group, and may be used to demodulate the data signal on the data channel. When the type-2 control channel includes both the eighth time-frequency resource group and the ninth time-frequency resource group but does not include the tenth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel; and the reference signal of the tenth time-frequency resource group is used as the reference signal of the seventh time-frequency resource group, and may be used to demodulate the data signal on the data channel. When the type-2 control channel includes the eighth time-frequency resource group, the ninth time-frequency resource group, and the tenth time-frequency resource group, the reference signal of the eighth time-frequency resource group, the reference signal of the ninth time-frequency resource group, and the reference signal of the tenth time-frequency resource group are used as the auxiliary reference signals for the reference signal of the seventh time-frequency resource group, and may be used to demodulate the control signal on the type-2 control channel, and may also be used to demodulate the data signal on the data channel.

In a sixteenth possible implementation of the first aspect of the present disclosure, after the obtaining a mapped sequence of a third sequence group, the method further includes: mapping the four reference signals corresponding to the mapped sequence, to the fifth time-frequency resource group and the sixth time-frequency resource group respectively based on the third preset rule, so that even power allocation in time domain and frequency domain is implemented for reference signals on the first OFDM symbol in the data region, the second OFDM symbol in the data region, the $i^{th}$ OFDM symbol in the data region, and the $j^{th}$ OFDM symbol in the data region.

Because the four reference signals corresponding to the mapped sequence are mapped to the fifth time-frequency resource group and the sixth time-frequency resource group respectively based on the third preset rule, even power allocation in time domain and even power allocation in frequency domain can be implemented for the reference signal of the fifth time-frequency resource group and the reference signal of the sixth time-frequency resource group on the time domain OFDM symbols corresponding to the fifth time-frequency resource group and the sixth time-frequency resource group. This improves stability of information transmission, and ensures accuracy and a success ratio of information transmission.

In a seventeenth possible implementation of the first aspect of the present disclosure, when a length of a sequence corresponding to a reference signal of each antenna port is 4, M is 4, and N is 4, the specified time-frequency resource includes an eleventh time-frequency resource group and a twelfth time-frequency resource group, where each time-frequency resource group corresponds to four antenna ports; and the mapping the N reference signals corresponding to the N sequences, to the specified time-frequency resource includes: mapping four reference signals corresponding to the four sequences, to the eleventh time-frequency resource group and the twelfth time-frequency resource group respectively; where the eleventh time-frequency resource group and the twelfth time-frequency resource group respectively include any four non-overlapping REs of the first OFDM symbol in the data region, and a reference signal of the eleventh time-frequency resource group and a reference signal of the twelfth time-frequency resource group are used to demodulate a data signal.

In the foregoing reference signal mapping method, eight antenna ports can be mapped to a time-frequency resource including eight REs, and therefore eight reference signals can be transmitted simultaneously. It should be noted that, when the type-1 control channel occupies a first OFDM symbol of the PRB, the type-2 control channel occupies a second OFDM symbol of the PRB, and the data channel occupies another OFDM symbol of the PRB, reference signals corresponding to the four antenna ports may be used to demodulate a data signal, or may be used to demodulate a control signal on the type-2 control channel.

In an eighteenth possible implementation of the first aspect of the present disclosure, the method further includes: mapping four reference signals corresponding to four sequences in the orthogonal sequence group, to the eleventh time-frequency resource group and the twelfth time-frequency resource group respectively based on a fourth preset rule, so that even power allocation in frequency domain is implemented for reference signals on the first OFDM symbol in the data region.

Because the four reference signals corresponding to the four sequences are mapped to the eleventh time-frequency resource group and the twelfth time-frequency resource group respectively based on the fourth preset rule, even power allocation in frequency domain can be implemented for reference signals of the eleventh time-frequency resource group and the twelfth time-frequency resource group on the first OFDM symbol in the data region. This improves stability of information transmission, and ensures accuracy and a success ratio of information transmission.

In a nineteenth possible implementation of the first aspect of the present disclosure, after the mapping four reference signals corresponding to the four sequences, to the eleventh time-frequency resource group and the twelfth time-frequency resource group respectively, the method further includes: selecting two antenna ports from four antenna ports corresponding to the eleventh time-frequency resource group and two antenna ports from four antenna ports corresponding to the twelfth time-frequency resource group, for data channel multiplexing and control channel multiplexing.

Because the two antenna ports are selected from the four antenna ports corresponding to the eleventh time-frequency resource group and the two antenna ports are selected from the four antenna ports corresponding to the twelfth time-frequency resource group, for data channel multiplexing and control channel multiplexing, a control signal and a data signal can be quickly demodulated.

In a twentieth possible implementation of the first aspect of the present disclosure, the first indication information further includes time-frequency resource extension indication information, the time-frequency resource extension indication information is used to indicate that the time-frequency resource on which the at least one reference signal is located includes a first extended time-frequency resource group, and the first extended time-frequency resource is a plurality of REs on a preset OFDM symbol; or the first indication information is further used to indicate that the specified time-frequency resource further includes a second extended time-frequency resource, and correspondingly, the first indication information further includes location information of the second extended time-frequency resource.

Because the time-frequency resource extension indication information is transmitted to the user equipment, when reference signals mapped by using different mapping methods exist in a same PRB, and port information of antenna ports corresponding to different reference signals is the same, the user equipment can determine a time-frequency resource location for receiving a reference signal and a corresponding antenna port.

In a twenty-first possible implementation of the first aspect of the present disclosure, before the transmitting first indication information to the user equipment, the method further includes: transmitting second indication information to the user equipment, where the second indication information is used to indicate a time-frequency resource location of the type-2 control channel.

Because the second indication information used to indicate the time-frequency resource location of the type-2 control channel is transmitted to the user equipment, when the first indication information is transmitted by using the type-2 control channel, the user equipment can learn the time-frequency resource location of the type-2 control channel, and can further wait for receiving the first indication information in the time-frequency resource location of the type-2 control channel. This prevents the user equipment from frequently monitoring the control channel and can further improve signal receiving efficiency.

In a twenty-second possible implementation of the first aspect of the present disclosure, the orthogonal sequence group is a Walsh-Hadamard sequence group.

By using the Walsh-Hadamard sequence group as the orthogonal sequence group, code division multiplexing is implemented on a plurality of REs jointly occupied by a plurality of antenna ports.

According to a second aspect, a reference signal mapping method is provided, and the method includes:

receiving first indication information, where the first indication information includes port information of a first preset antenna port;

detecting whether the first indication information includes time-frequency resource extension indication information;

if the first indication information does not include the time-frequency resource extension indication information, receiving at least one reference signal on a first preset time-frequency resource group, where the first preset time-frequency resource group is a time-frequency resource group corresponding to the first preset antenna port;

if the first indication information includes the time-frequency resource extension indication information, receiving the at least one reference signal on a second preset time-frequency resource group, where the second preset time-frequency resource group includes the first preset time-frequency resource group and an extended time-frequency resource group; and demodulating a control signal and/or a data signal based on the at least one reference signal.

Whether the first indication information includes the time-frequency resource extension indication information is detected. Therefore, when reference signals mapped by using different mapping methods exist in a same PRB, and port information of antenna ports corresponding to different reference signals is the same, a time-frequency resource location for receiving a reference signal and a corresponding antenna port can be determined.

In a first possible implementation of the second aspect of the present disclosure, the time-frequency resource extension indication information is used to indicate that a time-frequency resource on which the at least one reference signal is located includes the extended time-frequency resource group, and the extended time-frequency resource group includes a plurality of REs on a preset OFDM symbol.

By receiving the time-frequency resource extension indication information transmitted by the base station and used to indicate that the time-frequency resource on which the at least one reference signal is located includes the extended time-frequency resource group, the user equipment can determine the first preset time-frequency resource group, and receive the reference signal on the plurality of REs on the preset OFDM symbol.

In a second possible implementation of the second aspect of the present disclosure, the time-frequency resource extension indication information includes location information of the extended time-frequency resource group.

By receiving the time-frequency resource extension indication information transmitted by the base station and including the location information of the extended time-frequency resource group, the user equipment can determine the first preset time-frequency resource group, and receive the reference signal on the extended time-frequency resource group.

According to a third aspect, a reference signal mapping apparatus is provided, and the apparatus includes:

a processing unit, configured to map N reference signals to a specified time-frequency resource, where N is a positive integer greater than or equal to 1; and a transmission unit, configured to transmit at least one of the N reference signals on the specified time-frequency resource to user equipment, where for any physical resource block (PRB), the specified time-frequency resource includes a first orthogonal frequency division multiplexing (OFDM) symbol in a data region in time domain; where the PRB includes a type-1 control channel and the data region, the data region includes a type-2 control channel and a data channel, the type-1 control channel includes first m OFDM symbols of the PRB in time domain, and the data region includes OFDM symbols other than the type-1 control channel in the PRB in time domain; and the type-2 control channel includes first n OFDM symbols in the data region in time domain, the data channel includes OFDM symbols other than the type-2 control channel in the data region in time domain, and m and n are both positive integers greater than or equal to 1.

Because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased.

In a first possible implementation of the third aspect of the present disclosure, the specified time-frequency resource includes the data channel.

Because the reference signals are mapped to the specified time-frequency resource including the data channel, the quantity of concurrent multiplex on the data channel and the quantity of user equipments multiplexed on the control channel can be further increased.

In a second possible implementation of the third aspect of the present disclosure, the processing unit is configured to:

select any N sequences from an orthogonal sequence group, where the orthogonal sequence group includes M pairwise orthogonal sequences, N is a quantity of antenna ports, M and N are both positive integers greater than or equal to 1, and M is not less than N;

generate the N reference signals based on the N sequences; and map the N reference signals corresponding to the N sequences, to the specified time-frequency resource, so that the N reference signals are pairwise orthogonal on the specified time-frequency resource.

Because the reference signals are mapped to the specified time-frequency resource by using the foregoing method, when a plurality of reference signals are mapped to the specified time-frequency resource, a quantity of reference signals transmitted in a PRB can be increased by implementing code division multiplexing by using orthogonal sequences without increasing resource consumption.

In a third possible implementation of the third aspect of the present disclosure, the transmission unit is further configured to:

transmit first indication information to the user equipment, where the first indication information includes port information of a first preset antenna port, and the first preset antenna port is configured to transmit the at least one reference signal; and correspondingly, the transmission unit is configured to transmit the at least one reference signal on the first preset antenna port to the user equipment.

Because the first indication information including the port information is transmitted to the user equipment, the user equipment can determine, based on the port information, an antenna port for receiving the at least one reference signal.

In a fourth possible implementation of the third aspect of the present disclosure, when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further includes a subframe location of a subframe in which the at least one reference signal is located, and correspondingly, a time-frequency resource corresponding to the first preset antenna port is located in a data region of a second PRB, where the second PRB is at least one PRB corresponding to the subframe in which the at least one reference signal is located; or when the first indication information is transmitted on the type-1 control channel in a subframe in which the PRB is located, the first indication information further includes a subframe location of a subframe in which the at least one reference signal is located, and correspondingly, a time-frequency resource corresponding to the first preset antenna port is located in a data region of a third PRB, where the third PRB includes at least one PRB in the subframe in which the PRB is located and at least one PRB corresponding to the subframe in which the at least one reference signal is located.

Because a time-frequency resource location of the reference signal is indicated to the user equipment by using different methods based on different locations of reference signals, the user equipment can determine a corresponding time-frequency resource location based on the first indication information, so as to receive the reference signal. This can improve reference signal transmission efficiency and avoid signal transmission failure.

In a fifth possible implementation of the third aspect of the present disclosure, when a length of a sequence corresponding to a reference signal of each antenna port is 4, M is 4, and N is 2, the specified time-frequency resource includes a first time-frequency resource group and a second time-frequency resource group, where each time-frequency resource group corresponds to two antenna ports; and the processing unit is configured to:

obtain a mapped sequence of a first sequence group, where the first sequence group includes a first sequence and a second sequence, and the first sequence and the second sequence are two sequences selected from the orthogonal sequence group; and map two reference signals corresponding to the mapped sequence, to the first time-frequency resource group and the second time-frequency resource group respectively; where the first time-frequency resource group and the second time-frequency resource group respectively include two REs of the first OFDM symbol in the data region and two REs of a second OFDM symbol in the data region, where the two REs of the first OFDM symbol and the two REs of the second OFDM symbol occupy subcarriers of a same frequency; and the reference signal of the first time-frequency resource group and the reference signal of the second time-frequency resource group are used to demodulate a data signal.

Because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, the low-latency requirement of the 5G communications network is satisfied, code division multiplexing is implemented by using orthogonal sequences, and the quantity of concurrent multiplex on the data channel and the quantity of user equipments multiplexed on the control channel are increased.

In a sixth possible implementation of the third aspect of the present disclosure, the specified time-frequency resource further includes a third time-frequency resource group and a fourth time-frequency resource group, and each time-frequency resource group corresponds to two antenna ports; and correspondingly, the processing unit is further configured to:

map a reference signal corresponding to a third sequence in a second sequence group, to the first time-frequency resource group and the second time-frequency resource group respectively based on a first preset rule; and map a reference signal corresponding to a fourth sequence in the second sequence group, to the first time-frequency resource group and the second time-frequency resource group respectively based on the first preset rule, so that a third sequence group corresponding to the third time-frequency resource group includes the third sequence and the fourth sequence; where the second sequence group includes the third sequence and the fourth sequence other than the first sequence group in the orthogonal sequence group;

the third time-frequency resource group includes the four REs of the first OFDM symbol that are in the first time-frequency resource group and the second time-frequency resource group and are located in the data region, and the fourth time-frequency resource group includes the four REs of the second OFDM symbol that are in the first time-frequency resource group and the second time-frequency resource group and are located in the data region; and a reference signal of the third time-frequency resource group is used to demodulate a data signal and/or a control signal.

In the foregoing mapping manner, by using orthogonal sequences, a reference signal transmitted on an antenna port corresponding to the third time-frequency resource group can be orthogonal to reference signals transmitted on antenna ports corresponding to the first time-frequency resource group and the second time-frequency resource group. In addition, when a time-frequency resource occupied by the type-2 control channel includes the third time-frequency resource group, the reference signal of the antenna port corresponding to the third time-frequency resource group may be used to demodulate a control signal on the type-2 control channel and a data signal on the data channel, and the control signal can be quickly demodulated; or when a time-frequency resource occupied by the type-2 control channel does not include the third time-frequency resource group, the reference signal of the antenna port corresponding to the third time-frequency resource group may be used to demodulate a data signal.

In a seventh possible implementation of the third aspect of the present disclosure, the processing unit is further configured to:

when n is greater than or equal to 2, obtain, based on a mapping result of the second sequence group in the first time-frequency resource group and the second time-frequency resource group, a fourth sequence group corresponding to the fourth time-frequency resource group, where the first preset rule causes the fourth sequence group obtained based on the mapping result to be the same as the third sequence group, and a reference signal of the fourth time-frequency resource group is used as an auxiliary reference signal for the reference signal of the third time-frequency resource group.

Because the reference signal of the fourth time-frequency resource group is used as the auxiliary reference signal for the reference signal of the third time-frequency resource group, a success ratio of demodulating the control signal and the data signal can be increased.

In an eighth possible implementation of the third aspect of the present disclosure, the processing unit is further configured to:

map two reference signals corresponding to the mapped sequence, to the first time-frequency resource group and the second time-frequency resource group respectively based on the first preset rule, so that even power allocation in time domain and frequency domain is implemented for reference signals on the first OFDM symbol in the data region and the second OFDM symbol in the data region.

Because the two reference signals corresponding to the mapped sequence are mapped to the first time-frequency resource group and the second time-frequency resource group respectively based on the first preset rule, even power allocation in time domain and even power allocation in frequency domain can be implemented for the reference signals of the first time-frequency resource group and the second time-frequency resource group on the first OFDM symbol and the second OFDM symbol in the data region. This reduces signal distortion caused by power fluctuation of a transmitter, improves stability of information transmission, and ensures accuracy and a success ratio of information transmission.

In a ninth possible implementation of the third aspect of the present disclosure, when a length of a sequence corresponding to a reference signal of each antenna port is 8, M is 8, and N is 8, the processing unit is configured to map eight reference signals corresponding to the eight sequences, to the specified time-frequency resource respectively, where a reference signal corresponding to the specified time-frequency resource is used to demodulate a data signal; where the specified time-frequency resource includes four REs of the first OFDM symbol in the data region and four REs of a second OFDM symbol in the data region, where the four REs of the first OFDM symbol and the four REs of the second OFDM symbol occupy subcarriers of a same frequency.

By performing the mapping, eight antenna ports can be mapped to a time-frequency resource including eight REs, and therefore eight reference signals can be transmitted simultaneously, so that the reference signals do not need to span the whole time-frequency resource. A reference signal used to demodulate a data signal is transmitted only when the data signal is transmitted. Therefore, code division multiplexing is implemented by using orthogonal sequences, and the quantity of concurrent multiplex on the data channel and the quantity of user equipments multiplexed on the control channel are increased.

In a tenth possible implementation of the third aspect of the present disclosure, the processing unit is further configured to:

map the eight reference signals corresponding to the eight sequences, to the specified time-frequency resource respectively based on a second preset rule, so that the specified time-frequency resource has four pairwise orthogonal sequences on the four REs of the first OFDM symbol in the data region, where reference signals corresponding to the four REs of the first OFDM symbol are used to demodulate a control signal and/or a data signal.

In the foregoing mapping manner, the specified time-frequency resource can have four pairwise orthogonal sequences on the four REs of the first OFDM symbol in the data region. In addition, when the time-frequency resource occupied by the type-2 control channel includes the four REs, four corresponding antenna ports may be shared by the data channel and the control channel. To be specific, the four antenna ports may transmit a reference signal used to demodulate a control signal, and may transmit a reference signal used to demodulate a data signal.

In an eleventh possible implementation of the third aspect of the present disclosure, when a length of a sequence corresponding to a reference signal of each antenna port is 8, M is 8, and N is 4, the specified time-frequency resource includes a fifth time-frequency resource group and a sixth time-frequency resource group, where each time-frequency resource group corresponds to four antenna ports; and the processing unit is configured to:

obtain a mapped sequence of a third sequence group, where the third sequence group includes the four sequences selected from the orthogonal sequence group; and map four reference signals corresponding to the mapped sequence, to the fifth time-frequency resource group and the sixth time-frequency resource group respectively; where the fifth time-frequency resource group and the sixth time-frequency resource group respectively include two REs of the first OFDM symbol, two REs of a second OFDM symbol, two REs of an $i^{th}$ OFDM symbol, and two REs of a $j^{th}$ OFDM symbol in the data region, where the two REs of the first OFDM symbol, the two REs of the second OFDM symbol, the two REs of the $i^{th}$ OFDM symbol, and the two REs of the $j^{th}$ OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal.

By performing the mapping, eight antenna ports can be mapped to a time-frequency resource including 16 REs, and therefore eight reference signals can be transmitted simultaneously. It should be noted that, when the type-1 control channel occupies a first OFDM symbol of the PRB, the type-2 control channel occupies a second OFDM symbol of the PRB, and the data channel occupies another OFDM symbol of the PRB, reference signals corresponding to the eight antenna ports may be used to demodulate a data signal; when the type-1 control channel occupies a first OFDM symbol of the PRB, the type-2 control channel occupies a second OFDM symbol and a third OFDM symbol of the PRB, and the data channel occupies another OFDM symbol of the PRB, reference signals corresponding to the eight antenna ports may be used to demodulate a data signal, or may be used to demodulate a control signal on the type-2 control channel.

In a twelfth possible implementation of the third aspect of the present disclosure, the specified time-frequency resource further includes a seventh time-frequency resource group, the seventh time-frequency resource group includes the four REs of the first OFDM symbol that are in the fifth time-frequency resource group and the sixth time-frequency resource group and are located in the data region, and the seventh time-frequency resource group corresponds to four antenna ports; and correspondingly, the processing unit is further configured to:

map four reference signals corresponding to four sequences other than the four sequences included in the third sequence group in the orthogonal sequence group, to the fifth time-frequency resource group and the sixth time-frequency resource group respectively based on a third preset rule to obtain a mapping result, so that four sequences of the seventh time-frequency resource group in the mapping result are pairwise orthogonal, where a reference signal of the seventh time-frequency resource group is used to demodulate a data signal and/or a control signal.

In the foregoing mapping manner, by using orthogonal sequences, the reference signal of the seventh time-frequency resource group can be orthogonal to reference signals of the fifth time-frequency resource group and the sixth time-frequency resource group. In addition, when a time-frequency resource occupied by the type-2 control channel includes the seventh time-frequency resource group, the reference signal of the seventh time-frequency resource group may be used to demodulate a control signal on the type-2 control channel and a data signal on the data channel, and the control signal can be quickly demodulated.

In a thirteenth possible implementation of the third aspect of the present disclosure, the specified time-frequency resource further includes an eighth time-frequency resource group, the eighth time-frequency resource group includes the four REs of the second OFDM symbol that are in the fifth time-frequency resource group and the sixth time-frequency resource group and are located in the data region, and the eighth time-frequency resource group corresponds to four antenna ports; and correspondingly, the processing unit is further configured to:

when n is greater than or equal to 2 and less than i, obtain, based on the mapping result, four sequences corresponding to the eighth time-frequency resource group, where the third preset rule causes the four sequences corresponding to the eighth time-frequency resource group and obtained based on the mapping result to be pairwise orthogonal, and a reference signal of the eighth time-frequency resource group is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal, and further, the reference signal of the eighth time-frequency resource group is used as the auxiliary reference signal for the reference signal of the seventh time-frequency resource group.

In a fourteenth possible implementation of the third aspect of the present disclosure, the specified time-frequency resource further includes a ninth time-frequency resource group, the ninth time-frequency resource group includes the four REs of the $i^{th}$ OFDM symbol that are in the fifth time-frequency resource group and the sixth time-frequency resource group and are located in the data region, and the ninth time-frequency resource group corresponds to four antenna ports; and correspondingly, the processing unit is further configured to:

obtain, based on the mapping result, four sequences corresponding to an eighth time-frequency resource group and four sequences corresponding to the ninth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal, and a reference signal of the eighth time-frequency resource group and/or a reference signal of the ninth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal, and further, the reference signal of the eighth time-frequency resource group and/or the reference signal of the ninth time-frequency resource group are/is used as the auxiliary reference signal for the reference signal of the seventh time-frequency resource group.

When the type-2 control channel includes the eighth time-frequency resource group but does not include the ninth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group is used as the auxiliary reference signal for the reference signal of the seventh time-frequency resource group, and may be used to demodulate the data signal on the data channel. When the type-2 control channel includes both the eighth time-frequency resource group and the ninth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel.

In a fifteenth possible implementation of the third aspect of the present disclosure, the specified time-frequency resource further includes a tenth time-frequency resource group, the tenth time-frequency resource group includes the four REs of the $j^{th}$ OFDM symbol that are in the fifth time-frequency resource group and the sixth time-frequency resource group and are located in the data region, and the tenth time-frequency resource group corresponds to four antenna ports; and correspondingly, the processing unit is further configured to:

obtain, based on the mapping result, four sequences corresponding to an eighth time-frequency resource group, four sequences corresponding to a ninth time-frequency resource group, and four sequences corresponding to the tenth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal and/or causes the four sequences corresponding to the tenth time-frequency resource group and obtained based on the mapping result to be pairwise orthogonal, and a reference signal of the eighth time-frequency resource group and/or a reference signal of the ninth time-frequency resource group and/or a reference signal of the tenth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal and/or the four sequences corresponding to the tenth time-frequency resource group can also be pairwise orthogonal, and further, the reference signal of the eighth time-frequency resource group and/or the reference signal of the ninth time-frequency resource group and/or the reference signal of the tenth time-frequency resource group are/is used as the auxiliary reference signal for the reference signal of the seventh time-frequency resource group.

When the type-2 control channel includes the eighth time-frequency resource group but does not include the ninth time-frequency resource group and the tenth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group and/or the reference signal of the tenth time-frequency resource group are/is used as the auxiliary reference signal for the reference signal of the seventh time-frequency resource group, and may be used to demodulate the data signal on the data channel. When the type-2 control channel includes both the eighth time-frequency resource group and the ninth time-frequency resource group but does not include the tenth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel; and the reference signal of the tenth time-frequency resource group is used as the reference signal of the seventh time-frequency resource group, and may be used to demodulate the data signal on the data channel. When the type-2 control channel includes the eighth time-frequency resource group, the ninth time-frequency resource group, and the tenth time-frequency resource group, the reference signal of the eighth time-frequency resource group, the reference signal of the ninth time-frequency resource group, and the reference signal of the tenth time-frequency resource group are used as the auxiliary reference signals for the reference signal of the seventh time-frequency resource group, and may be used to demodulate the control signal on the type-2 control channel, and may also be used to demodulate the data signal on the data channel.

In a sixteenth possible implementation of the third aspect of the present disclosure, the processing unit is further configured to:

map the four reference signals corresponding to the mapped sequence, to the fifth time-frequency resource group and the sixth time-frequency resource group respectively based on the third preset rule, so that even power allocation in time domain and frequency domain is implemented for reference signals on the first OFDM symbol in the data region, the second OFDM symbol in the data region, the $i^{th}$ OFDM symbol in the data region, and the $j^{th}$ OFDM symbol in the data region.

Because the four reference signals corresponding to the mapped sequence are mapped to the fifth time-frequency resource group and the sixth time-frequency resource group respectively based on the third preset rule, even power allocation in time domain and even power allocation in frequency domain can be implemented for the reference signal of the fifth time-frequency resource group and the reference signal of the sixth time-frequency resource group on the time domain OFDM symbols corresponding to the fifth time-frequency resource group and the sixth time-frequency resource group. This improves stability of information transmission, and ensures accuracy and a success ratio of information transmission.

In a seventeenth possible implementation of the third aspect of the present disclosure, when a length of a sequence corresponding to a reference signal of each antenna port is 4, M is 4, and N is 4, the specified time-frequency resource includes an eleventh time-frequency resource group and a twelfth time-frequency resource group, where each time-frequency resource group corresponds to four antenna ports; and the processing unit is configured to:

map four reference signals corresponding to the four sequences, to the eleventh time-frequency resource group and the twelfth time-frequency resource group respectively; where the eleventh time-frequency resource group and the twelfth time-frequency resource group respectively include any four non-overlapping REs of the first OFDM symbol in the data region, and a reference signal of the eleventh time-frequency resource group and a reference signal of the twelfth time-frequency resource group are used to demodulate a data signal.

In the foregoing reference signal mapping method, eight antenna ports can be mapped to a time-frequency resource including eight REs, and therefore eight reference signals can be transmitted simultaneously. It should be noted that, when the type-1 control channel occupies a first OFDM symbol of the PRB, the type-2 control channel occupies a second OFDM symbol of the PRB, and the data channel occupies another OFDM symbol of the PRB, reference signals corresponding to the four antenna ports may be used to demodulate a data signal, or may be used to demodulate a control signal on the type-2 control channel.

In an eighteenth possible implementation of the third aspect of the present disclosure, the processing unit is further configured to:

map four reference signals corresponding to four sequences in the orthogonal sequence group, to the eleventh time-frequency resource group and the twelfth time-frequency resource group respectively based on a fourth preset rule, so that even power allocation in frequency domain is implemented for reference signals on the first OFDM symbol in the data region.

Because the four reference signals corresponding to the four sequences are mapped to the eleventh time-frequency resource group and the twelfth time-frequency resource group respectively based on the fourth preset rule, even power allocation in frequency domain can be implemented for reference signals of the eleventh time-frequency resource group and the twelfth time-frequency resource group on the first OFDM symbol in the data region. This improves stability of information transmission, and ensures accuracy and a success ratio of information transmission.

In a nineteenth possible implementation of the third aspect of the present disclosure, the processing unit is further configured to:

select two antenna ports from four antenna ports corresponding to the eleventh time-frequency resource group and two antenna ports from four antenna ports corresponding to the twelfth time-frequency resource group, for data channel multiplexing and control channel multiplexing.

Because the two antenna ports are selected from the four antenna ports corresponding to the eleventh time-frequency resource group and the two antenna ports are selected from the four antenna ports corresponding to the twelfth time-frequency resource group, for data channel multiplexing and control channel multiplexing, a control signal and a data signal can be quickly demodulated.

In a twentieth possible implementation of the third aspect of the present disclosure, the indication information is further used to indicate that the specified time-frequency resource further includes a first extended time-frequency resource, and the first extended time-frequency resource is a plurality of REs on a preset OFDM symbol; or the indication information is further used to indicate that the specified time-frequency resource further includes a second extended time-frequency resource, and correspondingly, the indication information further includes location information of the second extended time-frequency resource.

Because the time-frequency resource extension indication information is transmitted to the user equipment, when reference signals mapped by using different mapping methods exist in a same PRB, and port information of antenna ports corresponding to different reference signals is the same, the user equipment can determine a time-frequency resource location for receiving a reference signal and a corresponding antenna port.

In a twenty-first possible implementation of the third aspect of the present disclosure, the transmission unit is further configured to: transmit second indication information to the user equipment, where the second indication information is used to indicate a time-frequency resource location of the type-2 control channel.

Because the second indication information used to indicate the time-frequency resource location of the type-2 control channel is transmitted to the user equipment, when the first indication information is transmitted by using the type-2 control channel, the user equipment can learn the time-frequency resource location of the type-2 control channel, and can further wait for receiving the first indication information in the time-frequency resource location of the type-2 control channel. This prevents the user equipment from frequently monitoring the control channel and can further improve signal receiving efficiency.

In a twenty-second possible implementation of the third aspect of the present disclosure, the orthogonal sequence group is a Walsh-Hadamard sequence group.

By using the Walsh-Hadamard sequence group as the orthogonal sequence group, code division multiplexing is implemented on a plurality of REs jointly occupied by a plurality of antenna ports.

According to a fourth aspect, a reference signal mapping apparatus is provided, and the apparatus includes:

a receiving unit, configured to receive first indication information, where the first indication information includes at least port information of a first preset antenna port; and a processing unit, configured to detect whether the first indication information includes time-frequency resource extension indication information; where the receiving unit is further configured to receive at least one reference signal on a first preset time-frequency resource group if the first indication information does not include the time-frequency resource extension indication information, where the first preset time-frequency resource group is a time-frequency resource group corresponding to the first preset antenna port;

the receiving unit is further configured to receive the at least one reference signal on a second preset time-frequency resource group if the first indication information includes the time-frequency resource extension indication information, where the second preset time-frequency resource group includes the first preset time-frequency resource group and an extended time-frequency resource group; and the processing unit is further configured to demodulate a control signal and/or a data signal based on the at least one reference signal.

Whether the first indication information includes the time-frequency resource extension indication information is detected. Therefore, when reference signals mapped by using different mapping methods exist in a same PRB, and port information of antenna ports corresponding to different reference signals is the same, a time-frequency resource location for receiving a reference signal and a corresponding antenna port can be determined.

In a first possible implementation of the fourth aspect of the present disclosure, the time-frequency resource extension indication information is used to indicate that a time-frequency resource on which the at least one reference signal is located includes the extended time-frequency resource group, and the extended time-frequency resource group includes a plurality of REs on a preset OFDM symbol.

By receiving the time-frequency resource extension indication information transmitted by the base station and used to indicate that the time-frequency resource on which the at least one reference signal is located includes the extended time-frequency resource group, the user equipment can determine the first preset time-frequency resource group, and receive the reference signal on the plurality of REs on the preset OFDM symbol.

In a second possible implementation of the fourth aspect of the present disclosure, the time-frequency resource extension indication information includes location information of the extended time-frequency resource group.

By receiving the time-frequency resource extension indication information transmitted by the base station and including the location information of the extended time-frequency resource group, the user equipment can determine the first preset time-frequency resource group, and receive the reference signal on the extended time-frequency resource group.

BRIEF DESCRIPTION OF DRAWINGS

FIG. 4B-1 and FIG. 4B-2 are a flowchart of a reference signal mapping method according to an embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with the present disclosure. On the contrary, they are only examples of apparatuses and methods that are described in the appended claims in detail and that are consistent with some aspects of the present disclosure.

Figure 1A:
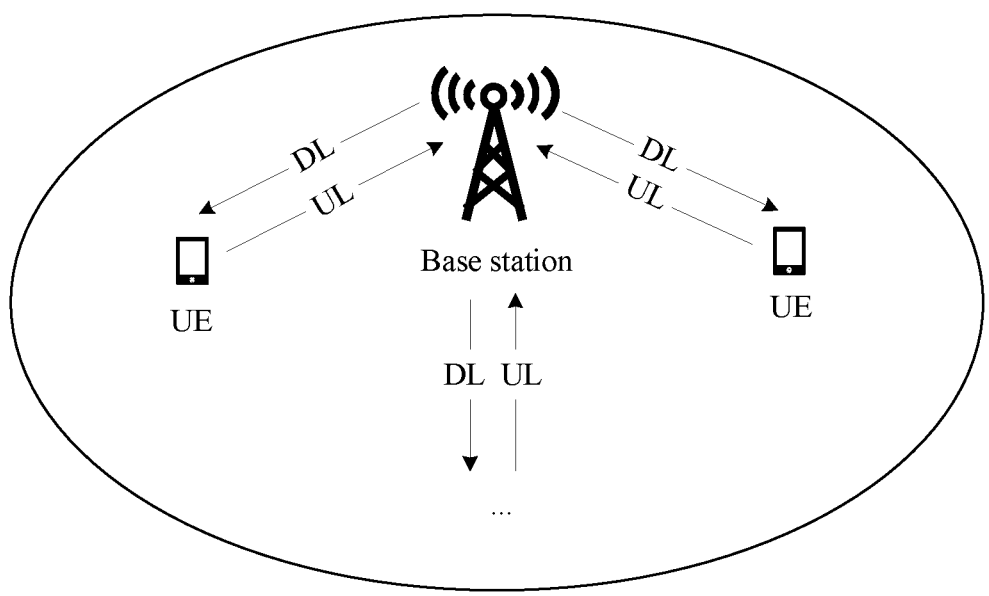
FIG. 1A is a schematic diagram of an LTE communications system according to an embodiment of the present disclosure.

FIG. 1A is a schematic diagram of an LTE communications system according to an embodiment of the present disclosure. In the LTE communications system, a downlink (DL) is a physical channel for a signal from a base station to UE, and an uplink (UL) is a physical channel for a signal from the user equipment (UE) to the base station. In FIG. 1A, " . . . " denotes more other UEs that establish communications connections to the base station.

Data is transmitted between the base station and the UE in units of radio frames. In the DL, each radio frame is made up of subframes in time domain, each subframe includes two slots, and each slot includes a fixed quantity of OFDM symbols. One subframe corresponds to a plurality of physical resource blocks (PRB).

Figure 1B:
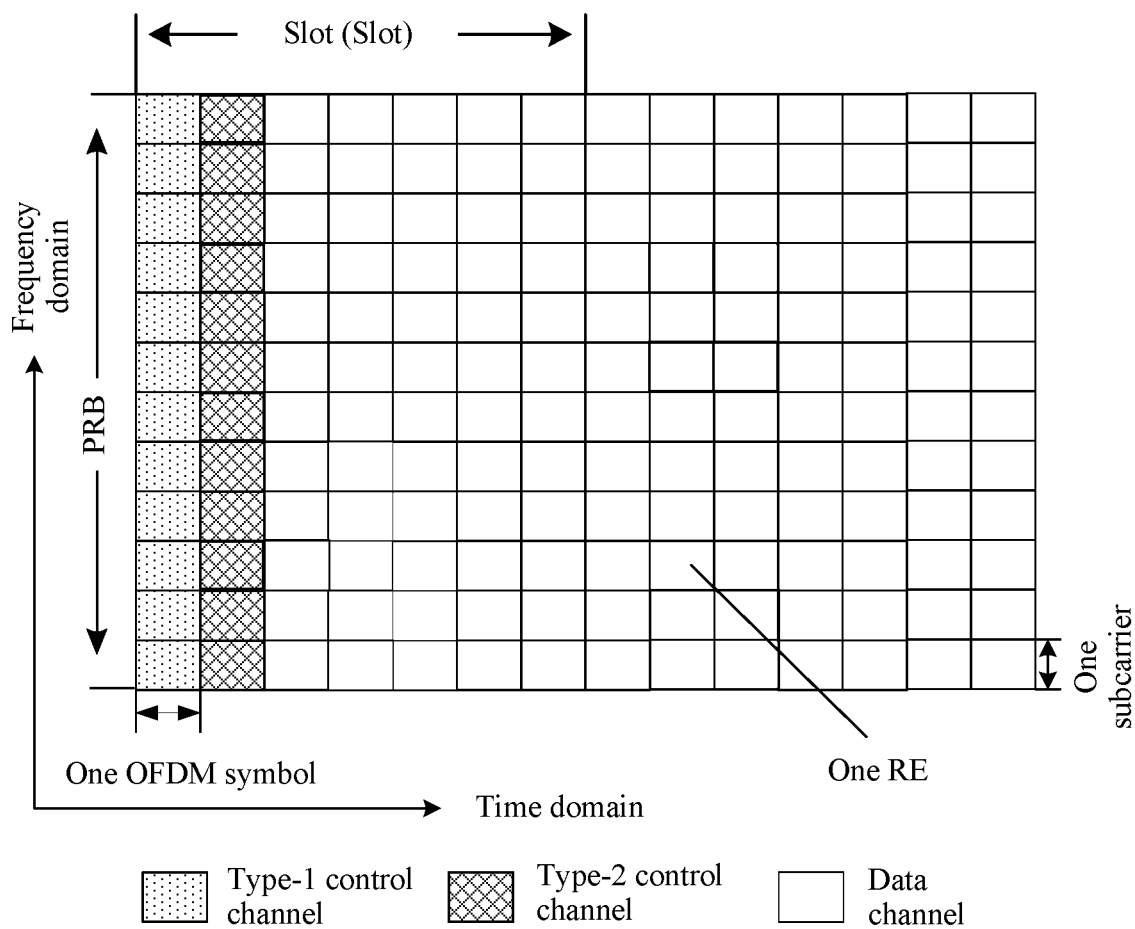
FIG. 1B is a schematic structural diagram of a PRB according to an embodiment of the present disclosure.

In the LTE system, a minimum scheduling granularity is a PRB. Each PRB includes 14 orthogonal frequency division multiplexing (OFDM) symbols in time domain, and includes 12 subcarriers in frequency domain. A time-frequency resource occupied by each subcarrier and each OFDM symbol is referred to as a resource element (RE), and one PRB includes 168 REs, as shown in FIG. 1B.

In this embodiment of the present disclosure, for any PRB, the PRB includes a type-1 control channel and a data region, where the data region includes a type-2 control channel and a data channel; the type-1 control channel includes first m OFDM symbols of the PRB in time domain, and the data region includes OFDM symbols other than the type-1 control channel in the PRB in time domain; and the type-2 control channel includes first n OFDM symbols in the data region in time domain, the data channel includes OFDM symbols other than the type-2 control channel in the data region in time domain, and m and n are both positive integers greater than or equal to 1.

It should be noted that, the type-1 control channel including the first m OFDM symbols of the PRB in time domain may include all REs of the first m OFDM symbols of the PRB in frequency domain, or may include some REs of the first m OFDM symbols of the PRB in frequency domain; and the type-2 control channel including the first n OFDM symbols in the data region in time domain may include all REs of the first n OFDM symbols in the data region in frequency domain, or may include some REs of the first n OFDM symbols in the data region in frequency domain. This is not specifically limited in this embodiment of the present disclosure.

The type-1 control channel is used to transmit location information of a time-frequency resource on which a reference signal is located in the PRB. The type-2 control channel and the data channel in the data region are used to transmit the reference signal, control information, and data information. The reference signal is used to demodulate a control signal and a data signal in the data region.

In the embodiments of the present disclosure, based on a quantity and different locations of REs occupied by a reference signal in a PRB, a specific reference signal mapping process is described in detail.

Embodiment 1

Figure 2A:
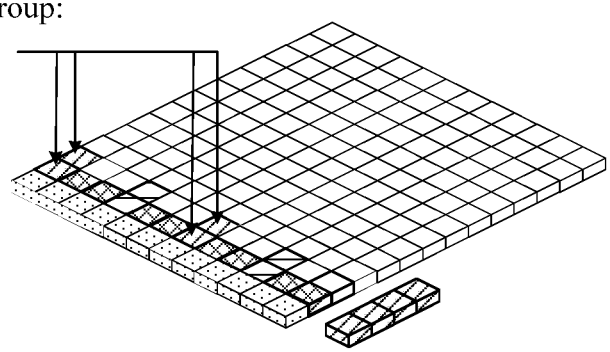
FIG. 2A is a schematic diagram of a specified time-frequency resource according to an embodiment of the present disclosure.
Figure 2A:
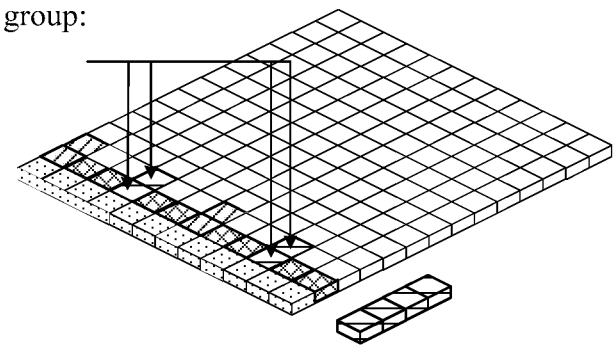

When a length of a sequence corresponding to a reference signal of each antenna port is 4, that is, when the reference signal of each antenna port occupies four REs in a PRB, as shown in FIG. 2A, a time-frequency resource to which arrows point in an upper figure in FIG. 2A is four REs occupied by a reference signal of an antenna port 1 and a reference signal of an antenna port 2, and a time-frequency resource to which arrows point in a lower figure is four REs occupied by a reference signal of an antenna port 3 and a reference signal of an antenna port 4. For the four REs jointly occupied by the antenna port 1 and the antenna port 2, code division multiplexing can be implemented on the corresponding reference signals by using an orthogonal sequence group whose length is 4. Likewise, for the four REs jointly occupied by the antenna port 3 and the antenna port 4, code division multiplexing can also be implemented on the corresponding reference signals by using an orthogonal sequence group whose length is 4.

Figures 1, 2B:
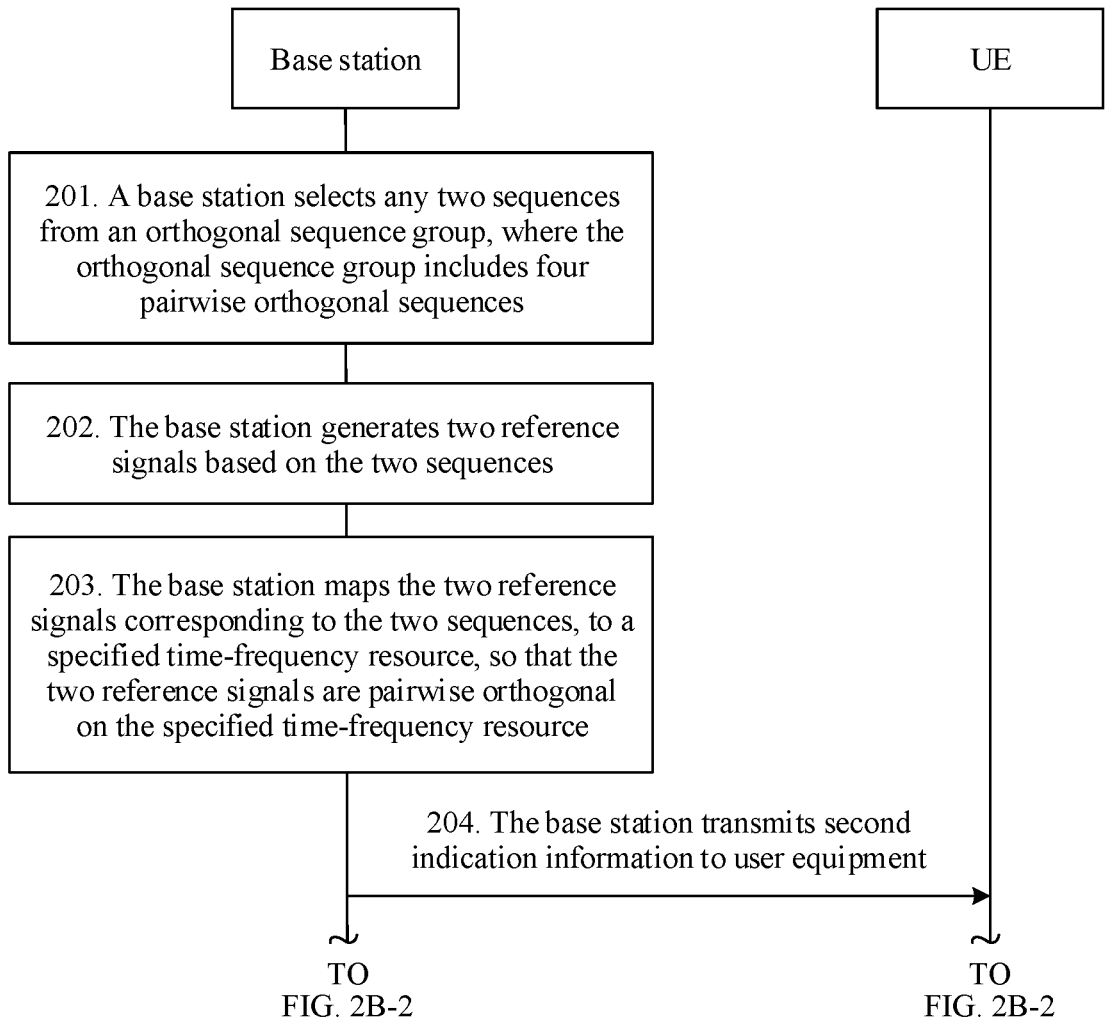
FIG. 2B-1 and FIG. 2B-2 are a flowchart of a reference signal mapping method according to an embodiment of the present disclosure.
Figures 2, 2B:
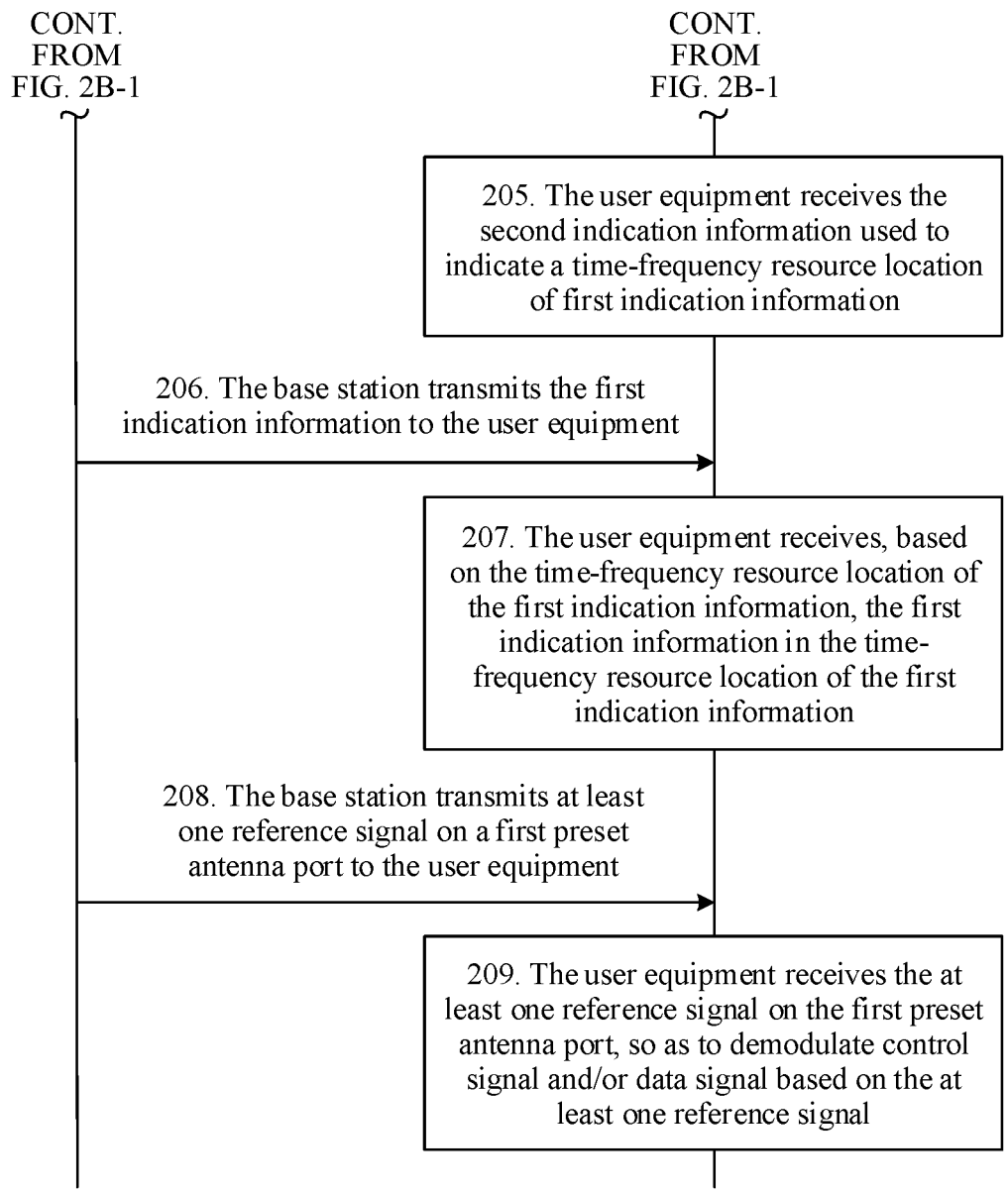

FIG. 2B-1 and FIG. 2B-2 are a flowchart of a reference signal mapping method according to this embodiment of the present disclosure. As shown in FIG. 2B-1 and FIG. 2B-2, the method includes the following steps.

201. A base station selects any two sequences from an orthogonal sequence group, where the orthogonal sequence group includes four pairwise orthogonal sequences.

The orthogonal sequence group includes four pairwise orthogonal sequences. Any two sequences are selected from the orthogonal sequence group, and a quantity of the selected sequences is the same as a quantity of antenna ports.

In another embodiment of the present disclosure, when the orthogonal sequence group is a 4-dimensional Walsh-Hadamard sequence group $W_{OCC}$ shown in a formula (1), any two sequences are selected from the $W_{OCC}$, where the any two sequences may be a first row and a second row of the $W_{OCC}$ sequence group, or may be a second row and a third row of the $W_{OCC}$ sequence group, or any two other rows. This is not limited in this embodiment of the present disclosure.

$$W_{OCC} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} = (a \quad b \quad c \quad d) \quad (1)$$

When the orthogonal sequence group is the 4-dimensional Walsh-Hadamard sequence, code division multiplexing can be implemented on four REs jointly occupied by two antenna ports.

202. The base station generates two reference signals based on the two sequences.

Reference signals corresponding to different antenna ports have different sequences. To be specific, each sequence corresponds to one reference signal. A reference signal generated based on a sequence may be obtained based on a formula (2).

$$a^{(p)}_{i,j} = w_p(j') \cdot r(A \cdot i + B \cdot j + C) \quad (2)$$

where p indicates an antenna port number, j'=D·I+E·j, a value of j' is selected from a set {0 1 2 3}, and "·" indicates a multiplication operation; i indicates a location of a reference signal in a subcarrier in frequency domain, j indicates a location of an OFDM symbol in time domain, and A, B, C, D, and E are all constants; and $w_p(j')$ is a sequence corresponding to an antenna port whose port number is p; for example, when a correspondence between the antenna port p and the sequence is shown in the following Table 1, the sequence corresponding to the antenna port p is obtained from the table, and a reference signal of the antenna port is obtained based on the sequence and the foregoing formula (2). r(A·i+B·j+C) is a Gold sequence sequence (complex random sequence). A process of generating the reference signal may be implemented by referring to a reference signal demodulation method in a 3rd Generation Partnership Project (3GPP) standard. Details are not described herein.

TABLE 1

| Antenna port p | [$w_p(0)$ $w_p(1)$ $w_p(2)$ $w_p(3)$] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [+1 −1 −1 +1] |
| 7 | [+1 +1 −1 −1] |
| 8 | [+1 −1 −1 +1] |

A process of generating a reference signal based on a sequence may be implemented by using the foregoing method, or may be implemented by using another method. The method for generating a reference signal is not limited in this embodiment of the present disclosure.

203. The base station maps the two reference signals corresponding to the two sequences, to a specified time-frequency resource, so that the two reference signals are pairwise orthogonal on the specified time-frequency resource.

In this embodiment of the present disclosure, the specified time-frequency resource includes a first time-frequency resource group and a second time-frequency resource group, where each time-frequency resource group corresponds to two antenna ports. The first time-frequency resource group and the second time-frequency resource group respectively include two REs of a first OFDM symbol in a data region and two REs of a second OFDM symbol in the data region, where the two REs of the first OFDM symbol and the two REs of the second OFDM symbol occupy subcarriers of a same frequency.

For example, in FIG. 2A, the four REs to which the arrows point in the upper figure are the first time-frequency resource group, the four REs to which the arrows point in the lower figure are the second time-frequency resource group, the four REs of the first time-frequency resource group and the second time-frequency resource group on the second OFDM symbol are a third time-frequency resource group, and four REs of the first time-frequency resource group and the second time-frequency resource group on a third OFDM symbol are a fourth time-frequency resource group.

In this embodiment of the present disclosure, assuming that the orthogonal sequence group is the $W_{OCC}$ sequence group shown in the formula (1), the reference signal mapping method provided by the present disclosure is described in detail. It is assumed that the first time-frequency resource group corresponds to the antenna port 1 and the antenna port 2, and that the second time-frequency resource group corresponds to the antenna port 3 and the antenna port 4.

A method for mapping the reference signal transmitted on the antenna port 1 and the reference signal transmitted on the antenna port 2 may be: obtaining a mapped sequence of a first sequence group, where the first sequence group includes a first sequence and a second sequence, and the first sequence and the second sequence are the two sequences selected from the orthogonal sequence group; mapping two reference signals corresponding to the mapped sequence, to the first time-frequency resource group and the second time-frequency resource group respectively; and when the two sequences selected from the $W_{OCC}$ sequence group shown in the formula (1) are sequences of the first row and the second row, that is, when the first sequence is a sequence of the first row of the $W_{OCC}$ and the second sequence is a sequence of the second row of the $W_{OCC}$, mapping the two reference signals corresponding to the two sequences to the first time-frequency resource group.

For the reference signal transmitted on the antenna port 3 and the reference signal transmitted on the antenna port 4, because the second time-frequency resource group corresponding to the antenna port 3 and the antenna port 4 occupies a frequency different from a frequency of subcarriers occupied by the first time-frequency resource group in frequency domain, the reference signal of the second time-frequency resource group is orthogonal to the reference signal of the first time-frequency resource group. Therefore, the sequences of the first row and the second row that are selected from the $W_{OCC}$ sequence group shown in the formula (1) may be used to map the reference signal of the second time-frequency resource group. A specific mapping method is similar to the method for mapping the two reference signals corresponding to the two sequences, to the first time-frequency resource group. Details are not described again herein.

In the foregoing reference signal mapping method, four antenna ports can be mapped to a time-frequency resource including eight REs, and therefore four reference signals can be transmitted simultaneously. It should be noted that, when a type-1 control channel occupies a first OFDM symbol of the PRB, a type-2 control channel occupies a second OFDM symbol of the PRB, and a data channel occupies another OFDM symbol of the PRB, the reference signals corresponding to the four antenna ports may be used to demodulate a data signal; or when a type-1 control channel occupies a first OFDM symbol of the PRB, a type-2 control channel occupies a second OFDM symbol and a third OFDM symbol of the PRB, and a data channel occupies another OFDM symbol of the PRB, the reference signals corresponding to the four antenna ports may be used to demodulate a data signal, or may be used to demodulate a control signal on the type-2 control channel.

In another embodiment of the present disclosure, the specified time-frequency resource further includes a third time-frequency resource group and a fourth time-frequency resource group, and each time-frequency resource group corresponds to two antenna ports; the third time-frequency resource group includes the four REs of the first OFDM symbol that are in the first time-frequency resource group and the second time-frequency resource group and are located in the data region; the fourth time-frequency resource group includes the four REs of the second OFDM symbol that are in the first time-frequency resource group and the second time-frequency resource group and are located in the data region; and it is assumed that the third time-frequency resource group corresponds to antenna ports 5 and 6, and that the fourth time-frequency resource group corresponds to antenna ports 7 and 8.

A method for mapping reference signals transmitted on the antenna port 5 and the antenna port 6 may be: mapping a reference signal corresponding to a third sequence in a second sequence group, to the first time-frequency resource group and the second time-frequency resource group respectively based on a first preset rule; and mapping a reference signal corresponding to a fourth sequence in the second sequence group, to the first time-frequency resource group and the second time-frequency resource group respectively based on the first preset rule, so that a third sequence group corresponding to the third time-frequency resource group includes the third sequence and the fourth sequence; where a reference signal of the third time-frequency resource group is used to demodulate a data signal and/or a control signal, and the second sequence group includes the third sequence and the fourth sequence other than the first sequence group in the orthogonal sequence group. The mapping a reference signal corresponding to a third sequence, to the first time-frequency resource group and the second time-frequency resource group respectively based on a first preset rule means mapping a value of each position in the reference signal corresponding to the third sequence, to corresponding REs of the first time-frequency resource group and the second time-frequency resource group respectively.

Figure 2C:
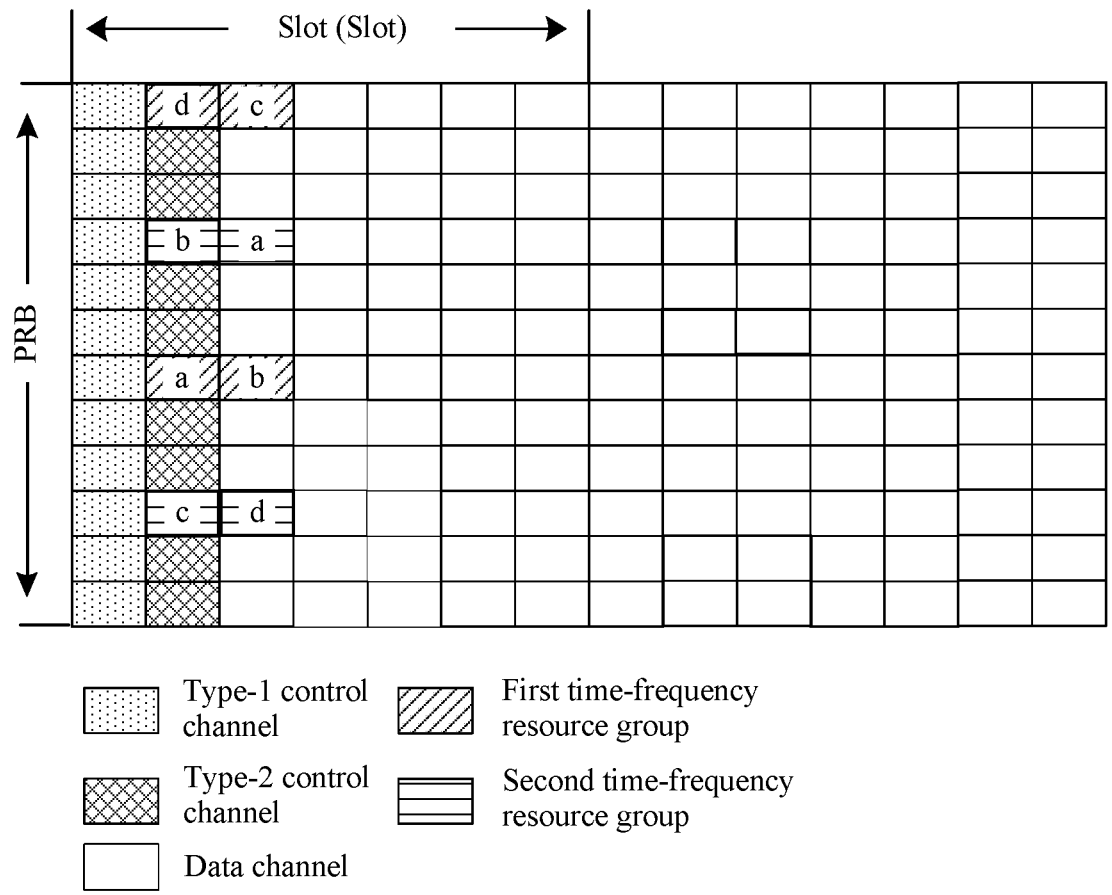
FIG. 2C is a schematic diagram of a mapping manner corresponding to a first preset rule according to an embodiment of the present disclosure.

FIG. 2C is a schematic diagram of a mapping manner corresponding to the first preset rule according to this embodiment of the present disclosure. In FIG. 2C, a, b, c, and d marked in the four REs of the first time-frequency resource group are used to indicate that values of corresponding positions in the sequence are mapped to corresponding REs. For example, when the first sequence and the second sequence are the sequences of the first row and the second row in the $W_{OCC}$ respectively, and the third sequence and the fourth sequence are sequences of the third row and a fourth row in the $W_{OCC}$ respectively, a value of each position in a reference signal corresponding to the third row [a, b, c, d]=[1, 1, −1, −1] in the $W_{OCC}$ is mapped to a corresponding RE of the first time-frequency resource group shown in FIG. 2C, and a value of each position in a reference signal corresponding to the fourth row [a, b, c, d]=[1, −1, −1, 1] in the $W_{OCC}$ is mapped to a corresponding RE of the first time-frequency resource group shown in FIG. 2C, so that two sequences corresponding to reference signals mapped to the third time-frequency resource group on the second OFDM symbol in the PRB in FIG. 2C are [1, 1, −1, −1; 1, −1, −1, 1].

Certainly, the first preset rule may be the mapping manner shown in FIG. 2C, or may be another mapping rule that can cause the obtained third sequence group corresponding to the third time-frequency resource group to include the third sequence and the fourth sequence. A specific mapping manner corresponding to the first preset rule is not limited in the present disclosure.

In the foregoing mapping manner, the reference signals of the antenna port 5 and the antenna port 6 corresponding to the third time-frequency resource group can be orthogonal to the reference signals of the antenna ports 1 to 4 by using orthogonal sequences. In addition, when a time-frequency resource occupied by the type-2 control channel includes the third time-frequency resource group, the reference signals of the antenna port 5 and the antenna port 6 may be used to demodulate a control signal on the type-2 control channel and a data signal on the data channel, and the control signal can be quickly demodulated; or when a time-frequency resource occupied by the type-2 control channel does not include the third time-frequency resource group, the reference signals of the antenna port 5 and the antenna port 6 may be used to demodulate a data signal.

In another embodiment of the present disclosure, when n is greater than or equal to 2, a fourth sequence group corresponding to the fourth time-frequency resource group is obtained based on a mapping result of the second sequence group in the first time-frequency resource group and the second time-frequency resource group, where the first preset rule causes the fourth sequence group obtained based on the mapping result to be the same as the third sequence group, and a reference signal of the fourth time-frequency resource group is used as an auxiliary reference signal for the reference signal of the third time-frequency resource group. In other words, when the time-frequency resource occupied by the type-2 control channel includes the third time-frequency resource group and the fourth time-frequency resource group, reference signals of the antenna port 7 and the antenna port 8 corresponding to the fourth time-frequency resource group may be used as auxiliary reference signals for the reference signals of the antenna port 5 and the antenna port 6 corresponding to the third time-frequency resource group, and are used to demodulate a control signal and a data signal.

Because the reference signal of the fourth time-frequency resource group is used as the auxiliary reference signal for the reference signal of the third time-frequency resource group, a success ratio of demodulating the control signal and the data signal can be increased.

In still another embodiment of the present disclosure, the two reference signals corresponding to the mapped sequence are mapped to the first time-frequency resource group and the second time-frequency resource group respectively based on the first preset rule, so that even power allocation in time domain and frequency domain is implemented for reference signals on the first OFDM symbol in the data region and the second OFDM symbol in the data region.

Because the two reference signals corresponding to the mapped sequence are mapped to the first time-frequency resource group and the second time-frequency resource group respectively based on the first preset rule, even power allocation in time domain and even power allocation in frequency domain can be implemented for the reference signals of the first time-frequency resource group and the second time-frequency resource group on the first OFDM symbol and the second OFDM symbol in the data region. This reduces signal distortion caused by power fluctuation of a transmitter, improves stability of information transmission, and ensures accuracy and a success ratio of information transmission.

The foregoing steps 201 to 203 are a process of mapping the two reference signals to the specified time-frequency resource by the base station. After mapping the two reference signals to the specified time-frequency resource, the base station transmits at least one of the two reference signals to user equipment. The following steps 204 to 209 are a process of transmitting a reference signal to the user equipment.

204. The base station transmits second indication information to user equipment.

The second indication information is used to indicate a time-frequency resource location of the type-2 control channel in the PRB. First indication information includes port information of a first preset antenna port, and the first preset antenna port is configured to transmit a at least one reference signal. The port information may be a port number of an antenna port, or other information that can uniquely identify a corresponding antenna port. This is not limited in this embodiment of the present disclosure. The second indication information is transmitted by using the type-1 control channel of the PRB. The first indication information may be transmitted by using the type-1 control channel, that is, a time-frequency resource on which the first indication information is located is on the type-1 control channel of the PRB; or the first indication information may be transmitted by using the type-2 control channel of the PRB, that is, a time-frequency resource on which the first indication information is located is on the type-2 control channel of the PRB.

Specifically, when the first indication information is transmitted by using the type-1 control channel of the PRB, a time-frequency resource corresponding to the first preset antenna port is in the data region in a subframe in which the PRB is located, and the user equipment receives, in the data region in the subframe in which the PRB is located, the reference signal transmitted in the PRB.

It should be noted that, one subframe may correspond to a plurality of PRBs, and port information corresponding to a specified time-frequency resource location in each PRB is the same. To be specific, when a time-frequency resource location is indicated in a form of coordinates, in each PRB, port information corresponding to time-frequency resource locations of same coordinates is the same. To be specific, a reference signal on a specified time-frequency resource in each PRB is transmitted by using an antenna port corresponding to the port information.

Because the first indication information is transmitted on the type-1 control channel of the PRB, the user equipment can receive, on the antenna port corresponding to the port information based on the port information in the first indication information, a reference signal transmitted in the data region of the PRB, and demodulate, based on the reference signal, a control signal and/or a data signal that are/is transmitted in the PRB.

When the first indication information is transmitted on the type-2 control channel of the PRB, the first indication information further includes a subframe location of a subframe in which the at least one reference signal is located, and correspondingly, the time-frequency resource corresponding to the first preset antenna port is located in a data region of a second PRB, where the second PRB is at least one PRB corresponding to the subframe in which the at least one reference signal is located; and the user equipment receives, in the data region of the second PRB, a reference signal transmitted in the second PRB.

The subframe location of the subframe in which the at least one reference signal is located may be indicated in a form of an offset. For example, using a subframe in which the first indication information is located as a start position, assuming that the subframe in which the first indication information is located is T0, a location of T0 is 0; when the subframe location of the subframe in which the at least one reference signal is located is 5, it indicates that the subframe location in which the at least one reference signal is located is a fifth subframe starting from the start position T0. Certainly, the subframe location of the subframe in which the at least one reference signal is located may be further indicated in another form. This is not specifically limited in this embodiment of the present disclosure.

Because the first indication information is transmitted on the type-2 control channel of the PRB, the user equipment can receive, based on the port information in the first indication information and the subframe location of the subframe in which the reference signal is located, the reference signal in data regions of a plurality of PRBs in the subframe corresponding to the subframe location, and demodulate, based on the reference signal, a control signal and/or a reference signal transmitted in a next PRB.

When the first indication information is transmitted on the type-1 control channel in the subframe in which the PRB is located, the first indication information further includes the subframe location of the subframe in which the at least one reference signal is located, and correspondingly, the time-frequency resource corresponding to the first preset antenna port is in a data region of a third PRB, where the third PRB includes at least one PRB in the subframe in which the PRB is located and at least one PRB corresponding to the subframe in which the at least one reference signal is located.

For example, using the subframe in which the first indication information is located as a start position, assuming that the subframe in which the first indication information is located is T0, the location of T0 is 0; when the subframe location of the subframe in which the at least one reference signal is located is 0, 4, and 5, it indicates that the subframe location in which the at least one reference signal is located is the subframe T0 in which the first indication information is located, a fourth subframe starting from the start position T0, and a fifth subframe starting from the start position T0.

Because a time-frequency resource location of the reference signal is indicated to the user equipment by using different methods based on different locations of reference signals, the user equipment can determine a corresponding time-frequency resource location based on the first indication information, so as to receive the reference signal. This can improve reference signal transmission efficiency and avoid signal transmission failure.

205. The user equipment receives the second indication information used to indicate a time-frequency resource location of first indication information.

206. The base station transmits the first indication information to the user equipment.

207. The user equipment receives, based on the time-frequency resource location of the first indication information, the first indication information in the time-frequency resource location of the first indication information.

208. The base station transmits the at least one reference signal on a first preset antenna port to the user equipment.

209. The user equipment receives the at least one reference signal on the first preset antenna port, so as to demodulate a control signal and/or a data signal based on the at least one reference signal.

For example, when the port information in the first indication information is port information of the antenna port 1, the base station transmits a reference signal on the antenna port 1 to the user equipment. Correspondingly, the user equipment receives the reference signal on the REs of the first time-frequency resource group corresponding to the antenna port 1.

In the reference signal mapping method provided by this embodiment of the present disclosure, because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased. Further, because the two reference signals corresponding to the mapped sequence are mapped to the first time-frequency resource group and the second time-frequency resource group respectively based on the first preset rule, even power allocation in time domain and even power allocation in frequency domain can be implemented for the reference signals of the first time-frequency resource group and the second time-frequency resource group on the first OFDM symbol and the second OFDM symbol in the data region. This reduces signal distortion caused by power fluctuation of a transmitter, improves stability of information transmission, and ensures accuracy and a success ratio of information transmission.

Embodiment 2

Figure 3A:
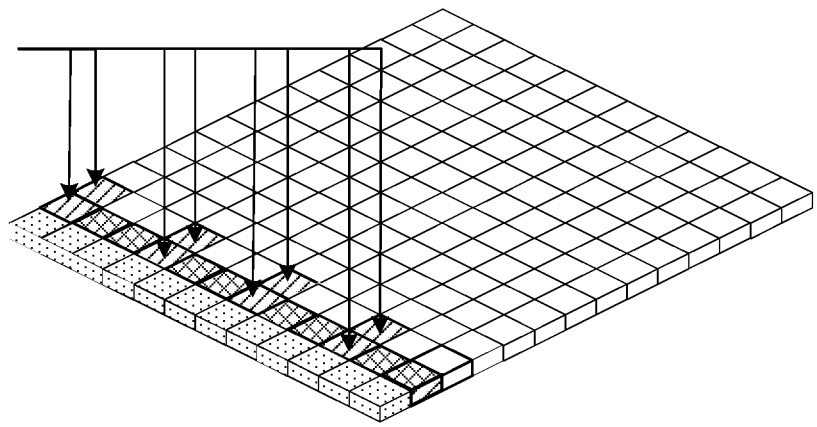
FIG. 3A is a schematic diagram of a specified time-frequency resource according to an embodiment of the present disclosure.

When a length of a sequence corresponding to a reference signal of each antenna port is 8, that is, when the reference signal of each antenna port occupies eight REs in a PRB, as shown in FIG. 3A, a time-frequency resource to which arrows point in FIG. 3A is eight REs occupied by reference signals of antenna ports 1 to 8. For the eight REs jointly occupied by the antenna ports 1 to 8, code division multiplexing can be implemented by using an orthogonal sequence group whose length is 8.

Figure 3B:
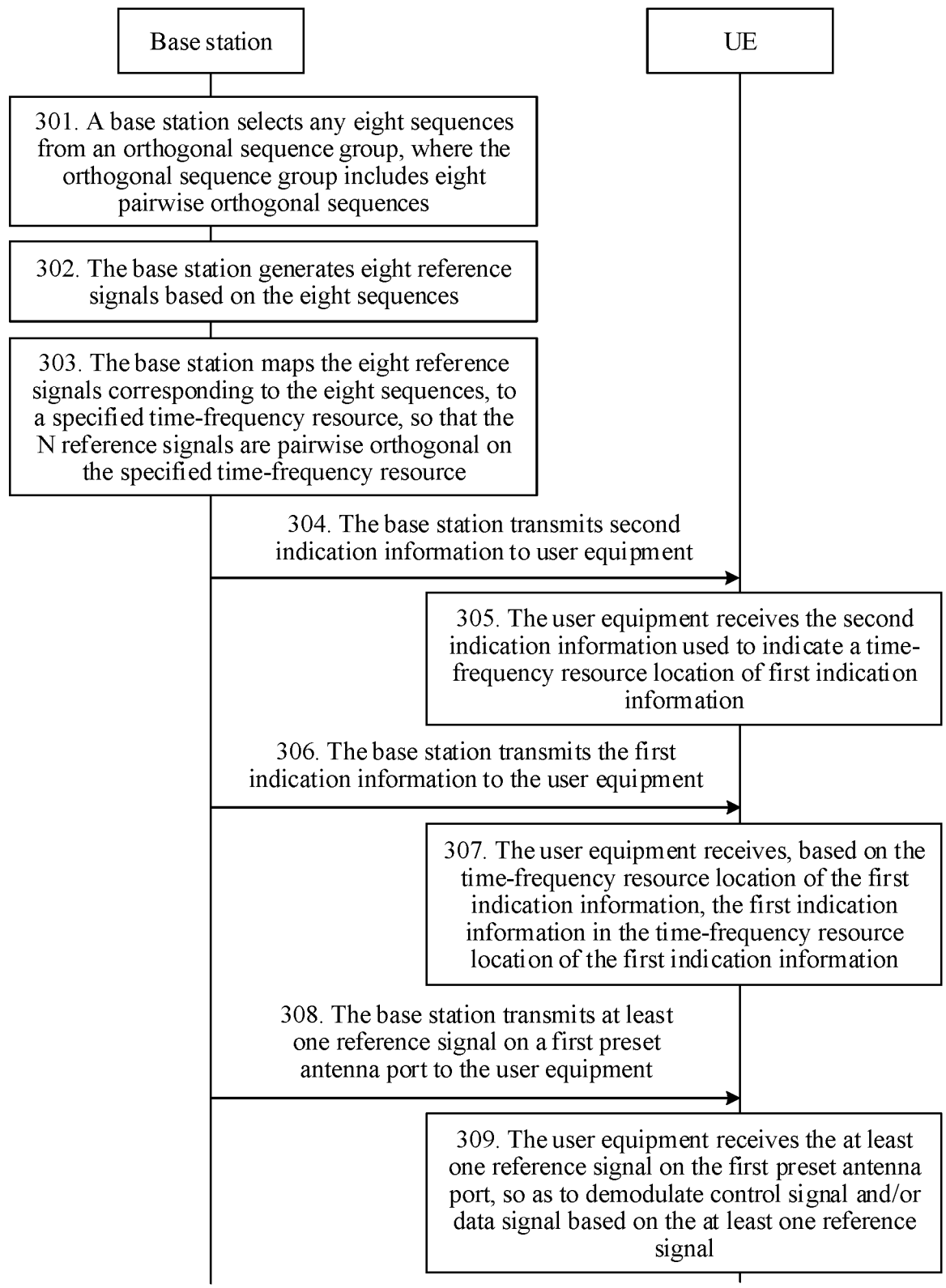
FIG. 3B is a flowchart of a reference signal mapping method according to an embodiment of the present disclosure.

FIG. 3B is a flowchart of a reference signal mapping method according to this embodiment of the present disclosure. As shown in FIG. 3B, the method includes the following steps.

301. A base station selects any eight sequences from an orthogonal sequence group, where the orthogonal sequence group includes eight pairwise orthogonal sequences.

The orthogonal sequence group includes eight pairwise orthogonal sequences. The eight sequences are obtained from the orthogonal sequence group and used as orthogonal sequences for implementing code division multiplexing, and a quantity of the selected sequences is the same as a quantity of antenna ports.

In another embodiment of the present disclosure, when the orthogonal sequence group is an 8-dimensional Walsh-Hadamard sequence group $W_{OCC}$ shown in a formula (3), the eight sequences may be a first row to an eighth row of the $W_{OCC}$ sequence group.

$$W_{OCC} = \begin{pmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{pmatrix} = (a\ b\ c\ d\ e\ f\ g\ h) \quad (3)$$

When the orthogonal sequence group is the 8-dimensional Walsh-Hadamard sequence, code division multiplexing can be implemented on eight REs jointly occupied by eight antenna ports.

302. The base station generates eight reference signals based on the eight sequences.

A method for generating a reference signal based on a sequence is similar to the method for generating a reference signal in step 202, and is not described again herein.

303. The base station maps the eight reference signals corresponding to the eight sequences, to a specified time-frequency resource, so that the two reference signals are pairwise orthogonal on the specified time-frequency resource.

In this embodiment of the present disclosure, the specified time-frequency resource includes four REs of a first OFDM symbol in a data region and four REs of a second OFDM symbol in the data region, where the four REs of the first OFDM symbol and the four REs of the second OFDM symbol occupy subcarriers of a same frequency. For example, in FIG. 3A, the eight REs to which the arrows point are the specified time-frequency resource. Certainly, the specified time-frequency resource may also include eighth other REs on the first OFDM symbol and the second FDM symbol in the data region. This is not limited in this embodiment of the present disclosure.

In this embodiment of the present disclosure, assuming that the orthogonal sequence group is the $W_{OCC}$ sequence group shown in the formula (3), the reference signal mapping method provided by the present disclosure is described in detail. The specified time-frequency resource corresponds to the antenna ports 1 to 8.

A method for mapping the reference signals transmitted on the antenna ports 1 to 8 may be: mapping the eight reference signals corresponding to the eight sequences, to the specified time-frequency resource respectively, where a reference signal corresponding to the specified time-frequency resource is used to demodulate a data signal. For example, a method for mapping a reference signal corresponding to a sequence of the first row in the formula (3) to the specified time-frequency resource in FIG. 3A may be: mapping a value of each position in a reference signal corresponding to [a, b, c, d, e, f, g, h]=[1, 1, 1, 1, 1, 1, 1, 1] to a corresponding RE sequentially from left to right. Correspondingly, sequences of the other seven rows in the formula (3) are also mapped in a same manner, and the eight mapped reference signals are used to demodulate a data signal on a data channel.

By performing the mapping, eight antenna ports can be mapped to a time-frequency resource including eight REs, and therefore eight reference signals can be transmitted simultaneously, so that the reference signals do not need to span the whole time-frequency resource. A reference signal used to demodulate a data signal is transmitted only when data information is transmitted. Therefore, code division multiplexing is implemented by using orthogonal sequences, and a quantity of concurrent multiplex on a data channel and a quantity of user equipments multiplexed on a control channel are increased.

In another embodiment of the present disclosure, the eight reference signals corresponding to the eight sequences are mapped to the specified time-frequency resource respectively based on a second preset rule, so that the specified time-frequency resource has four pairwise orthogonal sequences on the four REs of the first OFDM symbol in the data region, where reference signals corresponding to the four REs of the first OFDM symbol are used to demodulate a control signal and/or a data signal. That the eight reference signals corresponding to the eight sequences are mapped to the specified time-frequency resource respectively based on a second preset rule means that a value of each position of a reference signal corresponding to each of the eight sequences is mapped to a corresponding RE of the specified time-frequency resource.

Figure 3C:
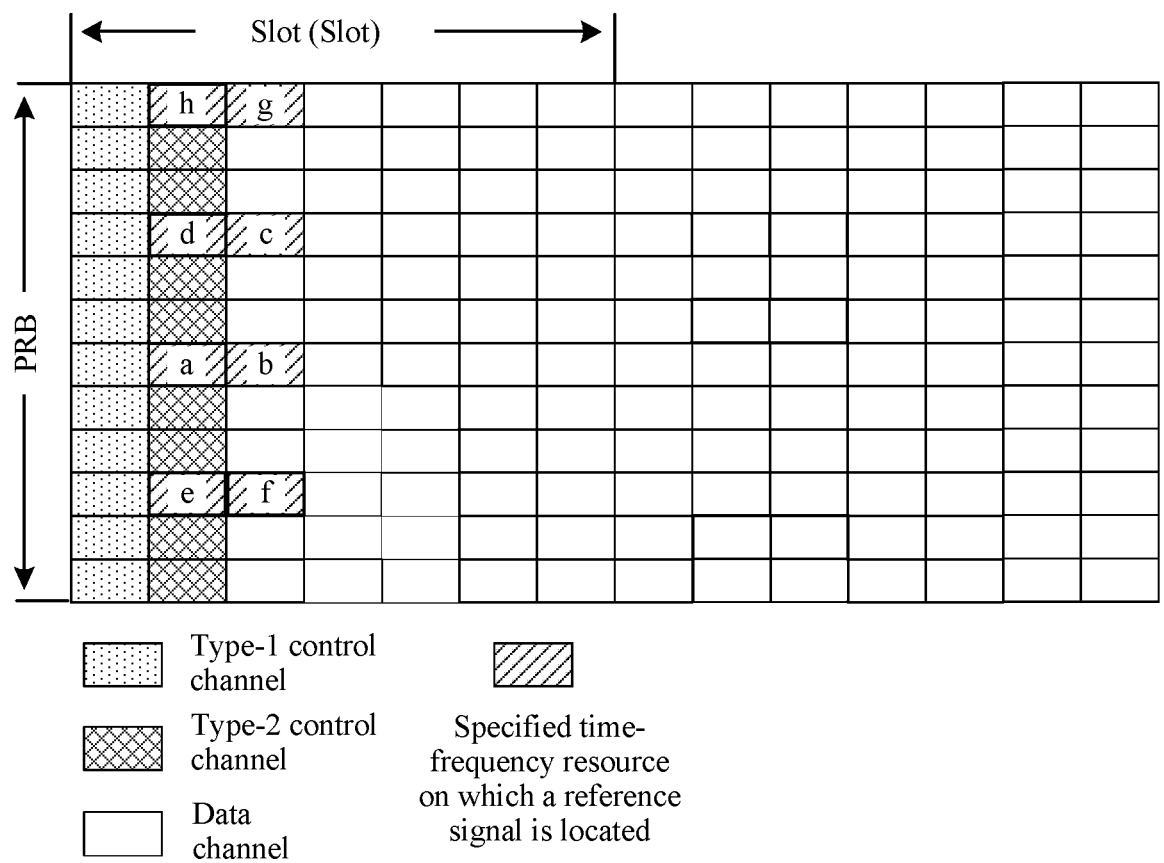
FIG. 3C is a schematic diagram of a mapping manner corresponding to a second preset rule according to an embodiment of the present disclosure.
Figure 3D:
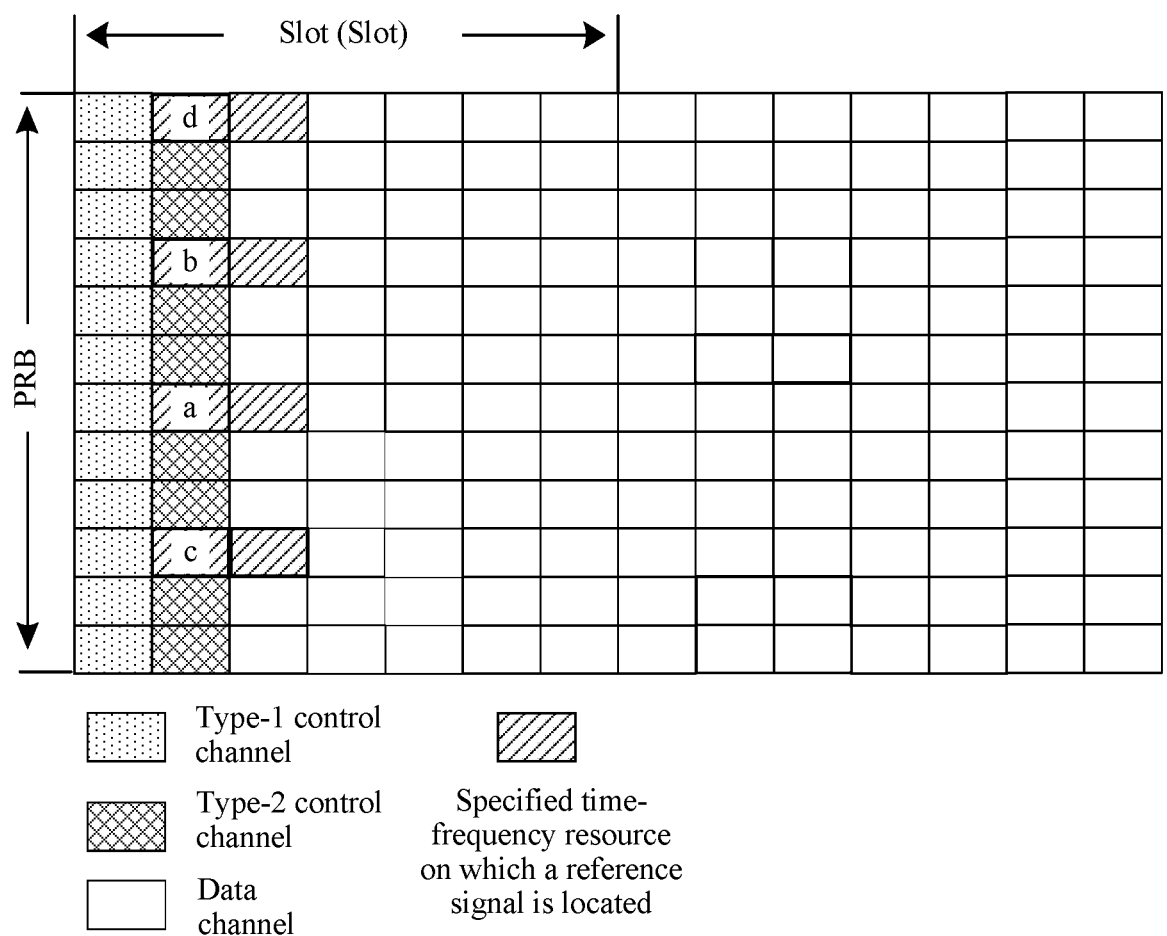
FIG. 3D is a schematic diagram of a sequence corresponding to a specified time-frequency resource according to an embodiment of the present disclosure.

FIG. 3C is a schematic diagram of a mapping manner corresponding to the second preset rule according to this embodiment of the present disclosure. In FIG. 3C, a, b, c, d, e, f, g, and h marked in the eight REs of the specified time-frequency resource are used to indicate that values of corresponding positions in the sequence are mapped to corresponding REs. For example, a value of each position in the second row [a, b, c, d, e, f, g, h]=[1, 1, 1, 1, −1, −1, −1, −1] of the $W_{OCC}$ in the formula (3) is mapped to a corresponding RE of the specified time-frequency resource shown in FIG. 3C. To be specific, a sequence corresponding to a partial reference signal mapped to four REs whose identifiers are a, b, c, and d in the specified time-frequency resource is [a, b, c, d]=[1, 1, 1, 1], and a sequence corresponding to a partial reference signal mapped to four REs whose identifiers are e, f, g, and h is [e, f, g, h]=[−1, −1, −1, −1], so that a sequence corresponding to a reference signal mapped to four REs of the first OFDM symbol in the data region of the PRB shown in FIG. 3D is [a, b, c, d]=[1, 1, 1, −1]. A method for mapping a reference signal of a sequence of another row in the $W_{OCC}$ in the formula (3) is similar to the foregoing process.

The eight reference signals corresponding to the eight sequences are mapped to the specified time-frequency resource respectively based on the second preset rule, so that the specified time-frequency resource has four pairwise orthogonal sequences on the four REs of the first OFDM symbol in the data region. Correspondences between the eight sequences and sequences corresponding to some reference signals mapped to the four REs of the first OFDM symbol in the data region are shown in Table 2.

TABLE 2

| Port number | Sequence corresponding to the specified time-frequency resource | Sequence corresponding to the four REs |
| --- | --- | --- |
| Antenna port 1 | [1, 1, 1, 1, 1, 1, 1, 1] | [1, 1, 1, 1] |
| Antenna port 2 | [1, 1, 1, 1, −1, −1, −1, −1] | [1, 1, −1, −1] |
| Antenna port 3 | [1, 1, −1, −1, −1, −1, 1, 1] | [1, −1, −1, 1] |
| Antenna port 4 | [1, 1, −1, −1, 1, 1, −1, −1] | [1, −1, 1, −1] |
| Antenna port 5 | [1, −1, −1, 1, 1, −1, −1, 1] | [1, 1, 1, 1] |
| Antenna port 6 | [1, −1, −1, 1, −1, 1, 1, −1] | [1, −1, 1, −1] |

TABLE 2-continued

| Port number | Sequence corresponding to the specified time-frequency resource | Sequence corresponding to the four REs |
| --- | --- | --- |
| Antenna port 7 | [1, −1, 1, −1, −1, 1, −1, 1] | [1, −1, −1, 1] |
| Antenna port 8 | [1, −1, 1, −1, 1, −1, 1, −1] | [1, −1, 1, −1] |

As can be learned from the correspondences in Table 2, in eight sequences corresponding to some reference signals mapped to four REs of the first OFDM symbol in the data region, there are four groups of pairwise orthogonal sequences. For example, four sequences corresponding to four REs of the first OFDM symbol in the data region and corresponding to the antenna ports 1 to 4 are pairwise orthogonal. When a time-frequency resource occupied by a type-2 control channel in the PRB shown in FIG. 3C includes the four REs of the first OFDM symbol in the data region, four reference signals corresponding to the four pairwise orthogonal sequences may be used to demodulate a control signal transmitted on the type-2 control channel. To be specific, the antenna ports 1 to 4 may be used to transmit both a reference signal for demodulating a control signal and a reference signal for demodulating a data signal. Likewise, four sequences corresponding to four REs of the first OFDM symbol in the data region and corresponding to the antenna ports 5 to 8 are also pairwise orthogonal. The antenna ports 5 to 8 may also be selected for sharing by the data channel and the control channel.

Certainly, the second preset rule may be the mapping manner shown in FIG. 3C, or may be another mapping manner that can cause the specified time-frequency resource to have four pairwise orthogonal sequences on the four REs of the first OFDM symbol in the data region. A specific mapping manner corresponding to the second preset rule is not limited in the present disclosure.

In the foregoing mapping manner, the specified time-frequency resource can have four pairwise orthogonal sequences on the four REs of the first OFDM symbol in the data region. In addition, when the time-frequency resource occupied by the type-2 control channel includes the four REs, four corresponding antenna ports may be shared by the data channel and the control channel. To be specific, the four antenna ports may transmit a reference signal used to demodulate a control signal, and may transmit a reference signal used to demodulate a data signal.

The foregoing steps 301 to 303 are a process of mapping the eight reference signals to the specified time-frequency resource by the base station. After mapping the eight reference signals to the specified time-frequency resource, the base station transmits at least one of the eight reference signals to user equipment. The following steps 304 to 309 are a process of transmitting a reference signal to the user equipment.

304. The base station transmits second indication information to user equipment.

In this embodiment of the present disclosure, definitions of the second indication information and first indication information are the same as definitions of the corresponding indication information in step 204. Details are not described again herein.

305. The user equipment receives the second indication information used to indicate a time-frequency resource location of first indication information.

306. The base station transmits the first indication information to the user equipment.

307. The user equipment receives, based on the time-frequency resource location of the first indication information, the first indication information in the time-frequency resource location of the first indication information.

308. The base station transmits the at least one reference signal on a first preset antenna port to the user equipment.

309. The user equipment receives the at least one reference signal on the first preset antenna port, so as to demodulate a control signal and/or a data signal based on the at least one reference signal.

For example, when the port information in the first indication information is port information of the antenna port 1, the base station transmits a reference signal on the antenna port 1 to the user equipment. Correspondingly, the user equipment receives the reference signal on a time-frequency resource corresponding to the antenna port 1.

In the reference signal mapping method provided by this embodiment of the present disclosure, because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased. Further, because the eight reference signals corresponding to the eight sequences are mapped to the specified time-frequency resource respectively based on the second preset rule, the specified time-frequency resource can have four pairwise orthogonal sequences on the four REs of the first OFDM symbol in the data region. In addition, when the time-frequency resource occupied by the type-2 control channel includes the four REs, four corresponding antenna ports may be shared by the data channel and the control channel. To be specific, the four antenna ports may transmit a reference signal used to demodulate a control signal, and may transmit a reference signal used to demodulate a data signal.

Embodiment 3

Figure 4A:
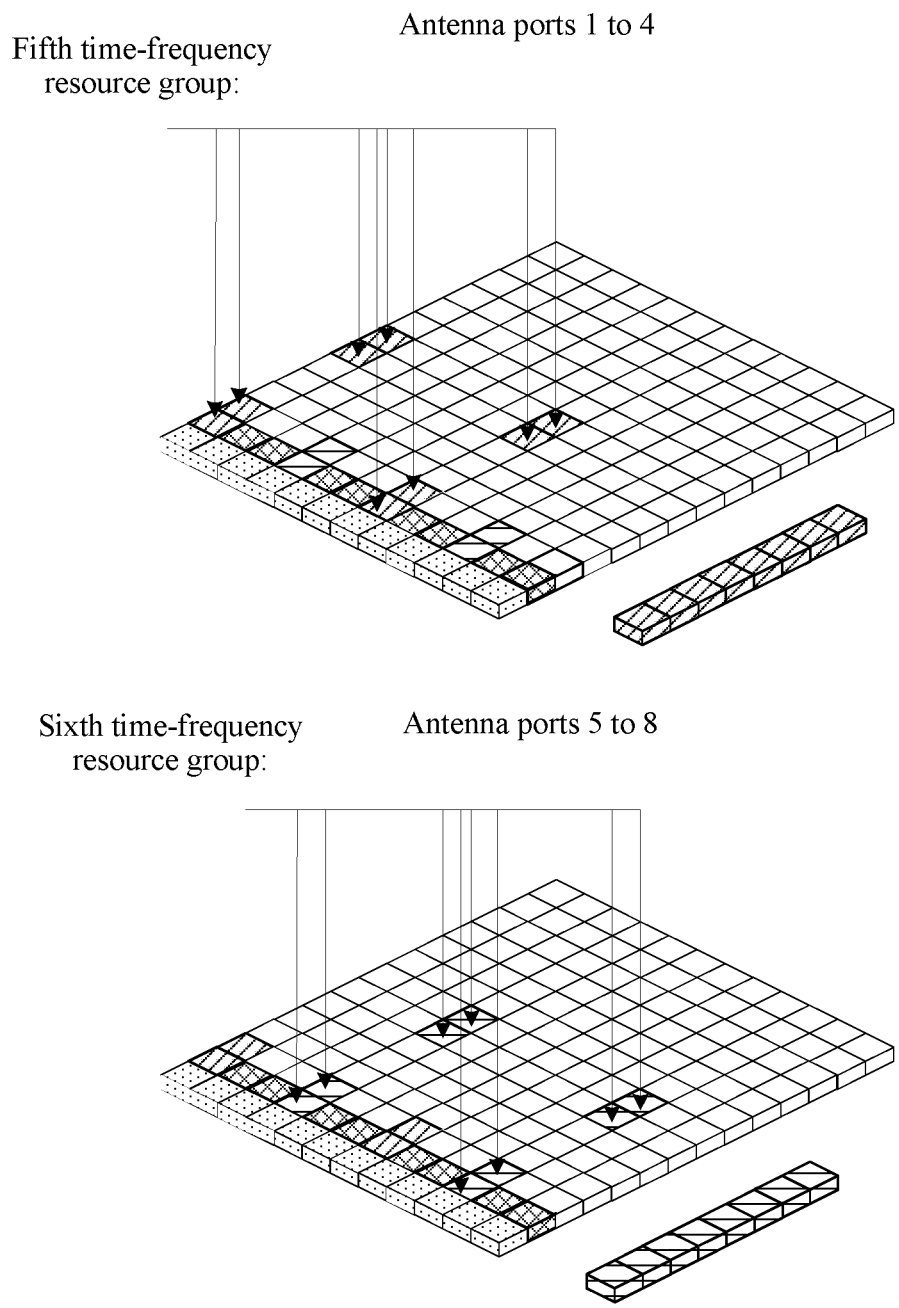
FIG. 4A is a schematic diagram of a specified time-frequency resource according to an embodiment of the present disclosure.

When a length of a sequence corresponding to a reference signal of each antenna port is 8, that is, when the reference signal of each antenna port occupies eight REs in a PRB, as shown in FIG. 4A, a time-frequency resource to which arrows point in an upper figure in FIG. 4A is eight REs occupied by reference signals of antenna ports 1 to 4, and a time-frequency resource to which arrows point in a lower figure is eight REs occupied by reference signals of antenna ports 5 to 8. For the eight REs jointly occupied by the antenna ports 1 to 4, code division multiplexing can be implemented by using an orthogonal sequence group whose length is 8. Likewise, for the eight REs jointly occupied by the antenna ports 5 to 8, code division multiplexing can also be implemented by using an orthogonal sequence group whose length is 8.

Figures 1, 4B:
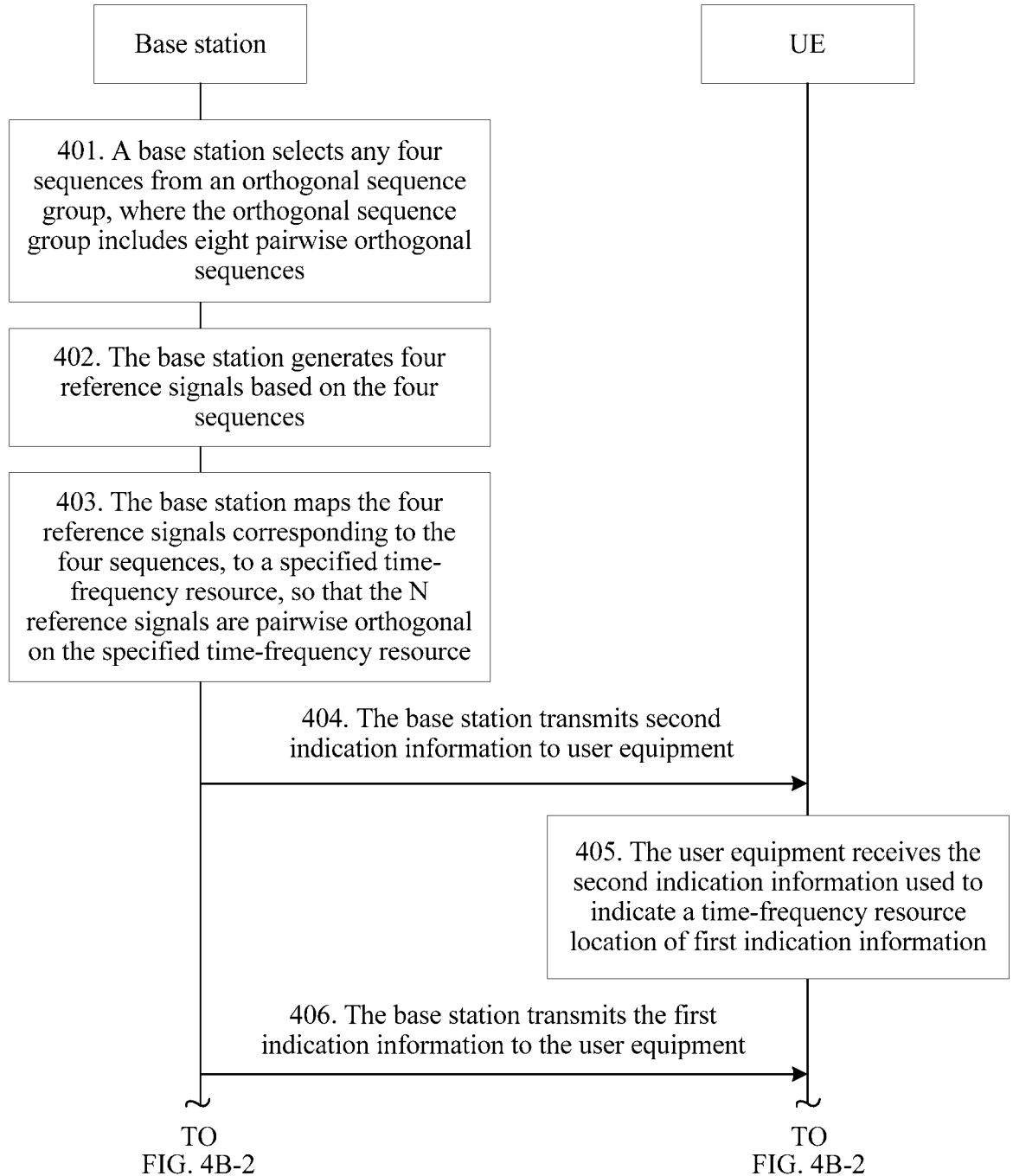
Figures 2, 4B:
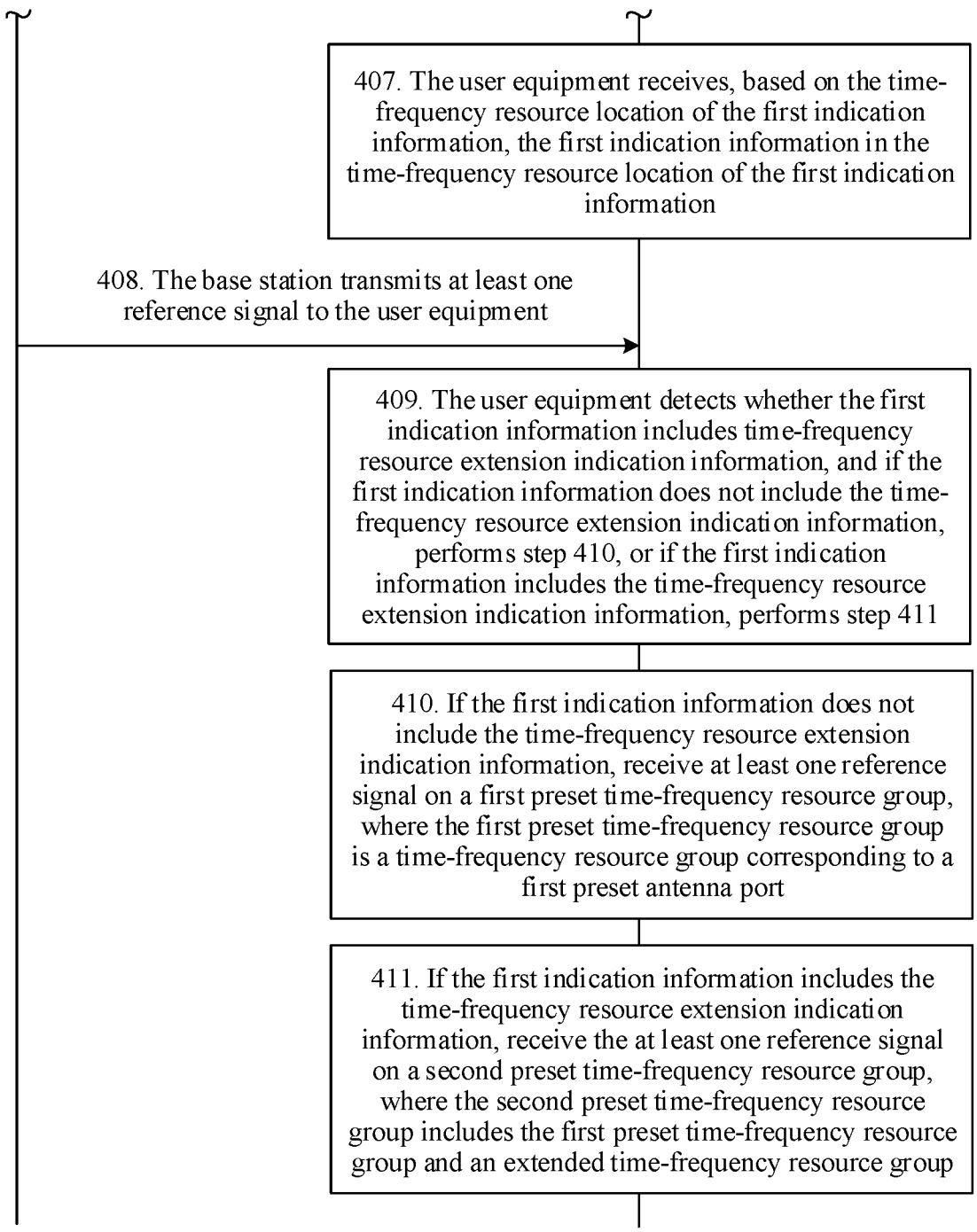

FIG. 4B-1 and FIG. 4B-2 are a flowchart of a reference signal mapping method according to this embodiment of the present disclosure. As shown in FIG. 4B-1 and FIG. 4B-2, the method includes the following steps.

401. A base station selects any four sequences from an orthogonal sequence group, where the orthogonal sequence group includes eight pairwise orthogonal sequences.

The orthogonal sequence group includes eight pairwise orthogonal sequences. Any four sequences are selected from the orthogonal sequence group, and a quantity of the selected sequences is the same as a quantity of antenna ports.

In another embodiment of the present disclosure, when the orthogonal sequence group is the 8-dimensional Walsh-Hadamard sequence $W_{OCC}$ shown in the formula (3), any four sequences are selected from the $W_{OCC}$, where the any four sequences may be a first row to a fourth row of the $W_{OCC}$ sequence group, or may be a second row to a fifth row of the $W_{OCC}$ sequence group, or any four other rows. This is not limited in this embodiment of the present disclosure.

When the orthogonal sequence group is the 8-dimensional Walsh-Hadamard sequence, code division multiplexing can be implemented on eight REs jointly occupied by four antenna ports.

402. The base station generates four reference signals based on the four sequences.

A method for generating a reference signal based on a sequence is similar to the method for generating a reference signal in step 202, and is not described again herein.

403. The base station maps the four reference signals corresponding to the four sequences, to a specified time-frequency resource, so that the two reference signals are pairwise orthogonal on the specified time-frequency resource.

In this embodiment of the present disclosure, the specified time-frequency resource includes a fifth time-frequency resource group and a sixth time-frequency resource group, where each time-frequency resource group corresponds to four antenna ports.

The fifth time-frequency resource group and the sixth time-frequency resource group respectively include two REs of a first OFDM symbol, two REs of a second OFDM symbol, two REs of an $i^{th}$ OFDM symbol, and two REs of a $j^{th}$ OFDM symbol in a data region, where the two REs of the first OFDM symbol, the two REs of the second OFDM symbol, the two REs of the $i^{th}$ OFDM symbol, and the two REs of the $j^{th}$ OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal. For example, the eight REs to which the arrows point in the upper figure in FIG. 4A are the fifth time-frequency resource group, and the eight REs to which the arrows point in the lower figure are the sixth time-frequency resource group.

In this embodiment of the present disclosure, assuming that the orthogonal sequence group is the $W_{OCC}$ sequence group shown in the formula (3), the reference signal mapping method provided by the present disclosure is described in detail. It is assumed that the fifth time-frequency resource group corresponds to the antenna port 1 to the antenna port 4, and that the second time-frequency resource group corresponds to the antenna port 5 to the antenna port 8.

A method for mapping the reference signals transmitted on the antenna port 1 to the antenna port 4 may be: obtaining a mapped sequence of a third sequence group, where the third sequence group includes the four sequences selected from the orthogonal sequence group; mapping four reference signals corresponding to the mapped sequence, to the fifth time-frequency resource group and the sixth time-frequency resource group respectively; and when the four sequences selected from the $W_{OCC}$ sequence group shown in the formula (3) are sequences of the first row to the fourth row, that is, when the third sequence group includes the sequences of the first row to the fourth row of the $W_{OCC}$ shown in the formula (3), mapping the four reference signals corresponding to the four sequences, to the fifth time-frequency resource group, where the specific mapping method is similar to the method for mapping the two reference signals corresponding to the two sequences, to the first time-frequency resource group in step 203. Details are not described again herein.

For the reference signals transmitted on the antenna port 5 to the antenna port 8, because the sixth time-frequency resource group corresponding to the antenna port 5 to the antenna port 8 occupies a frequency different from a frequency of subcarriers occupied by the fifth time-frequency resource group in frequency domain, the reference signal of the sixth time-frequency resource group is orthogonal to the reference signal of the fifth time-frequency resource group. Therefore, the sequences of the first row to the fourth row that are selected from the $W_{OCC}$ sequence group shown in the formula (3) may be used to map the reference signal of the sixth time-frequency resource group. A specific mapping method is similar to the method for mapping the two reference signals corresponding to the two sequences, to the first time-frequency resource group in step 203. Details are not described again herein.

By performing the mapping, eight antenna ports can be mapped to a time-frequency resource including 16 REs, and therefore eight reference signals can be transmitted simultaneously. It should be noted that, when a type-1 control channel occupies a first OFDM symbol of the PRB, a type-2 control channel occupies a second OFDM symbol of the PRB, and a data channel occupies another OFDM symbol of the PRB, reference signals corresponding to the eight antenna ports may be used to demodulate a data signal; or when a type-1 control channel occupies a first OFDM symbol of the PRB, a type-2 control channel occupies a second OFDM symbol and a third OFDM symbol of the PRB, and a data channel occupies another OFDM symbol of the PRB, reference signals corresponding to the eight antenna ports may be used to demodulate a data signal, or may be used to demodulate a control signal on the type-2 control channel.

Figure 4C:
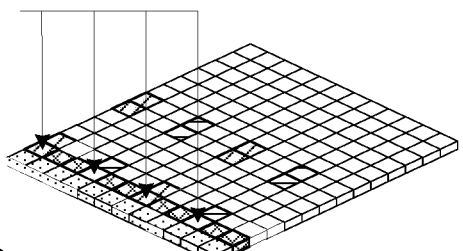
FIG. 4C is a schematic diagram of a specified time-frequency resource according to an embodiment of the present disclosure.
Figure 4C:
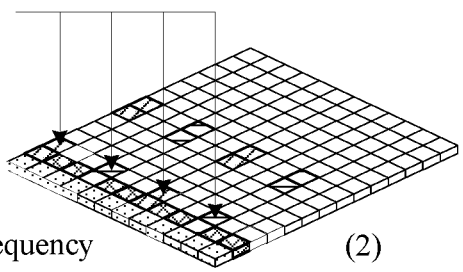
Figure 4C:
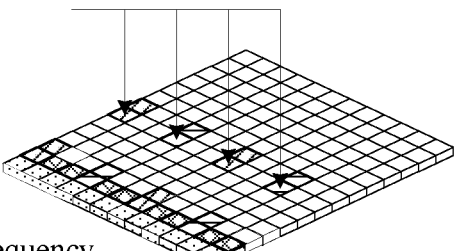
Figure 4C:
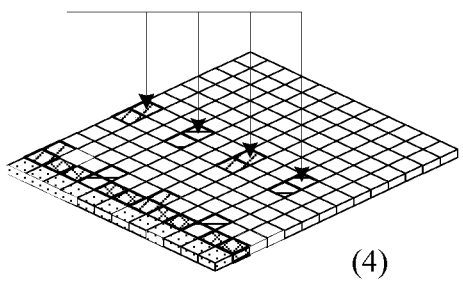

In another embodiment of the present disclosure, the specified time-frequency resource further includes a seventh time-frequency resource group, an eighth time-frequency resource group, a ninth time-frequency resource group, and a tenth time-frequency resource group, and each time-frequency resource group corresponds to four antenna ports; the seventh time-frequency resource group includes the four REs of the first OFDM symbol that are in the fifth time-frequency resource group and the sixth time-frequency resource group and are located in the data region, as shown by four REs to which arrows point in FIG. 4C(1); the eighth time-frequency resource group includes the four REs of the second OFDM symbol that are in the fifth time-frequency resource group and the sixth time-frequency resource group and are located in the data region, as shown by four REs to which arrows point in FIG. 4C(2); the ninth time-frequency resource group includes the four REs of the i$^{th}$ OFDM symbol that are in the fifth time-frequency resource group and the sixth time-frequency resource group and are located in the data region, as shown by four REs to which arrows point in FIG. 4C(3); and the tenth time-frequency resource group includes the four REs of the j$^{th}$ OFDM symbol that are in the fifth time-frequency resource group and the sixth time-frequency resource group and are located in the data region, as shown by four REs to which arrows point in FIG. 4C(4).

A method for mapping a reference signal of the seventh time-frequency resource group may be: mapping four reference signals corresponding to four sequences other than the four sequences included in the third sequence group in the orthogonal sequence group, to the fifth time-frequency resource group and the sixth time-frequency resource group respectively based on a third preset rule to obtain a mapping result, so that four sequences of the seventh time-frequency resource group in the mapping result are pairwise orthogonal, where the reference signal of the seventh time-frequency resource group is used to demodulate a data signal and/or a control signal. The mapping four reference signals corresponding to four sequences other than the four sequences included in the third sequence group in the orthogonal sequence group, to the fifth time-frequency resource group and the sixth time-frequency resource group respectively based on a third preset rule means mapping the four sequences other than the third sequence group in the orthogonal sequence group, to the fifth time-frequency resource group and the sixth time-frequency resource group respectively in a mapping manner indicated by the third preset rule, so that the four sequences corresponding to the reference signal of the seventh time-frequency resource group are pairwise orthogonal.

Figure 4D:
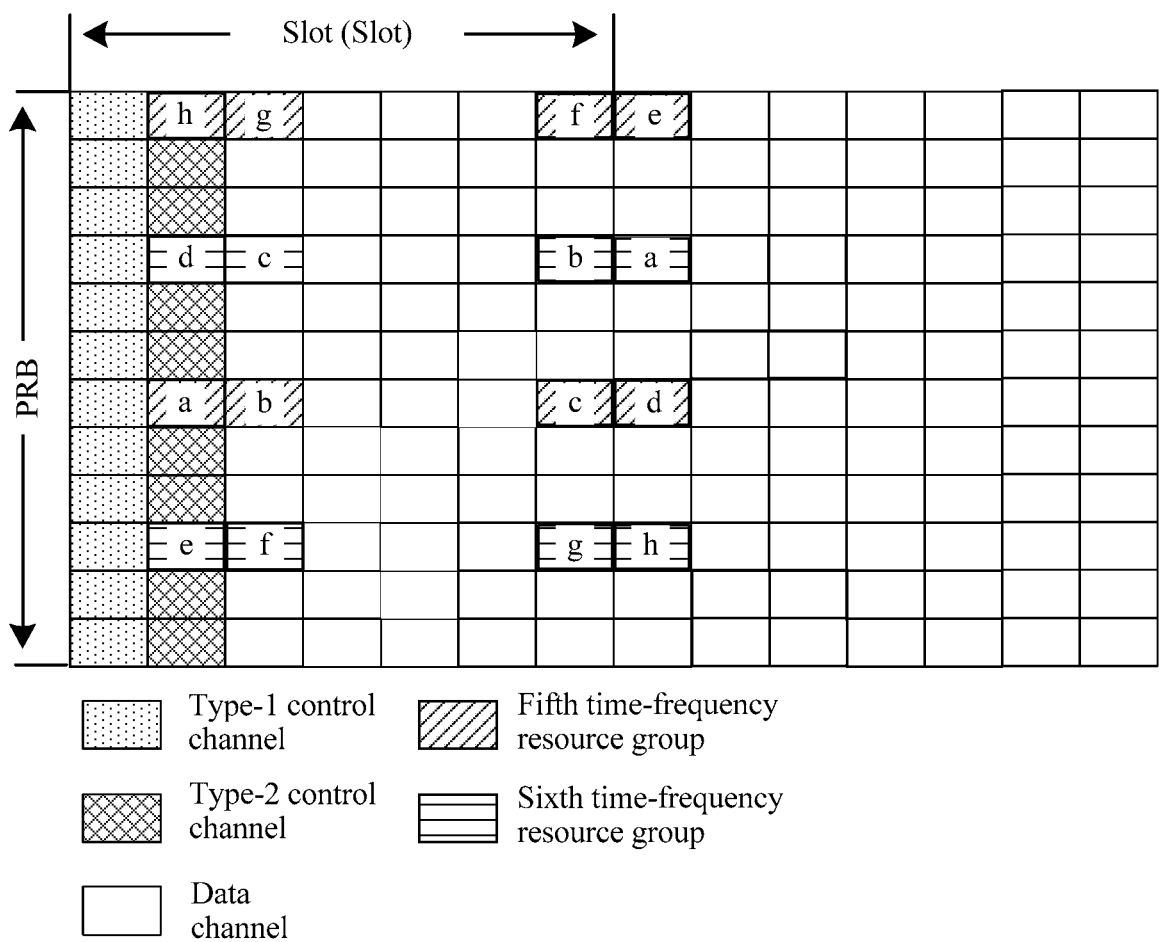
FIG. 4D is a schematic diagram of a mapping manner corresponding to a third preset rule according to an embodiment of the present disclosure.

FIG. 4D is a schematic diagram of the mapping manner corresponding to the third preset rule according to this embodiment of the present disclosure. In FIG. 4D, a, b, c, d, e, f, g, and h marked in eight REs of the fifth time-frequency resource group are used to indicate that values of corresponding positions in the reference signal are mapped to corresponding REs. For example, when the third sequence group includes the sequences of the first row to the fourth row in the $W_{OCC}$ sequence group shown in the formula (3), and the four sequences other than the third sequence group in the orthogonal sequence group are sequences of the fifth row to the eighth row in the $W_{OCC}$ sequence group shown in the formula (3), a value of each position in a reference signal corresponding to the fifth row [a, b, c, d, e, f, g, h]=[1, −1, −1, 1, 1, 1, −1, 1] in the $W_{OCC}$ is mapped to a corresponding RE of the fifth time-frequency resource group shown in FIG. 4D.

Reference signals corresponding to the fifth row to the eighth row are mapped to the fifth time-frequency resource group and the sixth time-frequency resource group respectively in the corresponding manner indicated by the third preset rule. A specific method may be: mapping the reference signals corresponding to the fifth row to the eighth row, sequentially to the fifth time-frequency resource group and the sixth time-frequency resource group respectively; or the mapping manner may be: mapping the references signals corresponding to the {fifth row, sixth row, seventh row, eighth row}, to the fifth time-frequency resource group respectively, and mapping the reference signals corresponding to the {seventh row, eighth row, fifth row, sixth row}, to the sixth time-frequency resource group respectively, so that the four sequences corresponding to the reference signal of the seventh time-frequency resource group are pairwise orthogonal.

Further, the four reference signals corresponding to the four sequences other than the four sequences included in the third sequence group in the orthogonal sequence group are mapped to the fifth time-frequency resource group and the sixth time-frequency resource group respectively based on the third preset rule to obtain a mapping result. The reference signal mapping method provided by the present disclosure may further include the following three methods.

1. When n is greater than or equal to 2 and less than i, obtain, based on the mapping result, four sequences corresponding to the eighth time-frequency resource group, where the third preset rule causes the four sequences corresponding to the eighth time-frequency resource group and obtained based on the mapping result to be pairwise orthogonal, and a reference signal of the eighth time-frequency resource group is used as an auxiliary reference signal for the reference signal of the seventh time-frequency resource group. When n is greater than or equal to 2 and less than i, the type-2 control channel includes the eighth time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal, and further, the reference signal of the eighth time-frequency resource group is used as the auxiliary reference signal for the reference signal of the seventh time-frequency resource group.

When the type-2 control channel includes the eighth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; or when the type-2 control channel does not include the eighth time-frequency resource group, the reference signal of the eighth time-frequency resource group is used as the auxiliary reference signal for the reference signal of the seventh time-frequency resource group, and may be used to demodulate the data signal on the data channel.

2. Obtain, based on the mapping result, four sequences corresponding to the eighth time-frequency resource group and four sequences corresponding to the ninth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal, and a reference signal of the eighth time-frequency resource group and/or a reference signal of the ninth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal, and further, the reference signal of the eighth time-frequency resource group and/or the reference signal of the ninth time-frequency resource group are/is used as the auxiliary reference signal for the reference signal of the seventh time-frequency resource group.

When the type-2 control channel includes the eighth time-frequency resource group but does not include the ninth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group is used as the auxiliary reference signal for the reference signal of the seventh time-frequency resource group, and may be used to demodulate the data signal on the data channel. When the type-2 control channel includes both the eighth time-frequency resource group and the ninth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel.

3. Obtain, based on the mapping result, four sequences corresponding to the eighth time-frequency resource group, four sequences corresponding to the ninth time-frequency resource group, and four sequences corresponding to the tenth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal and/or causes the four sequences corresponding to the tenth time-frequency resource group and obtained based on the mapping result to be pairwise orthogonal, and a reference signal of the eighth time-frequency resource group and/or a reference signal of the ninth time-frequency resource group and/or a reference signal of the tenth time-frequency resource group are/is used as an auxiliary reference signal for the reference signal of the seventh time-frequency resource group.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the eighth time-frequency resource group can also be pairwise orthogonal and/or the four sequences corresponding to the ninth time-frequency resource group can also be pairwise orthogonal and/or the four sequences corresponding to the tenth time-frequency resource group can also be pairwise orthogonal, and further, the reference signal of the eighth time-frequency resource group and/or the reference signal of the ninth time-frequency resource group and/or the reference signal of the tenth time-frequency resource group are/is used as the auxiliary reference signal for the reference signal of the seventh time-frequency resource group.

When the type-2 control channel includes the eighth time-frequency resource group but does not include the ninth time-frequency resource group and the tenth time-frequency resource group, the reference signal of the eighth time-frequency resource group is used as the auxiliary reference signal for the reference signal of the seventh time-frequency resource group, and may be used to demodulate the control signal on the type-2 control channel, and may also be used to demodulate the data signal on the data channel; and the reference signal of the ninth time-frequency resource group and/or the reference signal of the tenth time-frequency resource group are/is used as the auxiliary reference signal for the reference signal of the seventh time-frequency resource group, and may be used to demodulate the data signal on the data channel. When the type-2 control channel includes both the eighth time-frequency resource group and the ninth time-frequency resource group but does not include the tenth time-frequency resource group, the reference signal of the eighth time-frequency resource group and the reference signal of the ninth time-frequency resource group are used as the auxiliary reference signals for the reference signal of the seventh time-frequency resource group, and may be used to demodulate the control signal on the type-2 control channel, and may also be used to demodulate the data signal on the data channel; and the reference signal of the tenth time-frequency resource group is used as the reference signal of the seventh time-frequency resource group, and may be used to demodulate the data signal on the data channel. When the type-2 control channel includes the eighth time-frequency resource group, the ninth time-frequency resource group, and the tenth time-frequency resource group, the reference signal of the eighth time-frequency resource group, the reference signal of the ninth time-frequency resource group, and the reference signal of the tenth time-frequency resource group are used as the auxiliary reference signals for the reference signal of the seventh time-frequency resource group, and may be used to demodulate the control signal on the type-2 control channel, and may also be used to demodulate the data signal on the data channel.

Because the four reference signals corresponding to the four sequences other than the four sequences included in the third sequence group in the orthogonal sequence group are mapped to the fifth time-frequency resource group and the sixth time-frequency resource group respectively based on the third preset rule, the four sequences corresponding to the seventh time-frequency resource group can be pairwise orthogonal, and the four sequences corresponding to at least one of the eighth time-frequency resource group, the ninth time-frequency resource group, and the tenth time-frequency resource group can also be pairwise orthogonal.

Figure 4E:
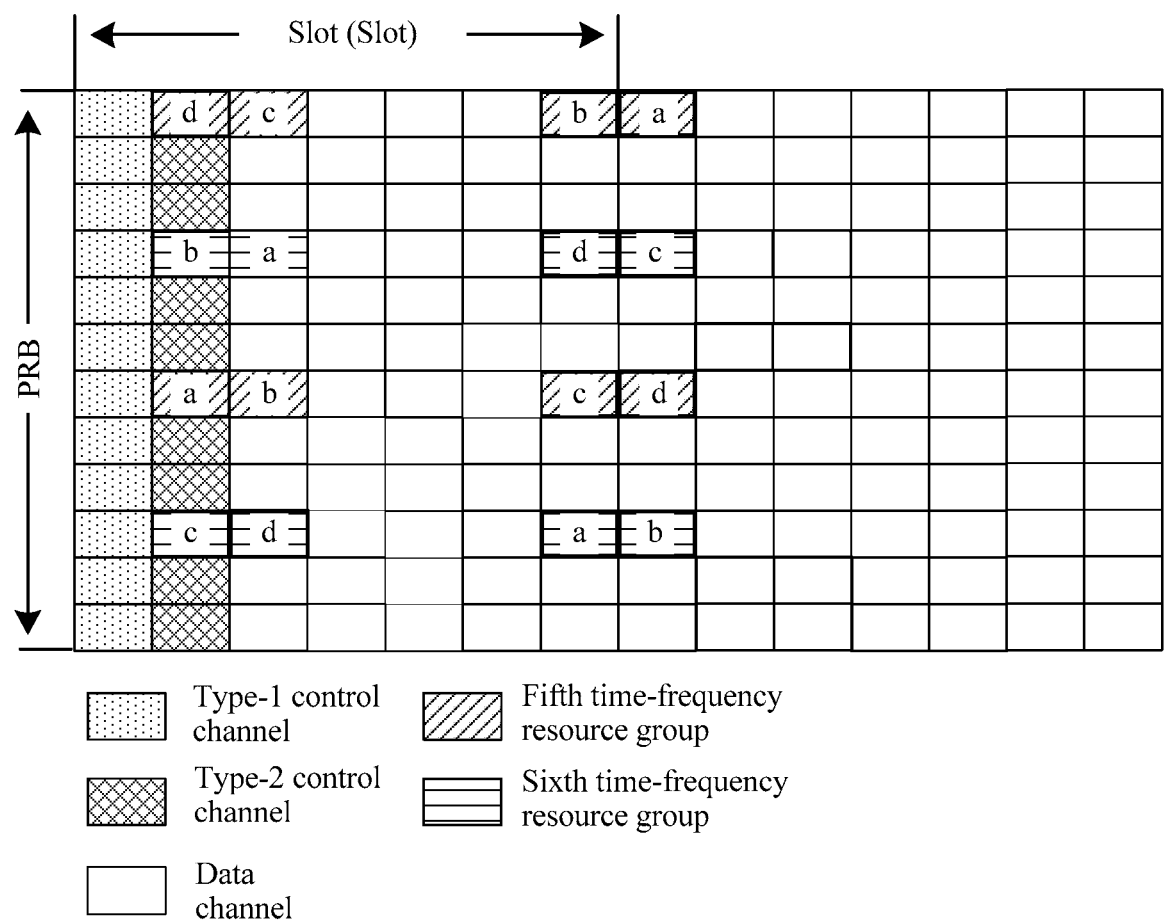
FIG. 4E is a schematic diagram of a sequence corresponding to a specified time-frequency resource according to an embodiment of the present disclosure.

In this embodiment of the present disclosure, assuming that the four sequences corresponding to each of the seventh time-frequency resource group to the tenth time-frequency resource group and obtained by mapping based on the third preset rul are pairwise orthogonal, the mapping manner indicated by the third preset rule may be a mapping manner shown in Table 3, or may be a mapping manner shown in Table 4. Table 3 and Table 4 further show the mapping manners and corresponding mapping results. In Table 3, "Fifth row+Fifth row" in the third preset rule indicates that the fifth row in the $W_{OCC}$ sequence group shown in the formula (3) is mapped to the fifth time-frequency resource group and the sixth time-frequency resource group respectively. Likewise, "Fifth row+Seventh row" in Table 4 indicates that the fifth row in the $W_{OCC}$ sequence group shown in the formula (3) is mapped to the fifth time-frequency resource group and that the seventh row is mapped to the seventh time-frequency resource group. The four sequences corresponding to each of the seventh time-frequency resource group to the tenth time-frequency resource group may be obtained according to the method shown in FIG. 4E. As can be learned from the mapping results shown in Table 3 and Table 4, both the two mapping manners may cause the four sequences corresponding to each of the seventh time-frequency resource group to the tenth time-frequency resource group to be pairwise orthogonal.

TABLE 3

| Third preset rule | Seventh time-frequency resource group | Eighth time-frequency resource group | Ninth time-frequency resource group | Tenth time-frequency resource group |
| --- | --- | --- | --- | --- |
| Fifth row + Fifth row | [1, 1, 1, 1] | [−1, −1, −1, −1] | [−1, −1, −1, −1] | [1, 1, 1, 1] |
| Sixth row + Sixth row | [1, 1, −1, −1] | [−1, −1, 1, 1] | [1, 1, −1, −1] | [−1, −1, 1, 1] |
| Seventh row + Seventh row | [1, −1, −1, 1] | [1, −1, −1, 1] | [−1, 1, 1, −1] | [−1, 1, 1, −1] |
| Eighth row + Eighth row | [1, −1, 1, −1] | [1, −1, 1, −1] | [1, −1, 1, −1] | [1, −1, 1, −1] |

TABLE 4

| Third preset rule | Seventh time-frequency resource group | Eighth time-frequency resource group | Ninth time-frequency resource group | Tenth time-frequency resource group |
| --- | --- | --- | --- | --- |
| Fifth row + Seventh row | [1, −1, −1, 1] | [1, −1, −1, 1] | [−1, −1, −1, −1] | [1, 1, 1, 1] |
| Sixth row + Eighth row | [1, −1, 1, −1] | [1, −1, 1, −1] | [1, 1, −1, −1] | [−1, −1, 1, 1] |
| Seventh row + Fifth row | [1, 1, 1, 1] | [−1, −1, −1, −1] | [−1, 1, 1, −1] | [−1, 1, 1, −1] |
| Eighth row + Sixth row | [1, 1, −1, −1] | [−1, −1, 1, 1] | [1, −1, 1, −1] | [1, −1, 1, −1] |

Certainly, the third preset rule may be the mapping manner shown in FIG. 4C, or may be another mapping rule that can cause the obtained four sequences corresponding to the seventh time-frequency resource group to be pairwise orthogonal and cause the four sequences corresponding to at least one of the eighth time-frequency resource group to the tenth time-frequency resource group to be pairwise orthogonal. Correspondingly, the mapping manner indicated by the third preset rule may also be a mapping manner other than the mapping manners in Table 3 and Table 4. In the present disclosure, a specific mapping manner corresponding to the third preset rule is not limited.

In the foregoing mapping manner, the reference signal of the seventh time-frequency resource group can be orthogonal to the reference signals of the antenna ports 1 to 4 by using orthogonal sequences. In addition, when a time-frequency resource occupied by the type-2 control channel includes the seventh time-frequency resource group, the reference signal of the seventh time-frequency resource group may be used to demodulate the control signal on the type-2 control channel and the data signal on the data channel, and the control signal can be quickly demodulated; and further, in the foregoing mapping manner, a reference signal of any one of the eighth time-frequency resource group to the tenth time-frequency resource group may be further used as an auxiliary reference signal for the reference signal of the seventh time-frequency resource group, so that a success ratio of demodulating the control signal and the data signal can be increased.

In still another embodiment of the present disclosure, the four reference signals corresponding to the mapped sequence are mapped to the fifth time-frequency resource group and the sixth time-frequency resource group respectively based on the third preset rule, so that even power allocation in time domain and frequency domain is implemented for reference signals on the first OFDM symbol in the data region, the second OFDM symbol in the data region, the $i^{th}$ OFDM symbol in the data region, and the $j^{th}$ OFDM symbol in the data region.

A specific method for mapping the four reference signals corresponding to the mapped sequence, to the fifth time-frequency resource group and the sixth time-frequency resource group respectively based on the third preset rule is similar to the method for mapping two reference signals corresponding to the mapped sequence, to the first time-frequency resource group and the second time-frequency resource group respectively based on the third preset rule in step 203. Details are not described again herein.

Because the four reference signals corresponding to the mapped sequence are mapped to the fifth time-frequency resource group and the sixth time-frequency resource group respectively based on the third preset rule, even power allocation in time domain and even power allocation in frequency domain can be implemented for the reference signal of the fifth time-frequency resource group and the reference signal of the sixth time-frequency resource group on the time domain OFDM symbols corresponding to the fifth time-frequency resource group and the sixth time-frequency resource group. This reduces signal distortion caused by power fluctuation of a transmitter, improves stability of information transmission, and ensures accuracy and a success ratio of information transmission.

The foregoing steps 401 to 403 are a process of mapping the four reference signals to the specified time-frequency resource. After mapping the four reference signals to the specified time-frequency resource, the base station transmits at least one of the four reference signals to user equipment.

In this embodiment of the present disclosure, the method for transmitting a reference signal to the user equipment may be the same as or different from the method for transmitting a reference signal in Embodiment 1. Specifically, when the base station uses both of the reference signal mapping methods shown in Embodiment 1 and Embodiment 3 for mapping a reference signal, that is, when both a reference signal mapped to the first time-frequency resource group shown in the upper figure of FIG. 2A and a reference signal mapped to the fifth time-frequency resource group shown in the upper figure of FIG. 4A exist in a PRB, as can be learned from the first time-frequency resource group shown in the upper figure of FIG. 2A and the fifth time-frequency resource group shown in the upper figure of FIG. 4A, the fifth time-frequency resource group includes the first time-frequency resource group. When port information of the antenna port corresponding to the first time-frequency resource group overlaps port information of the antenna port corresponding to the fifth time-frequency resource group, for example, when the first time-frequency resource group corresponds to the antenna port 1 and the antenna port 2, and the fifth time-frequency resource group corresponds to the antenna port 1 to the antenna port 4, the antenna port 1 and the antenna port 2 are overlapping port information. In this case, when the base station transmits the port information of the antenna port to the user equipment, the used method may include the following steps 404 to 411.

404. The base station transmits second indication information to user equipment.

In this embodiment of the present disclosure, definitions of the second indication information and first indication information are the same as definitions of the corresponding indication information in step 204. Details are not described again herein.

405. The user equipment receives the second indication information used to indicate a time-frequency resource location of first indication information.

406. The base station transmits the first indication information to the user equipment.

407. The user equipment receives, based on the time-frequency resource location of the first indication information, the first indication information in the time-frequency resource location of the first indication information.

408. The base station transmits the at least one reference signal to a user equipment.

409. The user equipment detects whether the first indication information includes time-frequency resource extension indication information, and if the first indication information does not include the time-frequency resource extension indication information, performs step 410, or if the first indication information includes the time-frequency resource extension indication information, performs step 411.

The time-frequency resource extension indication information is used to indicate whether the time-frequency resource on which the transmitted reference signal is located includes an extended time-frequency resource group. For the first time-frequency resource group shown in the upper figure of FIG. 2A and the fifth time-frequency resource group shown in the upper figure of FIG. 4A, four REs on a seventh OFDM symbol and an eighth OFDM symbol of the PRB shown in the upper figure of FIG. 4A in time domain are an extended time-frequency resource group.

In this embodiment of the present disclosure, the time-frequency resource extension indication information may be indicated in the following two manners:

1. The time-frequency resource extension indication information is used to indicate that the time-frequency resource on which the at least one reference signal is located includes a first extended time-frequency resource group, and the extended time-frequency resource group includes a plurality of REs on a preset OFDM symbol.

The time-frequency resource extension indication information may be a string of specific characters. The preset OFDM symbol may be any OFDM symbol in a data region in a PRB. The preset OFDM symbol and the string of characters may be set by a developer, or may be set by using another method. This is not specifically limited in this embodiment of the present disclosure.

2. The time-frequency resource extension indication information includes location information of the extended time-frequency resource group.

The location information of the extended time-frequency resource group may be indicated in a form of coordinates. For example, when the location information of the extended time-frequency resource group is {(x1, y1), (x2, y2), (x3, y3), (x4, y4)}, x1 indicates a location of a first RE in the extended time-frequency resource group on a corresponding OFDM symbol in time domain, y1 indicates a location of the first RE on a corresponding subcarrier in frequency domain, and meanings indicated by x2, y2, x3, y3, x4, and y4 are similar to this. Details are not described again herein. Certainly, the location information of the extended time-frequency resource group may also be indicated in another form. This is not specifically limited in this embodiment of the present disclosure.

The method for indicating the time-frequency resource extension indication information may be either of the foregoing two methods, or may be another indication method. This is not specifically limited in this embodiment of the present disclosure.

Whether the first indication information includes the time-frequency resource extension indication information is detected. Therefore, when reference signals mapped by using different mapping methods exist in a same PRB, and port information of antenna ports corresponding to different reference signals is the same, a time-frequency resource location for receiving a reference signal and a corresponding antenna port can be determined.

410. If the first indication information does not include the time-frequency resource extension indication information, the user equipment receives at least one reference signal on a first preset time-frequency resource group, where the first preset time-frequency resource group is a time-frequency resource group corresponding to a first preset antenna port.

When the base station uses both of the reference signal mapping methods shown in Embodiment 1 and Embodiment 3 for mapping a reference signal, that is, when both a reference signal mapped to the first time-frequency resource group shown in the upper figure of FIG. 2A and a reference signal mapped to the fifth time-frequency resource group shown in the upper figure of FIG. 4A exist in a PRB, port information of the antenna port corresponding to the first time-frequency resource group is T1 and T2, and port information of the antenna port corresponding to the fifth time-frequency resource group is T1, T2, T3, and T4, T1 and T2 are overlapping port information. When port information of the first preset antenna port included in the first indication information is T1, if the first indication information does not include the time-frequency resource extension indication information, the at least one reference signal transmitted by the base station is received on the antenna port whose port information corresponding to the first time-frequency resource group is T1, and a control signal and/or a data signal are/is demodulated based on the at least one reference signal.

411. If the first indication information includes the time-frequency resource extension indication information, receive the at least one reference signal on a second preset time-frequency resource group, where the second preset time-frequency resource group includes the first preset time-frequency resource group and an extended time-frequency resource group.

In a scenario described in step 410, when the port information of the first preset antenna port included in the first indication information is T1, if the first indication information includes the time-frequency resource extension indication information, the at least one reference signal transmitted by the base station is received on the antenna port whose port information corresponding to the fifth time-frequency resource group is T1, and the control signal and/or the data signal are/is demodulated based on the at least one reference signal.

It should be noted that, when the port information of the antenna port corresponding to the first time-frequency resource group shown in the upper figure of FIG. 2A does not overlap the port information of the antenna port corresponding to the fifth time-frequency resource group shown in the upper figure of FIG. 4A, the transmission methods shown in Embodiment 1 and Embodiment 2 may be used for transmitting a reference signal.

In the reference signal mapping method provided by this embodiment of the present disclosure, because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased. Further, because the four reference signals corresponding to the mapped sequence are mapped to the fifth time-frequency resource group and the sixth time-frequency resource group respectively based on the third preset rule, even power allocation in time domain and even power allocation in frequency domain can be implemented for the reference signal of the fifth time-frequency resource group and the reference signal of the sixth time-frequency resource group on the time domain OFDM symbols corresponding to the fifth time-frequency resource group and the sixth time-frequency resource group. This reduces signal distortion caused by power fluctuation of a transmitter, improves stability of information transmission, and ensures accuracy and a success ratio of information transmission.

Embodiment 4

Figure 5A:
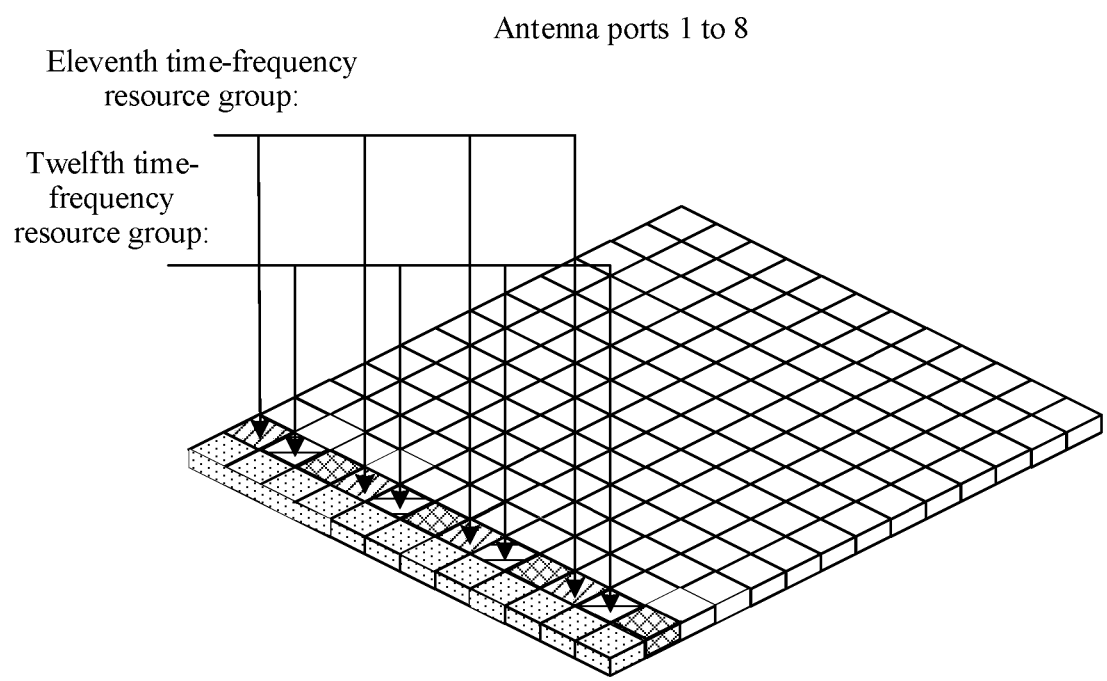
FIG. 5A is a schematic diagram of a specified time-frequency resource according to an embodiment of the present disclosure.

When a length of a sequence corresponding to a reference signal of each antenna port is 4, that is, when the reference signal of each antenna port occupies four REs in a PRB, as shown in FIG. 5A, four REs occupied by reference signals of antenna ports 1 to 4 are an eleventh time-frequency resource group, and four REs occupied by reference signals of antenna ports 5 to 8 are a twelfth time-frequency resource group. Code division multiplexing may be implemented, by using an orthogonal sequence group whose length is 4, for the four REs jointly occupied by the antenna ports 1 to 4 and the four REs jointly occupied by the antenna ports 5 to 8.

Figure 5B:
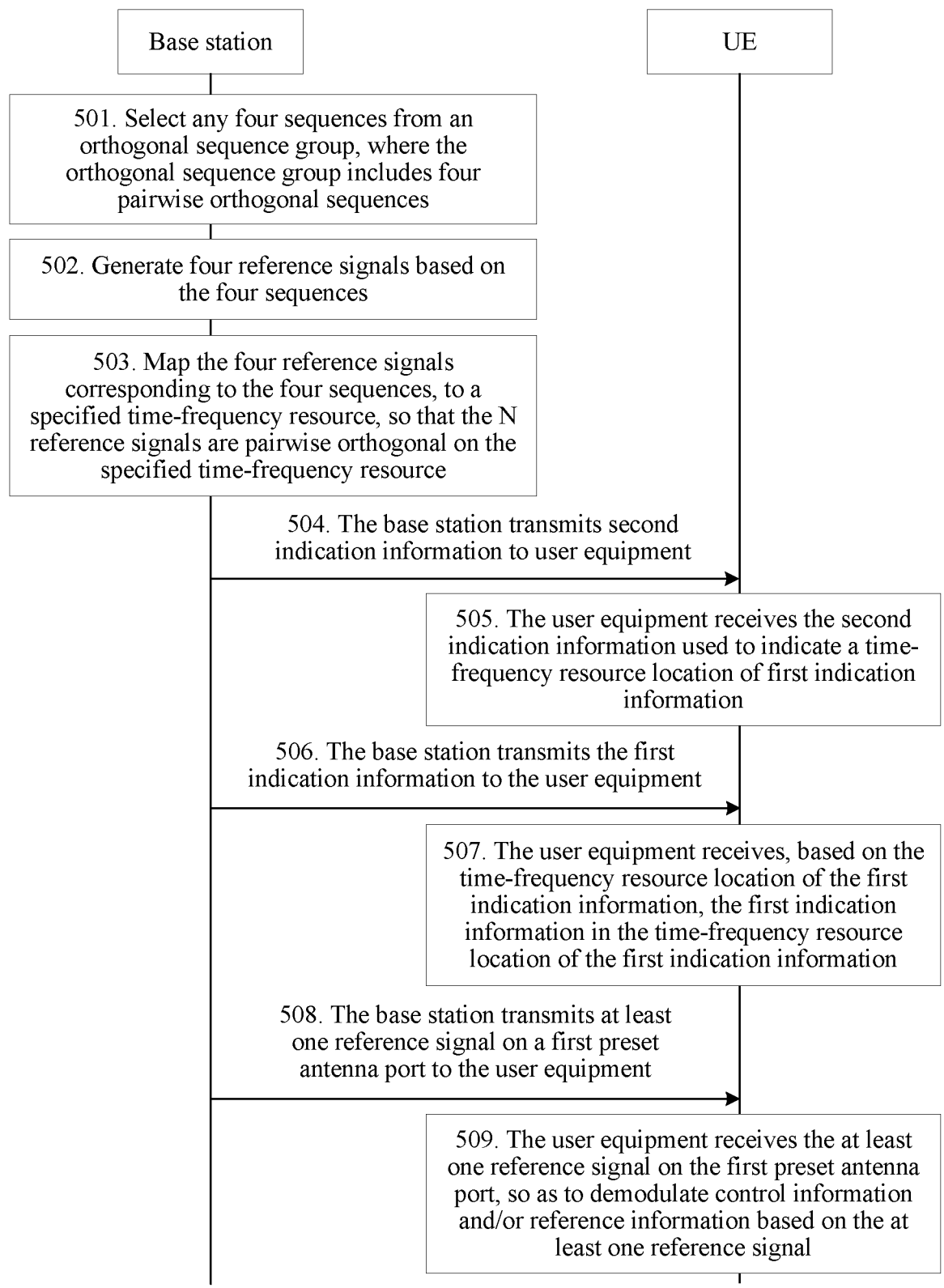
FIG. 5B is a flowchart of a reference signal mapping method according to an embodiment of the present disclosure.

FIG. 5B is a flowchart of a reference signal mapping method according to this embodiment of the present disclosure. As shown in FIG. 5B, the method includes the following steps.

501. Select any four sequences from an orthogonal sequence group, where the orthogonal sequence group includes four pairwise orthogonal sequences.

The orthogonal sequence group includes four pairwise orthogonal sequences. The four sequences are obtained from the orthogonal sequence group and used as orthogonal sequences for implementing code division multiplexing, and a quantity of the selected sequences is the same as a quantity of antenna ports corresponding to each time-frequency resource group.

In another embodiment of the present disclosure, when the orthogonal sequence group is the 4-dimensional Walsh- Hadamard sequence group $W_{OCC}$ shown in the formula (1), the four sequences may be the first row to the fourth row of the $W_{OCC}$ sequence group.

When the orthogonal sequence group is the 4-dimensional Walsh-Hadamard sequence, code division multiplexing can be implemented on four REs jointly occupied by four antenna ports.

502. Generate four reference signals based on the four sequences.

A method for generating a reference signal based on a sequence is similar to the method for generating a reference signal in step 202, and is not described again herein.

503. Map the four reference signals corresponding to the four sequences, to a specified time-frequency resource, so that the two reference signals are pairwise orthogonal on the specified time-frequency resource.

In this embodiment of the present disclosure, the specified time-frequency resource includes an eleventh time-frequency resource group and a twelfth time-frequency resource group, where the eleventh time-frequency resource group and the twelfth time-frequency resource group respectively include any four non-overlapping REs of a first OFDM symbol in a data region, and a reference signal of the eleventh time-frequency resource group and a reference signal of the twelfth time-frequency resource group are used to demodulate a data signal. For example, for the eleventh time-frequency resource group and the twelfth time-frequency resource group in FIG. 5A, certainly, the specified time-frequency resource may also be a time-frequency resource group including four other REs on the first OFDM symbol in the data region. This is not limited in this embodiment of the present disclosure.

In this embodiment of the present disclosure, assuming that the orthogonal sequence group is the $W_{OCC}$ sequence group shown in the formula (1), the reference signal mapping method provided by the present disclosure is described in detail.

A method for mapping the reference signals transmitted on the antenna port 1 to the antenna port 4 may be: mapping the four reference signals corresponding to the four sequences, to the eleventh time-frequency resource group and the twelfth time-frequency resource group respectively. For example, the method for mapping the reference signal corresponding to the sequence of the first row in the formula (1), to the eleventh time-frequency resource group in FIG. 5A may be: mapping a value of each position in a reference signal corresponding to [a, b, c, d]=[1, 1, 1, 1], to a corresponding RE sequentially. Correspondingly, reference signals corresponding to other rows in the formula (1) are also mapped in a same manner, and the eight mapped reference signals are used to demodulate a data signal on a data channel.

For the reference signals transmitted on the antenna port 5 to the antenna port 8, because the twelfth time-frequency resource group corresponding to the antenna port 5 to the antenna port 8 occupies a frequency different from a frequency of subcarriers occupied by the eleventh time-frequency resource group in frequency domain, the reference signal of the twelfth time-frequency resource group is orthogonal to the reference signal of the eleventh time-frequency resource group. Therefore, the sequences of the first row and the fourth row that are selected from the $W_{OCC}$ sequence group shown in the formula (1) may be used to map the reference signal of the twelfth time-frequency resource group. A specific mapping method is similar to the method for mapping the four reference signals correspond-ing to the four sequences, to the eleventh time-frequency resource group. Details are not described again herein.

In the foregoing reference signal mapping method, eight antenna ports can be mapped to a time-frequency resource including eight REs, and therefore eight reference signals can be transmitted simultaneously. It should be noted that, when a type-1 control channel occupies a first OFDM symbol of the PRB, a type-2 control channel occupies a second OFDM symbol of the PRB, and the data channel occupies another OFDM symbol of the PRB, reference signals corresponding to the four antenna ports may be used to demodulate a data signal, or may be used to demodulate a control signal on the type-2 control channel.

In another embodiment of the present disclosure, a method for mapping the four reference signals corresponding to the four sequences in the orthogonal sequence group may also be: mapping the four reference signals corresponding to the four sequences in the orthogonal sequence group, to the eleventh time-frequency resource group and the twelfth time-frequency resource group respectively based on a fourth preset rule, so that even power allocation in frequency domain is implemented for reference signals on the first OFDM symbol in the data region. The mapping the four reference signals corresponding to the four sequences, to the eleventh time-frequency resource group and the twelfth time-frequency resource group respectively based on a fourth preset rule means mapping a value of each position in the reference signals corresponding to the four sequences, to corresponding REs of the eleventh time-frequency resource group and the twelfth time-frequency resource group respectively.

Figure 5C:
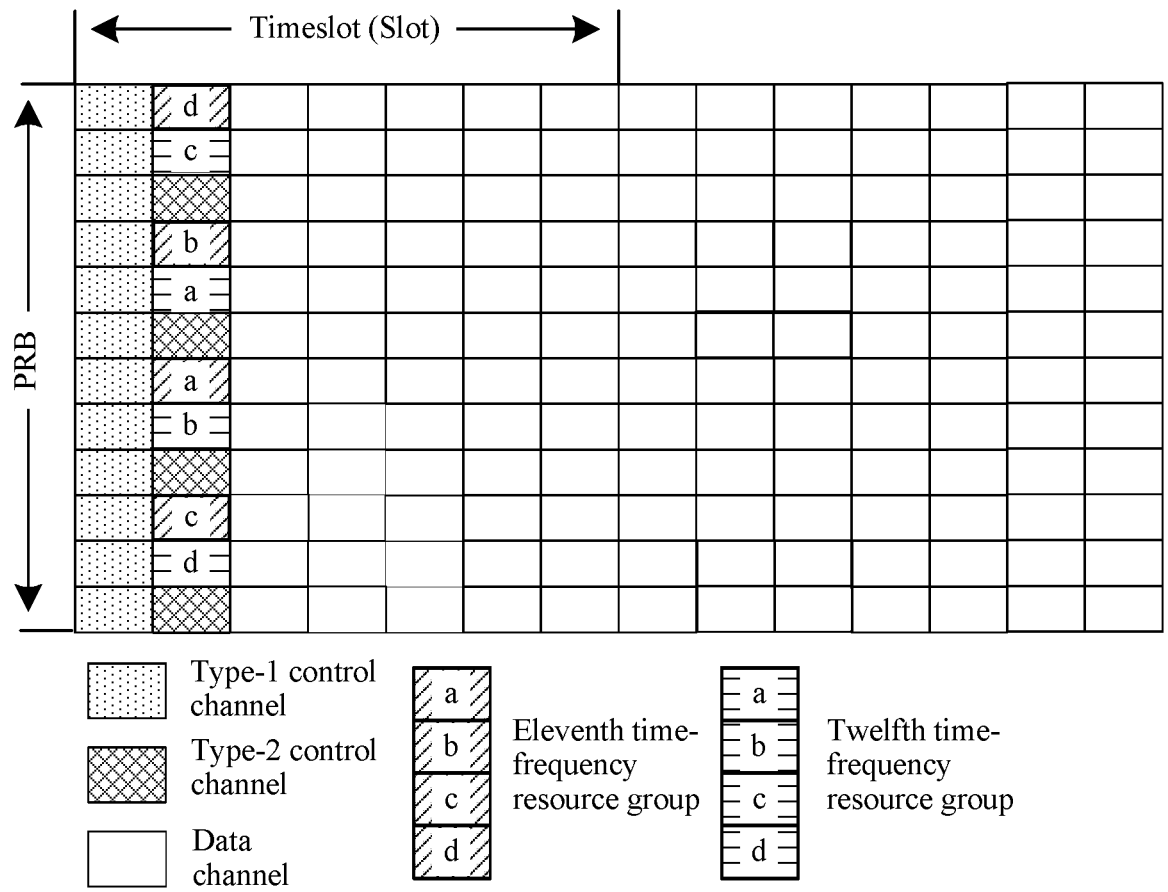
FIG. 5C is a schematic diagram of a mapping manner corresponding to a fourth preset rule according to an embodiment of the present disclosure.

FIG. 5C is a schematic diagram of a mapping manner corresponding to the fourth preset rule according to this embodiment of the present disclosure. In FIG. 5C, a, b, c, and d marked in four REs of the eleventh time-frequency resource group are used to indicate that values of corresponding positions in the reference signal corresponding to the sequence are mapped to corresponding REs. A specific mapping method is similar to the method for mapping the two reference signals corresponding to the two selected sequences in step 203, to the first time-frequency resource group based on the fourth preset rule. Details are not described again herein.

Certainly, the fourth preset rule may be the mapping manner shown in FIG. 5C, or may be another mapping rule that can implement even power allocation in frequency domain for reference signals on the first OFDM symbol in the data region. In the present disclosure, a specific mapping manner corresponding to the fourth preset rule is not limited.

Because the four reference signals corresponding to the four sequences are mapped to the eleventh time-frequency resource group and the twelfth time-frequency resource group respectively based on the fourth preset rule, even power allocation in frequency domain can be implemented for reference signals of the eleventh time-frequency resource group and the twelfth time-frequency resource group on the first OFDM symbol in the data region. This improves stability of information transmission, and ensures accuracy and a success ratio of information transmission.

In another embodiment of the present disclosure, after the four reference signals corresponding to the four sequences are mapped to the eleventh time-frequency resource group and the twelfth time-frequency resource group respectively, two antenna ports are selected from four antenna ports corresponding to the eleventh time-frequency resource group and two antenna ports are selected from four antenna ports corresponding to the twelfth time-frequency resource group, for data channel multiplexing and control channel multiplexing.

Selecting an antenna port for data channel multiplexing and control channel multiplexing means using a selected antenna port to transmit a reference signal that may be used to demodulate a data signal and a control signal. For example, antenna ports 1, 2, 5, and 6 may be selected for data channel multiplexing and control channel multiplexing, or four other antenna ports may be selected for data channel multiplexing and control channel multiplexing. This is not specifically limited in the present disclosure.

Because the two antenna ports are selected from the four antenna ports corresponding to the eleventh time-frequency resource group and the two antenna ports are selected from the four antenna ports corresponding to the twelfth time-frequency resource group, for data channel multiplexing and control channel multiplexing, a control signal and a data signal can be quickly demodulated.

The foregoing steps 501 to 503 are a process of mapping the two reference signals to the specified time-frequency resource. After mapping the two reference signals to the specified time-frequency resource, the base station transmits at least one of the N reference signals to user equipment. The following steps 504 to 509 are a process of transmitting a reference signal to the user equipment.

504. The base station transmits second indication information to user equipment.

In this embodiment of the present disclosure, definitions of the second indication information and first indication information are the same as definitions of the corresponding indication information in step 204. Details are not described again herein.

505. The user equipment receives the second indication information used to indicate a time-frequency resource location of first indication information.

506. The base station transmits the first indication information to the user equipment.

507. The user equipment receives, based on the time-frequency resource location of the first indication information, the first indication information in the time-frequency resource location of the first indication information.

508. The base station transmits the at least one reference signal on a first preset antenna port to the user equipment.

509. The user equipment receives the at least one reference signal on the first preset antenna port, so as to demodulate a control signal and/or a data signal based on the at least one reference signal.

In the reference signal mapping method provided by this embodiment of the present disclosure, because the reference signals are mapped to the specified time-frequency resource including a plurality of REs on first several OFDM symbols in the data region in time domain, the reference signals do not need to span the whole time-frequency resource. A reference signal used to demodulate a control signal and/or a data signal is transmitted only when the control signal and/or the data signal are/is transmitted. Therefore, the control signal and the data signal can be quickly demodulated, a low-latency requirement of a 5G communications network is satisfied, code division multiplexing is implemented by using orthogonal sequences, and a quantity of concurrent multiplex on the data channel and a quantity of user equipments multiplexed on the control channel are increased. Further, because the four reference signals corresponding to the four sequences are mapped to the eleventh time-frequency resource group and the twelfth time-frequency resource group respectively based on the fourth preset rule, even power allocation in frequency domain can be implemented for the reference signal of the eleventh time-frequency resource group and the reference signal of the twelfth time-frequency resource group on the first OFDM symbol in the data region. This reduces signal distortion caused by power fluctuation of a transmitter, improves stability of information transmission, and ensures accuracy and a success ratio of information transmission.

Figure 6:
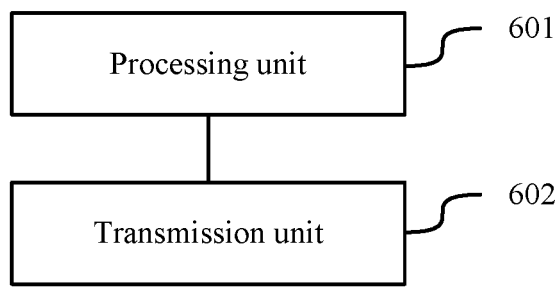
FIG. 6 is a block diagram of a reference signal mapping apparatus according to an embodiment of the present disclosure.

FIG. 6 is a block diagram of a reference signal mapping apparatus according to an embodiment of the present disclosure. Referring to FIG. 6, the apparatus includes a processing unit 601 and a transmission unit 602.

The processing unit 601 is configured to map N reference signals to a specified time-frequency resource, where N is a positive integer greater than or equal to 1.

The transmission unit 602 is configured to transmit at least one of the N reference signals on the specified time-frequency resource to user equipment, where for any physical resource block (PRB), the specified time-frequency resource includes a first orthogonal frequency division multiplexing (OFDM) symbol in a data region in time domain; where the PRB includes a type-1 control channel and the data region, the data region includes a type-2 control channel and a data channel, the type-1 control channel includes first m OFDM symbols of the PRB in time domain, and the data region includes OFDM symbols other than the type-1 control channel in the PRB in time domain; and the type-2 control channel includes first n OFDM symbols in the data region in time domain, the data channel includes OFDM symbols other than the type-2 control channel in the data region in time domain, and m and n are both positive integers greater than or equal to 1.

In a first possible implementation of the present disclosure, the specified time-frequency resource includes the data channel.

In a second possible implementation of the present disclosure, the processing unit 601 is configured to:

select any N sequences from an orthogonal sequence group, where the orthogonal sequence group includes M pairwise orthogonal sequences, N is a quantity of antenna ports, M and N are both positive integers greater than or equal to 1, and M is not less than N;

generate the N reference signals based on the N sequences; and map the N reference signals corresponding to the N sequences, to the specified time-frequency resource, so that the N reference signals are pairwise orthogonal on the specified time-frequency resource.

In a third possible implementation of the present disclosure, the transmission unit 602 is further configured to:

transmit first indication information to the user equipment, where the first indication information includes port information of a first preset antenna port, and the first preset antenna port is configured to transmit the at least one reference signal; and correspondingly, the transmission unit is configured to transmit the at least one reference signal on the first preset antenna port to the user equipment.

In a fourth possible implementation of the present disclosure, when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further includes a subframe location of a subframe in which the at least one reference signal is located, and correspondingly, a time-frequency resource corresponding to the first preset antenna port is located in a data region of a second PRB, where the second PRB is at least one PRB corresponding to the subframe in which the at least one reference signal is located; or when the first indication information is transmitted on the type-1 control channel in a subframe in which the PRB is located, the first indication information further includes a subframe location of a subframe in which the at least one reference signal is located, and correspondingly, a time-frequency resource corresponding to the first preset antenna port is located in a data region of a third PRB, where the third PRB includes at least one PRB in the subframe in which the PRB is located and at least one PRB corresponding to the subframe in which the at least one reference signal is located.

In a fifth possible implementation of the present disclosure, when a length of a sequence corresponding to a reference signal of each antenna port is 4, M is 4, and N is 2, the specified time-frequency resource includes a first time-frequency resource group and a second time-frequency resource group, where each time-frequency resource group corresponds to two antenna ports; and the processing unit 601 is configured to:

obtain a mapped sequence of a first sequence group, where the first sequence group includes a first sequence and a second sequence, and the first sequence and the second sequence are two sequences selected from the orthogonal sequence group; and map two reference signals corresponding to the mapped sequence, to the first time-frequency resource group and the second time-frequency resource group respectively; where the first time-frequency resource group and the second time-frequency resource group respectively include two REs of the first OFDM symbol in the data region and two REs of a second OFDM symbol in the data region, where the two REs of the first OFDM symbol and the two REs of the second OFDM symbol occupy subcarriers of a same frequency; and the reference signal of the first time-frequency resource group and the reference signal of the second time-frequency resource group are used to demodulate a data signal.

In a sixth possible implementation of the present disclosure, the specified time-frequency resource further includes a third time-frequency resource group and a fourth time-frequency resource group, and each time-frequency resource group corresponds to two antenna ports; and correspondingly, the processing unit 601 is further configured to:

map a reference signal corresponding to a third sequence in a second sequence group, to the first time-frequency resource group and the second time-frequency resource group respectively based on a first preset rule; and map a reference signal corresponding to a fourth sequence in the second sequence group, to the first time-frequency resource group and the second time-frequency resource group respectively based on the first preset rule, so that a third sequence group corresponding to the third time-frequency resource group includes the third sequence and the fourth sequence; where the second sequence group includes the third sequence and the fourth sequence other than the first sequence group in the orthogonal sequence group;

the third time-frequency resource group includes the four REs of the first OFDM symbol that are in the first time-frequency resource group and the second time-frequency resource group and are located in the data region, and the fourth time-frequency resource group includes the four REs of the second OFDM symbol that are in the first time-frequency resource group and the second time-frequency resource group and are located in the data region; and a reference signal of the third time-frequency resource group is used to demodulate a data signal and/or a control signal.

In a seventh possible implementation of the present disclosure, the processing unit 601 is further configured to:

when n is greater than or equal to 2, obtain, based on a mapping result of the second sequence group in the first time-frequency resource group and the second time-frequency resource group, a fourth sequence group corresponding to the fourth time-frequency resource group, where the first preset rule causes the fourth sequence group obtained based on the mapping result to be the same as the third sequence group, and a reference signal of the fourth time-frequency resource group is used as an auxiliary reference signal for the reference signal of the third time-frequency resource group.

In an eighth possible implementation of the present disclosure, the processing unit 601 is further configured to:

map two reference signals corresponding to the mapped sequence, to the first time-frequency resource group and the second time-frequency resource group respectively based on the first preset rule, so that even power allocation in time domain and frequency domain is implemented for reference signals on the first OFDM symbol in the data region and the second OFDM symbol in the data region.

In a ninth possible implementation of the present disclosure, when a length of a sequence corresponding to a reference signal of each antenna port is 8, M is 8, and N is 8, the processing unit 601 is configured to map eight reference signals corresponding to the eight sequences, to the specified time-frequency resource respectively, where a reference signal corresponding to the specified time-frequency resource is used to demodulate a data signal; where the specified time-frequency resource includes four REs of the first OFDM symbol in the data region and four REs of a second OFDM symbol in the data region, where the four REs of the first OFDM symbol and the four REs of the second OFDM symbol occupy subcarriers of a same frequency.

In a tenth possible implementation of the present disclosure, the processing unit 601 is further configured to:

map the eight reference signals corresponding to the eight sequences, to the specified time-frequency resource respectively based on a second preset rule, so that the specified time-frequency resource has four pairwise orthogonal sequences on the four REs of the first OFDM symbol in the data region, where reference signals corresponding to the four REs of the first OFDM symbol are used to demodulate a control signal and/or a data signal.

In an eleventh possible implementation of the present disclosure, when a length of a sequence corresponding to a reference signal of each antenna port is 8, M is 8, and N is 4, the specified time-frequency resource includes a fifth time-frequency resource group and a sixth time-frequency resource group, where each time-frequency resource group corresponds to four antenna ports; and the processing unit 601 is configured to:

obtain a mapped sequence of a third sequence group, where the third sequence group includes the four sequences selected from the orthogonal sequence group; and map four reference signals corresponding to the mapped sequence, to the fifth time-frequency resource group and the sixth time-frequency resource group respectively; where the fifth time-frequency resource group and the sixth time-frequency resource group respectively include two REs of the first OFDM symbol, two REs of a second OFDM symbol, two REs of an $i^{th}$ OFDM symbol, and two REs of a $j^{th}$ OFDM symbol in the data region, where the two REs of the first OFDM symbol, the two REs of the second OFDM symbol, the two REs of the $i^{th}$ OFDM symbol, and the two REs of the $j^{th}$ OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal.

In a twelfth possible implementation of the present disclosure, the specified time-frequency resource further includes a seventh time-frequency resource group, the seventh time-frequency resource group includes the four REs of the first OFDM symbol that are in the fifth time-frequency resource group and the sixth time-frequency resource group and are located in the data region, and the seventh time-frequency resource group corresponds to four antenna ports; and correspondingly, the processing unit 601 is further configured to:

map four reference signals corresponding to four sequences other than the four sequences included in the third sequence group in the orthogonal sequence group, to the fifth time-frequency resource group and the sixth time-frequency resource group respectively based on a third preset rule to obtain a mapping result, so that four sequences of the seventh time-frequency resource group in the mapping result are pairwise orthogonal, where a reference signal of the seventh time-frequency resource group is used to demodulate a data signal and/or a control signal.

In a thirteenth possible implementation of the present disclosure, the specified time-frequency resource further includes an eighth time-frequency resource group, the eighth time-frequency resource group includes the four REs of the second OFDM symbol that are in the fifth time-frequency resource group and the sixth time-frequency resource group and are located in the data region, and the eighth time-frequency resource group corresponds to four antenna ports; and correspondingly, the processing unit 601 is further configured to:

when n is greater than or equal to 2 and less than i, obtain, based on the mapping result, four sequences corresponding to the eighth time-frequency resource group, where the third preset rule causes the four sequences corresponding to the eighth time-frequency resource group and obtained based on the mapping result to be pairwise orthogonal, and a reference signal of the eighth time-frequency resource group is used as an auxiliary reference signal for the reference signal of the seventh time-frequency resource group.

In a fourteenth possible implementation of the present disclosure, the specified time-frequency resource further includes a ninth time-frequency resource group, the ninth time-frequency resource group includes the four REs of the OFDM symbol that are in the fifth time-frequency resource group and the sixth time-frequency resource group and are located in the data region, and the ninth time-frequency resource group corresponds to four antenna ports; and correspondingly, the processing unit 601 is further configured to:

obtain, based on the mapping result, four sequences corresponding to an eighth time-frequency resource group and four sequences corresponding to the ninth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal, and a reference signal of the eighth time-frequency resource group and/or a reference signal of the ninth time-frequency resource group are/is used as an auxiliary reference signal for the reference signal of the seventh time-frequency resource group.

In a fifteenth possible implementation of the present disclosure, the specified time-frequency resource further includes a tenth time-frequency resource group, the tenth time-frequency resource group includes the four REs of the $j^{th}$ OFDM symbol that are in the fifth time-frequency resource group and the sixth time-frequency resource group and are located in the data region, and the tenth time-frequency resource group corresponds to four antenna ports; and correspondingly, the processing unit 601 is further configured to:

obtain, based on the mapping result, four sequences corresponding to an eighth time-frequency resource group, four sequences corresponding to a ninth time-frequency resource group, and four sequences corresponding to the tenth time-frequency resource group, where the third preset rule causes the four sequences corresponding to the eighth time-frequency resource group and obtained based on the mapping result to be pairwise orthogonal and/or causes the four sequences corresponding to the ninth time-frequency resource group and obtained based on the mapping result to be pairwise orthogonal and/or causes the four sequences corresponding to the tenth time-frequency resource group and obtained based on the mapping result to be pairwise orthogonal, and a reference signal of the eighth time-frequency resource group and/or a reference signal of the ninth time-frequency resource group and/or a reference signal of the tenth time-frequency resource group are/is used as an auxiliary reference signal for the reference signal of the seventh time-frequency resource group.

In a sixteenth possible implementation of the present disclosure, the processing unit 601 is further configured to:

map the four reference signals corresponding to the mapped sequence, to the fifth time-frequency resource group and the sixth time-frequency resource group respectively based on the third preset rule, so that even power allocation in time domain and frequency domain is implemented for reference signals on the first OFDM symbol in the data region, the second OFDM symbol in the data region, the $i^{th}$ OFDM symbol in the data region, and the $j^{th}$ OFDM symbol in the data region.

In a seventeenth possible implementation of the present disclosure, when a length of a sequence corresponding to a reference signal of each antenna port is 4, M is 4, and N is 4, the specified time-frequency resource includes an eleventh time-frequency resource group and a twelfth time-frequency resource group, where each time-frequency resource group corresponds to four antenna ports; and the processing unit 601 is configured to:

map four reference signals corresponding to the four sequences, to the eleventh time-frequency resource group and the twelfth time-frequency resource group respectively; where the eleventh time-frequency resource group and the twelfth time-frequency resource group respectively include any four non-overlapping REs of the first OFDM symbol in the data region, and a reference signal of the eleventh time-frequency resource group and a reference signal of the twelfth time-frequency resource group are used to demodulate a data signal.

In an eighteenth possible implementation of the present disclosure, the processing unit 601 is further configured to:

map four reference signals corresponding to four sequences in the orthogonal sequence group, to the eleventh time-frequency resource group and the twelfth time-frequency resource group respectively based on a fourth preset rule, so that even power allocation in frequency domain is implemented for reference signals on the first OFDM symbol in the data region.

In a nineteenth possible implementation of the present disclosure, the processing unit 601 is further configured to:

select two antenna ports from four antenna ports corresponding to the eleventh time-frequency resource group and two antenna ports from four antenna ports corresponding to the twelfth time-frequency resource group, for data channel multiplexing and control channel multiplexing.

In a twentieth possible implementation of the present disclosure, the indication information is further used to indicate that the specified time-frequency resource further includes a first extended time-frequency resource, and the first extended time-frequency resource is a plurality of REs on a preset OFDM symbol; or the indication information is further used to indicate that the specified time-frequency resource further includes a second extended time-frequency resource, and correspondingly, the indication information further includes location information of the second extended time-frequency resource.

In a twenty-first possible implementation of the present disclosure, the transmission unit 602 is further configured to:

transmit second indication information to the user equipment, where the second indication information is used to indicate a time-frequency resource location of the type-2 control channel.

In a twenty-second possible implementation of the present disclosure, the orthogonal sequence group is a Walsh-Hadamard sequence group.

Figure 7:
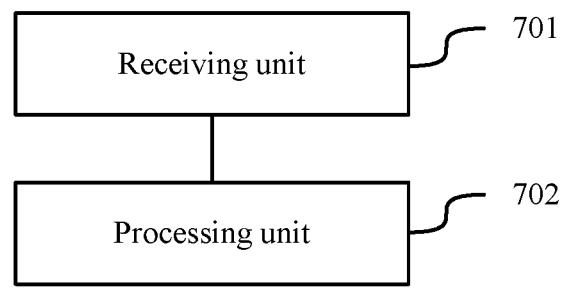
FIG. 7 is a block diagram of a reference signal mapping apparatus according to an embodiment of the present disclosure.

FIG. 7 is a block diagram of a reference signal mapping apparatus according to an embodiment of the present disclosure. Referring to FIG. 7, the apparatus includes a receiving unit 701 and a processing unit 702.

The receiving unit 701 is configured to receive first indication information, where the first indication information includes at least port information of a first preset antenna port.

The processing unit 702 is configured to detect whether the first indication information includes time-frequency resource extension indication information.

The receiving unit 701 is further configured to receive at least one reference signal on a first preset time-frequency resource group if the first indication information does not include the time-frequency resource extension indication information, where the first preset time-frequency resource group is a time-frequency resource group corresponding to the first preset antenna port.

The receiving unit 701 is further configured to receive the at least one reference signal on a second preset time-frequency resource group if the first indication information includes the time-frequency resource extension indication information, where the second preset time-frequency resource group includes the first preset time-frequency resource group and an extended time-frequency resource group.

The processing unit 702 is further configured to demodulate a control signal and/or a data signal based on the at least one reference signal.

In a first possible implementation of the present disclosure, the time-frequency resource extension indication information is used to indicate that a time-frequency resource on which the at least one reference signal is located includes the extended time-frequency resource group, and the extended time-frequency resource group includes a plurality of REs on a preset OFDM symbol.

In a second possible implementation of the present disclosure, the time-frequency resource extension indication information includes location information of the extended time-frequency resource group.

Figure 8:
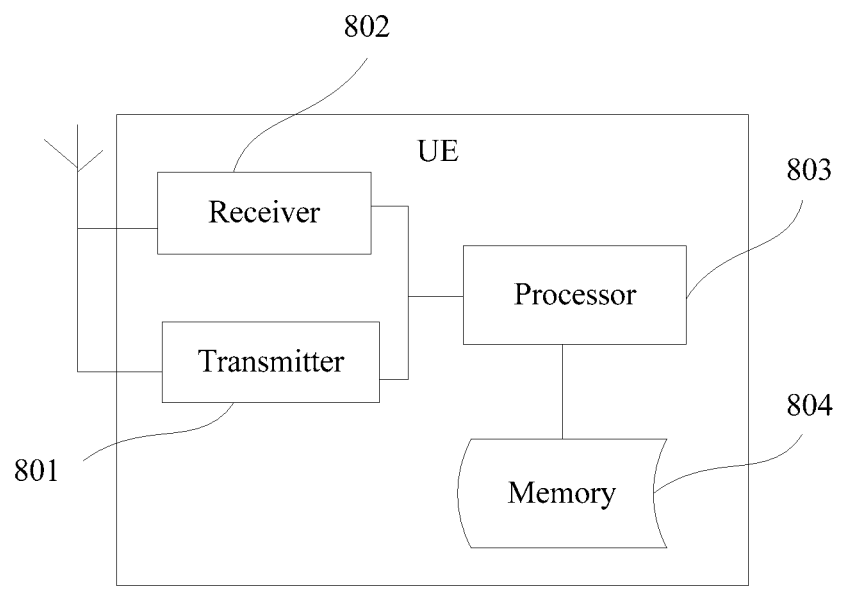
FIG. 8 is a schematic structural diagram of user equipment UE according to an embodiment of the present disclosure.

FIG. 8 is a schematic structural diagram of user equipment UE according to an embodiment of the present disclosure. As shown in the figure, the UE includes a transmitter 801, a receiver 802, and a processor 803 connected to the transmitter 801 and the receiver 802 respectively. Certainly, the UE may further include a universal component such as a memory 804 or an antenna. This is not limited herein in this embodiment of the present disclosure.

The processor is configured to perform the methods performed on the user equipment side in Embodiment 1 to Embodiment 4.

Figure 9:
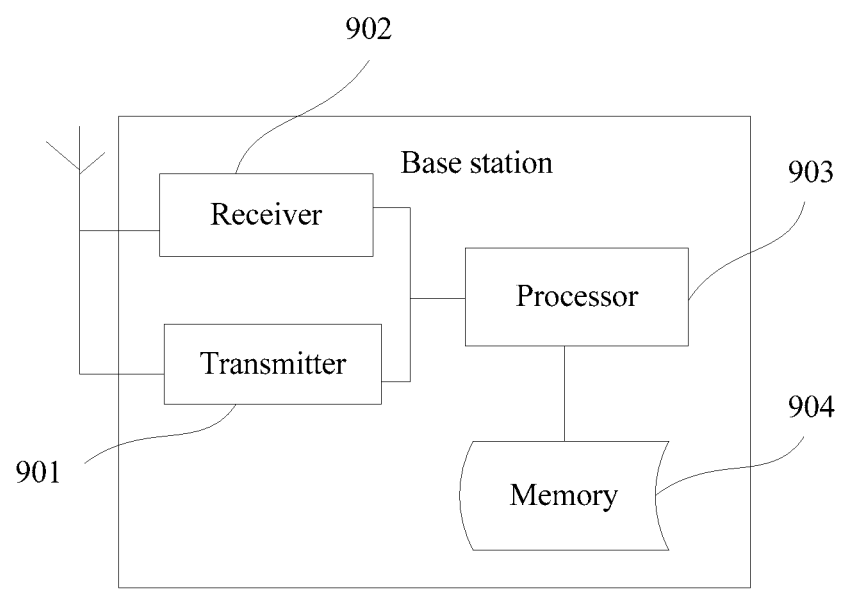
FIG. 9 is a schematic structural diagram of a base station according to an embodiment of the present disclosure.

FIG. 9 is a schematic structural diagram of a base station according to an embodiment of the present disclosure. As shown in the figure, the base station includes a transmitter 901, a receiver 902, and a processor 903 connected to the transmitter 901 and the receiver 902 respectively. Certainly, the base station may further include a universal component such as a memory 904, an antenna, a baseband processing component, an intermediate radio frequency processing component, or an input/output apparatus. This is not limited herein in this embodiment of the present disclosure.

The processor is configured to perform the methods performed on the base station side in Embodiment 1 to Embodiment 4.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of the present disclosure, but are not intended to limit the present disclosure. Any modification, equivalent replacement, or improvement made without departing from the spirit and principle of the present disclosure should fall within the protection scope of the present disclosure.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A reference signal mapping method, wherein the method comprises:

mapping, by a base station, N reference signals to a specified time-frequency resource, wherein N is a positive integer greater than or equal to 1; and transmitting, by the base station, at least one of the N reference signals on the specified time-frequency resource to user equipment, wherein for any physical resource block (PRB), the specified time-frequency resource comprises a first orthogonal frequency division multiplexing (OFDM) symbol in a data region in time domain; wherein the PRB comprises a type-1 control channel and the data region, the data region comprises a type-2 control channel and a data channel, the type-1 control channel comprises first m OFDM symbols of the PRB in time domain, and the data region comprises OFDM symbols other than the type-1 control channel in the PRB in time domain; and the type-2 control channel comprises first n OFDM symbols in the data region in time domain, the data channel comprises OFDM symbols other than the type-2 control channel in the data region in time domain, and m and n are both positive integers greater than or equal to 1; and, wherein mapping, by the base station, the N reference signals to a specified time-frequency resource comprises:

selecting any N sequences from an orthogonal sequence group, wherein the orthogonal sequence group comprises M pairwise orthogonal sequences, N is a quantity of antenna ports, M and N are both positive integers greater than or equal to 1, and M is not less than N;

generating the N reference signals based on the N sequences; and mapping the N reference signals corresponding to the N sequences, to the specified time-frequency resource, so that the N reference signals are pairwise orthogonal on the specified time-frequency resource.

2. The method according to claim 1, wherein the specified time-frequency resource further comprises at least one OFDM symbol on the data channel in time domain.

3. The method according to claim 1, wherein before the transmitting at least one of the N reference signals to user equipment, the method further comprises:

transmitting first indication information to the user equipment, wherein the first indication information comprises port information of a first preset antenna port, and the first preset antenna port is configured to transmit the at least one reference signal; and correspondingly, the transmitting at least one of the N reference signals to user equipment comprises:

transmitting the at least one reference signal on the first preset antenna port to the user equipment.

4. The method according to claim 3, wherein when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further comprises a subframe location of a subframe in which the at least one reference signal is located, and correspondingly, a time-frequency resource corresponding to the first preset antenna port is located in a data region of a second PRB, wherein the second PRB is at least one PRB corresponding to the subframe in which the at least one reference signal is located; or when the first indication information is transmitted on the type-1 control channel in a subframe in which the PRB is located, the first indication information further comprises a subframe location of a subframe in which the at least one reference signal is located, and correspondingly, a time-frequency resource corresponding to the first preset antenna port is located in a data region of a third PRB, wherein the third PRB comprises at least one PRB in the subframe in which the PRB is located and at least one PRB corresponding to the subframe in which the at least one reference signal is located.

5. The method according to claim 1, wherein when a length of a sequence corresponding to a reference signal of each antenna port is 4, M is 4, and N is 2, the specified time-frequency resource comprises a first time-frequency resource group and a second time-frequency resource group, wherein each time-frequency resource group corresponds to two antenna ports; and the mapping the N reference signals corresponding to the N sequences, to the specified time-frequency resource comprises:

obtaining a mapped sequence of a first sequence group, wherein the first sequence group comprises a first sequence and a second sequence, and the first sequence and the second sequence are two sequences selected from the orthogonal sequence group; and mapping two reference signals corresponding to the mapped sequence, to the first time-frequency resource group and the second time-frequency resource group respectively; wherein the first time-frequency resource group and the second time-frequency resource group respectively comprise two resource elements (REs) of the first OFDM symbol in the data region and two REs of a second OFDM symbol in the data region, wherein the two REs of the first OFDM symbol and the two REs of the second OFDM symbol occupy subcarriers of a same frequency; and the reference signal of the first time-frequency resource group and the reference signal of the second time-frequency resource group are used to demodulate a data signal.

6. The method according to claim 1, wherein when a length of a sequence corresponding to a reference signal of each antenna port is 8, M is 8, and N is 8, the mapping the N reference signals corresponding to the N sequences, to the specified time-frequency resource comprises:

mapping eight reference signals corresponding to the eight sequences, to the specified time-frequency resource respectively, wherein a reference signal corresponding to the specified time-frequency resource is used to demodulate a data signal; wherein the specified time-frequency resource comprises four resource elements (REs) of the first OFDM symbol in the data region and four REs of a second OFDM symbol in the data region, wherein the four REs of the first OFDM symbol and the four REs of the second OFDM symbol occupy subcarriers of a same frequency.

7. The method according to claim 1, wherein when a length of a sequence corresponding to a reference signal of each antenna port is 8, M is 8, and N is 4, the specified time-frequency resource comprises a fifth time-frequency resource group and a sixth time-frequency resource group, wherein each time-frequency resource group corresponds to four antenna ports; and the mapping the N reference signals corresponding to the N sequences, to the specified time-frequency resource comprises:

obtaining a mapped sequence of a third sequence group, wherein the third sequence group comprises the four sequences selected from the orthogonal sequence group; and mapping four reference signals corresponding to the mapped sequence, to the fifth time-frequency resource group and the sixth time-frequency resource group respectively; wherein the fifth time-frequency resource group and the sixth time-frequency resource group respectively comprise two resource elements (REs) of the first OFDM symbol, two REs of a second OFDM symbol, two REs of an ith OFDM symbol, and two REs of a jth OFDM symbol in the data region, wherein the two REs of the first OFDM symbol, the two REs of the second OFDM symbol, the two REs of the ith OFDM symbol, and the two REs of the jth OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal.

8. The method according to claim 1, wherein when a length of a sequence corresponding to a reference signal of each antenna port is 4, M is 4, and N is 4, the specified time-frequency resource comprises an eleventh time-frequency resource group and a twelfth time-frequency resource group, wherein each time-frequency resource group corresponds to four antenna ports; and the mapping the N reference signals corresponding to the N sequences, to the specified time-frequency resource comprises:

mapping four reference signals corresponding to the four sequences, to the eleventh time-frequency resource group and the twelfth time-frequency resource group respectively; wherein the eleventh time-frequency resource group and the twelfth time-frequency resource group respectively comprise any four non-overlapping resource elements (REs) of the first OFDM symbol in the data region, and a reference signal of the eleventh time-frequency resource group and a reference signal of the twelfth time-frequency resource group are used to demodulate a data signal.

9. A reference signal mapping apparatus, wherein the apparatus comprises:

a processor, configured to map N reference signals to a specified time-frequency resource, wherein N is a positive integer greater than or equal to 1; and a transmitter, configured to transmit at least one of the N reference signals on the specified time-frequency resource to user equipment, wherein for any physical resource block (PRB), the specified time-frequency resource comprises a first orthogonal frequency division multiplexing OFDM symbol in a data region in time domain; wherein the PRB comprises a type-1 control channel and the data region, the data region comprises a type-2 control channel and a data channel, the type-1 control channel comprises first m OFDM symbols of the PRB in time domain, and the data region comprises OFDM symbols other than the type-1 control channel in the PRB in time domain; and the type-2 control channel comprises first n OFDM symbols in the data region in time domain, the data channel comprises OFDM symbols other than the type-2 control channel in the data region in time domain, and m and n are both positive integers greater than or equal to 1; and, wherein the processor is configured to:

select any N sequences from an orthogonal sequence group, wherein the orthogonal sequence group comprises M pairwise orthogonal sequences, N is a quantity of antenna ports, M and N are both positive integers greater than or equal to 1, and M is not less than N;

generate the N reference signals based on the N sequences; and map the N reference signals corresponding to the N sequences, to the specified time-frequency resource, so that the N reference signals are pairwise orthogonal on the specified time-frequency resource.

10. The apparatus according to claim 9, wherein the specified time-frequency resource comprises the data channel.

11. The apparatus according to claim 9, wherein the transmitter is further configured to:

transmit first indication information to the user equipment, wherein the first indication information comprises port information of a first preset antenna port, and the first preset antenna port is configured to transmit the at least one reference signal; and correspondingly, the transmission unit is configured to transmit the at least one reference signal on the first preset antenna port to the user equipment.

12. The apparatus according to claim 11, wherein when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further comprises a subframe location of a subframe in which the at least one reference signal is located, and correspondingly, a time-frequency resource corresponding to the first preset antenna port is located in a data region of a second PRB, wherein the second PRB is at least one PRB corresponding to the subframe in which the at least one reference signal is located; or when the first indication information is transmitted on the type-1 control channel in a subframe in which the PRB is located, the first indication information further comprises a subframe location of a subframe in which the at least one reference signal is located, and correspondingly, a time-frequency resource corresponding to the first preset antenna port is located in a data region of a third PRB, wherein the third PRB comprises at least one PRB in the subframe in which the PRB is located and at least one PRB corresponding to the subframe in which the at least one reference signal is located.

13. The apparatus according to claim 9, wherein when a length of a sequence corresponding to a reference signal of each antenna port is 4, M is 4, and N is 2, the specified time-frequency resource comprises a first time-frequency resource group and a second time-frequency resource group, wherein each time-frequency resource group corresponds to two antenna ports; and the processing unit is configured to:

obtain a mapped sequence of a first sequence group, wherein the first sequence group comprises a first sequence and a second sequence, and the first sequence and the second sequence are two sequences selected from the orthogonal sequence group; and map two reference signals corresponding to the mapped sequence, to the first time-frequency resource group and the second time-frequency resource group respectively; wherein the first time-frequency resource group and the second time-frequency resource group respectively comprise two resource elements (REs) of the first OFDM symbol in the data region and two REs of a second OFDM symbol in the data region, wherein the two REs of the first OFDM symbol and the two REs of the second OFDM symbol occupy subcarriers of a same frequency; and the reference signal of the first time-frequency resource group and the reference signal of the second time-frequency resource group are used to demodulate a data signal.

14. The apparatus according to claim 13, wherein the specified time-frequency resource further comprises a third time-frequency resource group and a fourth time-frequency resource group, and each time-frequency resource group corresponds to two antenna ports; and correspondingly, the processing unit is further configured to:

map a reference signal corresponding to a third sequence in a second sequence group, to the first time-frequency resource group and the second time-frequency resource group respectively based on a first preset rule; and map a reference signal corresponding to a fourth sequence in the second sequence group, to the first time-frequency resource group and the second time-frequency resource group respectively based on the first preset rule, so that a third sequence group corresponding to the third time-frequency resource group comprises the third sequence and the fourth sequence; wherein the second sequence group comprises the third sequence and the fourth sequence other than the first sequence group in the orthogonal sequence group;

the third time-frequency resource group comprises the four resource elements (REs) of the first OFDM symbol that are in the first time-frequency resource group and the second time-frequency resource group and are located in the data region, and the fourth time-frequency resource group comprises the four REs of the second OFDM symbol that are in the first time-frequency resource group and the second time-frequency resource group and are located in the data region; and a reference signal of the third time-frequency resource group is used to demodulate a data signal and/or a control signal.

15. The apparatus according to claim 9, wherein when a length of a sequence corresponding to a reference signal of each antenna port is 8, M is 8, and N is 8, the processing unit is configured to map eight reference signals corresponding to the eight sequences, to the specified time-frequency resource respectively, wherein a reference signal corresponding to the specified time-frequency resource is used to demodulate a data signal; wherein the specified time-frequency resource comprises four resource elements (REs) of the first OFDM symbol in the data region and four REs of a second OFDM symbol in the data region, wherein the four REs of the first OFDM symbol and the four REs of the second OFDM symbol occupy subcarriers of a same frequency.

16. The apparatus according to claim 9, wherein when a length of a sequence corresponding to a reference signal of each antenna port is 8, M is 8, and N is 4, the specified time-frequency resource comprises a fifth time-frequency resource group and a sixth time-frequency resource group, wherein each time-frequency resource group corresponds to four antenna ports; and the processing unit is configured to:

obtain a mapped sequence of a third sequence group, wherein the third sequence group comprises the four sequences selected from the orthogonal sequence group; and map four reference signals corresponding to the mapped sequence, to the fifth time-frequency resource group and the sixth time-frequency resource group respectively; wherein the fifth time-frequency resource group and the sixth time-frequency resource group respectively comprise two resource elements (REs) of the first OFDM symbol, two REs of a second OFDM symbol, two REs of an ith OFDM symbol, and two REs of a jth OFDM symbol in the data region, wherein the two REs of the first OFDM symbol, the two REs of the second OFDM symbol, the two REs of the ith OFDM symbol, and the two REs of the jth OFDM symbol occupy subcarriers of a same frequency, i is a positive integer greater than 2, and j is a positive integer greater than i; and a reference signal of the fifth time-frequency resource group and a reference signal of the sixth time-frequency resource group are used to demodulate a data signal.

17. The apparatus according to claim 9, wherein when a length of a sequence corresponding to a reference signal of each antenna port is 4, M is 4, and N is 4, the specified time-frequency resource comprises an eleventh time-frequency resource group and a twelfth time-frequency resource group, wherein each time-frequency resource group corresponds to four antenna ports; and the processing unit is configured to:

map four reference signals corresponding to the four sequences, to the eleventh time-frequency resource group and the twelfth time-frequency resource group respectively; wherein the eleventh time-frequency resource group and the twelfth time-frequency resource group respectively comprise any four non-overlapping resource elements (REs) of the first OFDM symbol in the data region, and a reference signal of the eleventh time-frequency resource group and a reference signal of the twelfth time-frequency resource group are used to demodulate a data signal.

18. A reference signal mapping apparatus, wherein the apparatus comprises:

a receiver, configured to receive first indication information, wherein the first indication information comprises at least port information of a first preset antenna port; and a processor, configured to detect whether the first indication information comprises time-frequency resource extension indication information; wherein the receiver is further configured to receive at least one reference signal on a first preset time-frequency resource group if the first indication information does not comprise the time-frequency resource extension indication information, wherein the first preset time-frequency resource group is a time-frequency resource group corresponding to the first preset antenna port;

the receiver is further configured to receive the at least one reference signal on a second preset time-frequency resource group if the first indication information comprises the time-frequency resource extension indication information, wherein the second preset time-frequency resource group comprises the first preset time-frequency resource group and an extended time-frequency resource group; and the processor is further configured to demodulate a control signal and/or a data signal based on the at least one reference signal; and, wherein when the first indication information is transmitted on the type-1 control channel in a subframe in which the PRB is located, a time-frequency resource corresponding to the first preset antenna port is located in the data region in the subframe in which the PRB is located; or when the first indication information is transmitted on the type-2 control channel of the PRB, the first indication information further comprises a subframe location of a subframe in which the at least one reference signal is located, and correspondingly, a time-frequency resource corresponding to the first preset antenna port is located in a data region of a second PRB, wherein the second PRB is at least one PRB corresponding to the subframe in which the at least one reference signal is located; or when the first indication information is transmitted on the type-1 control channel in a subframe in which the PRB is located, the first indication information further comprises a subframe location of a subframe in which the at least one reference signal is located, and correspondingly, a time-frequency resource corresponding to the first preset antenna port is located in a data region of a third PRB, wherein the third PRB comprises at least one PRB in the subframe in which the PRB is located and at least one PRB corresponding to the subframe in which the at least one reference signal is located.

* * * * *